(12) United States Patent
Nakashima et al.

(10) Patent No.: US 10,064,162 B2
(45) Date of Patent: Aug. 28, 2018

(54) COMMUNICATION SYSTEM, MOBILE STATION APPARATUS, BASE STATION APPARATUS, COMMUNICATION METHOD, AND INTEGRATED CIRCUIT

(71) Applicants: Daiichiro Nakashima, Osaka (JP); Kimihiko Imamura, Osaka (JP); Toshizo Nogami, Osaka (JP); Kazuyuki Shimezawa, Osaka (JP)

(72) Inventors: Daiichiro Nakashima, Osaka (JP); Kimihiko Imamura, Osaka (JP); Toshizo Nogami, Osaka (JP); Kazuyuki Shimezawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/355,523

(22) PCT Filed: Oct. 30, 2012

(86) PCT No.: PCT/JP2012/077993
§ 371 (c)(1),
(2) Date: Apr. 30, 2014

(87) PCT Pub. No.: WO2013/065670
PCT Pub. Date: May 10, 2013

(65) Prior Publication Data
US 2014/0342746 A1 Nov. 20, 2014

(30) Foreign Application Priority Data
Nov. 2, 2011 (JP) .................................. 2011-241098

(51) Int. Cl.
*H04W 72/04* (2009.01)
*H04L 5/00* (2006.01)
(Continued)

(52) U.S. Cl.
CPC ....... *H04W 72/0406* (2013.01); *H04L 5/0048* (2013.01); *H04L 5/0053* (2013.01);
(Continued)

(58) Field of Classification Search
CPC ........... H04L 25/0204; H04L 25/03898; H04L 25/03942; H04L 5/0048; H04L 5/0053; H04W 72/0406
See application file for complete search history.

(56) References Cited

U.S. PATENT DOCUMENTS 8,027,297 B2 * 9/2011 Kim ...................... H04L 1/0027
370/329
8,891,416 B2 * 11/2014 Yang ..................... H04L 1/1861
370/280

(Continued)

FOREIGN PATENT DOCUMENTS

| JP | 2011-166701 A | | 8/2011 |
| JP | JPR1-112517 | * | 8/2011 |
| TW | 201125402 A1 | | 7/2011 |

OTHER PUBLICATIONS

Author: Samsung, Title: Discussion on ePDCCH Design Issues, Date: Aug. 22-26, 2011, Edition or vol. 3GPP TSG-RAN1#66 meeting, pp. 1-4.*

(Continued)

*Primary Examiner* — Frantz Bataille
(74) *Attorney, Agent, or Firm* — Birch, Stewart, Kolasch & Birch, LLP

(57) ABSTRACT

It is possible to efficiently transmit and receive signals including control information between a base station apparatus and a mobile station apparatus. A control channel is constituted of one or more first elements. The mobile station apparatus sets a search space for performing decoding detection of the control channel within a control channel region in which each of the first elements is constituted of (Continued)

resources in one physical resource block, and a search space for performing decoding detection of the control channel within a control channel region in which each of the first elements is constituted of second elements in a plurality of different physical resource blocks. Each of the second elements is resources obtained by dividing one physical resource block. The mobile station apparatus performs decoding detection of the control channel using the first elements in the set search spaces.

12 Claims, 22 Drawing Sheets

(51) Int. Cl.
*H04B 7/0413* (2017.01)
*H04B 7/04* (2017.01)
*H04B 7/024* (2017.01)
*H04B 7/02* (2017.01)
*H04L 25/03* (2006.01)
*H04L 25/02* (2006.01)

(52) U.S. Cl.
CPC ............ *H04B 7/024* (2013.01); *H04B 7/0413* (2013.01); *H04L 25/0204* (2013.01); *H04L 25/03898* (2013.01); *H04L 25/03942* (2013.01)

(56) References Cited

U.S. PATENT DOCUMENTS

| | | | | |
|---|---|---|---|---|
| 8,902,849 B2* | 12/2014 | Noh | ................. | H04L 5/0023 370/330 |
| 8,929,304 B2* | 1/2015 | Nishio | ................. | H04J 13/004 370/329 |
| 2005/0143123 A1* | 6/2005 | Black | ................. | H04B 1/713 455/552.1 |
| 2008/0084853 A1* | 4/2008 | Kuchibhotla | ....... | H04W 72/042 370/338 |
| 2008/0310389 A1* | 12/2008 | Suzuki | ................. | H04L 1/1858 370/346 |
| 2010/0067472 A1* | 3/2010 | Ball | ................. | H04L 5/0005 370/329 |
| 2010/0260124 A1* | 10/2010 | Noshio | ............... | H04W 72/042 370/329 |
| 2011/0038303 A1* | 2/2011 | Ji et al. | ......................... | 370/315 |
| 2011/0044391 A1* | 2/2011 | Ji | ......................... | H04L 5/0007 375/260 |
| 2012/0263060 A1 | 10/2012 | Suzuki et al. | | |
| 2013/0039302 A1 | 2/2013 | Miki et al. | | |

OTHER PUBLICATIONS

3GPP TSG RAN WG1 Meeting #62bis, R1-105498, "R-PDCCH Search Space Design," Xi'an, China, Oct. 11-15, 2010; pp. 1-7.

Ericsson et al., "On enhanced PDCCH design," 3GPP TSG-RAN WG1 #66bis, Zhuhai, China, Oct. 10-14, 2011, Retrieved on Oct. 4, 2011, Downloaded by EPO on Oct. 7, 2011, 3 pages, R1-112928, XP50538137.

Panasonic, "R-PDCCH placement," 3GPP TSG RAN WG1 Meeting #60bis, Beijing, China, Apr. 12-16, 2010, Retrieved on Apr. 6, 2010, Dowloaded by EPO on Jun. 12, 2010, pp. 1-5, R1-102042, XP50419373.

Samsung, "Discussion on ePDCCH Design Issues," 3GPP TSG-RAN1#66 meeting, Athens, Greece, Aug. 22-26, 2011, Retrieved on Aug. 16, 2011, Downloaded by EPO on Oct. 7, 2011, pp. 1-4, R1-112517, XP50537597.

Ericsson et al, "Way Forward on downlink control channel enhancements by UE-specific RS," R1-113589, 3GPP TSG-RAN WG1 #66bis, Zhuhai, China, Oct. 10-14, 2011.

NEC Group, "DL control channel enhancements for Rel-11," R1-112135, 3GPP TSG RAN WG1 Meeting #66, Athens, Greece, Aug. 22-26, 2011.

NEC Group, "Supporting frequency diversity and frequency selective R-PDCCH transmissions," R1-103062, TSG-RAN WG1#61, Montreal, Canada, May 10-14, 2010, pp. 1-6.

NTT Docomo, "Enhanced PDCCH for DL MIMO in Rel-11," R1-113297, 3GPP TSG RAN WG1 Meeting #66bis, Zhuhai, China, Oct. 10-14, 2011.

* cited by examiner

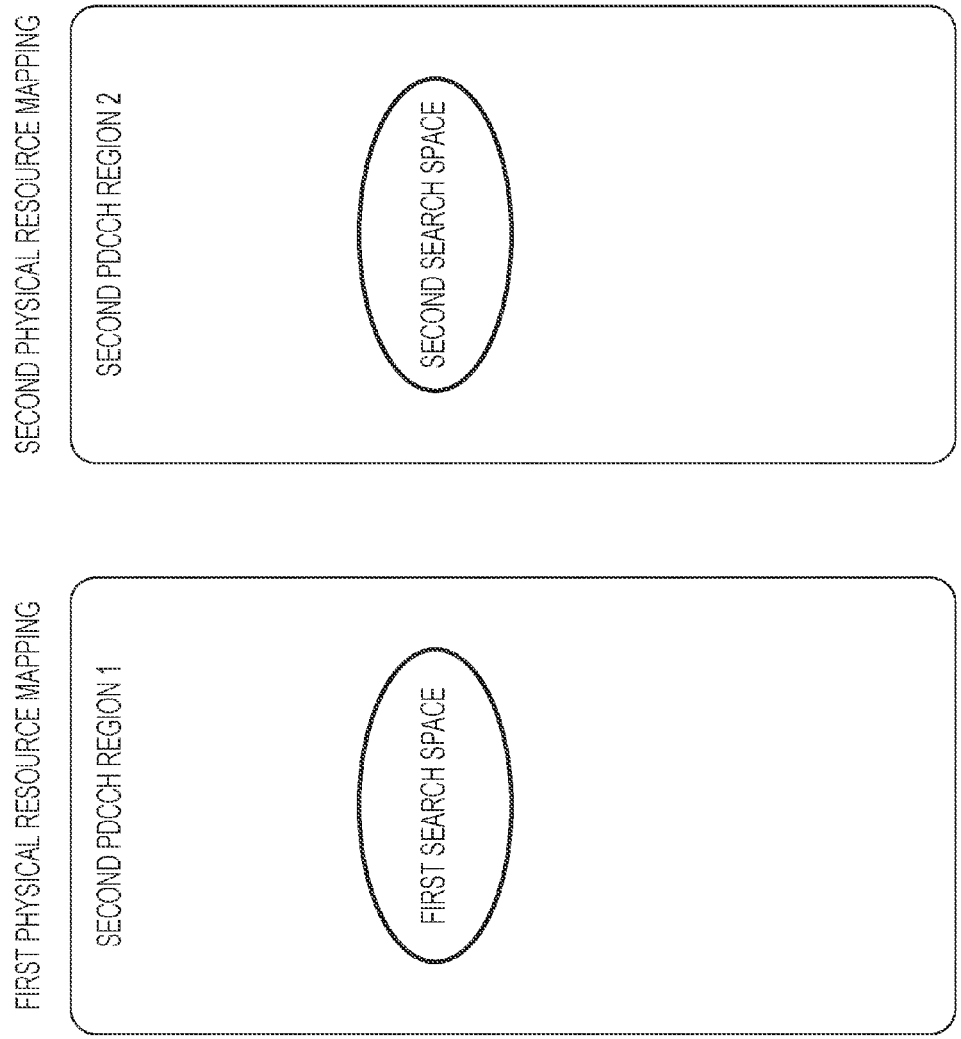

COMMUNICATION SYSTEM, MOBILE STATION APPARATUS, BASE STATION APPARATUS, COMMUNICATION METHOD, AND INTEGRATED CIRCUIT

TECHNICAL FIELD

The present invention relates to a communication system, a mobile station apparatus, a base station apparatus, a communication method and an integrated circuit, in which in a communication system including a plurality of mobile station apparatuses and a base station apparatus, the base station apparatus is capable of efficiently transmitting signals containing control information to the mobile station apparatuses and the mobile station apparatuses are capable of efficiently receiving signals containing control information from the base station apparatus, by efficiently configuring a region which may contain signals containing control information.

BACKGROUND ART

An evolution of a wireless access scheme and a wireless network of a cellular mobile communication (hereinafter, referred to as Long Term Evolution (LTE)" or Evolved Universal Terrestrial Radio access (EUTRA)") has been standardized in a 3rd Generation Partnership Project (3GPP). In LTE, an Orthogonal Frequency Division Multiplexing (OFDM) scheme, which is multicarrier transmission, is employed as a communication scheme of wireless communication from a base station apparatus to a mobile station apparatus (referred to as downlink (DL)). Further, in LTE, Single-Carrier Frequency Division Multiple Access (SC-FDMA), which is single carrier transmission, is employed as a communication scheme of wireless communication from the mobile station apparatus to the base station apparatus (referred to as uplink (UL)). In LTE, a Discrete Fourier Transform-Spread OFDM (DFT-Spread OFDM) scheme is employed as the SC-FDMA scheme.

In order to meet the demand, Long Term Evolution-Advanced (LTE-A), which at least supports the same channel structure as that of LTE, is considered. A channel is a medium used for transmission of signals. A channel used in a physical layer is called a physical channel, whereas a channel used in a Medium Access Control (MAC) layer is called a logical channel. Examples of types of physical channel include a Physical Downlink Shared CHannel (PDSCH) used in transmission and reception of data and control information of the downlink, a Physical Downlink Control CHannel (PDCCH) used in transmission and reception of control information of the downlink, a Physical Uplink Shared CHannel (PUSCH) used in transmission and reception of data and control information of the uplink, a Physical Uplink Control CHannel (PUCCH) used in transmission and reception of control information of the uplink, a Synchronization CHannel (SCH) used for synchronization establishment of the downlink, a Physical Random Access CHannel (PRACH) used for synchronization establishment of the uplink, a Physical Broadcast CHannel (PBCH) used in transmission of system information of the downlink, and the like. The mobile station apparatus or the base station apparatus assigns signals which have been generated from control information, data, and the like to each physical channel and transmits the signals. Data which is transmitted on the physical downlink shared channel or the physical uplink shared channel is called a transport block.

Control information which is mapped on the physical uplink control channel is called Uplink Control Information (UCI). The uplink control information is control information (reception confirmation reply; ACK/NACK) indicating Acknowledgement (ACK) or Negative Acknowledgement (NACK) concerning data assigned to the received physical downlink shared channel, control information (Scheduling Request: SR) indicating a request for allocation of an uplink resource, or control information (Channel Quality Indicator: CQI) indicating reception quality (also referred to as channel quality) of the downlink.

<Cooperative Communication>

In LTE-A, in order to reduce or suppress interference in the mobile station apparatus in a cell edge region or to increase reception signal power, Cooperative Multipoint communication (CoMP communication), which performs communication between adjacent cells in cooperation with each other, is being considered. Note that, for example, the form in which the base station apparatus performs communication using a certain frequency band will be referred to as a "cell". For example, as the CoMP communication, in a plurality of cells, a different weighting signal process (precoding process) is applied on a signal, a plurality of base station apparatuses cooperate to transmit the signal to the same mobile station apparatus (also referred to as Joint Processing or Joint Transmission). This method can improve the signal power-to-interference noise power ratio of the mobile station apparatus and improve the reception performance of the mobile station apparatus. For example, as CoMP communication, a method in which a plurality of cells cooperate to perform a scheduling for the mobile station apparatus (Coordinated Scheduling: CS) is being considered. This method can improve the signal power-to-interference noise power ratio of the mobile station apparatus. For example, as CoMP communication, a method in which a plurality of cells cooperate to perform beamforming on signals and transmit the signals to the mobile station apparatus (Coordinated Beamforming: CB) is being considered. This method can improve the signal power-to-interference noise power ratio of the mobile station apparatus. For example, as CoMP communication, a method in which only one cell transmits signals using a predetermined resource, and other cells do not transmit signals using the predetermined resource (Blanking and Muting) is being considered. This method can improve the signal power-to-interference noise power ratio of the mobile station apparatus.

In addition, with respect to a plurality of cells used in cooperative communication, different cells may be configured by different base station apparatuses, different cells may be configured by different Remote Radio Heads (RRH) (more compact outdoor radio unit than the base station apparatus, and also referred to as a Remote Radio Unit: RRU) which are managed by the same base station apparatus, different cells may be configured by a base station apparatus and an RRH managed by the base station apparatus, and different cells may be configured by a base station apparatus and an RRH managed by another base station apparatus different from the base station apparatus.

A base station apparatus having a wide coverage is generally referred to as a macro base station apparatus. A base station apparatus having a narrow coverage is generally referred to as a pico base station apparatus or a femto base station apparatus. The RRH generally operating in an area having a narrower coverage than that of the macro base station apparatus is considered. The deployment of a communication system including the macro base station apparatus and the RRH, and in which the coverage supported by the macro base station apparatus includes all or a part of the coverage supported by the RRH is referred to as a heterogeneous network deployment. In a communication system of such a heterogeneous network deployment, a method is considered in which the macro base station apparatus and the RRH cooperate to transmit signals to the mobile station apparatus located within an overlap coverage. Here, the RRH is managed by the macro base station apparatus and transmission and reception thereof are controlled. In addition, the macro base station apparatus and the RRH are connected to each other by a wired line such as an optical fiber and/or a wireless line using a relay technology. In this manner, since the macro base station apparatus and the RRH performs cooperative communication using the same radio resource as a whole or partially, it is possible to improve overall frequency utilization efficiency (transmission capacity) within an area of a coverage of the macro base station apparatus.

When the mobile station apparatus is located in the vicinity of the macro base station apparatus or the RRH, the mobile station apparatus can perform single cell communication with the macro base station apparatus or the RRH. In other words, some mobile station apparatuses perform communication with the macro base station apparatus or the RRH without using cooperative communication so as to transmit and receive signals. For example, the macro base station apparatus receives an uplink signal from the mobile station apparatus located close to the macro base station apparatus in distance. For example, the RRH receives an uplink signal from the mobile station apparatus located close to the RRH in distance. Further, when the mobile station apparatus is located in the vicinity of the edge (cell edge) of a coverage of the RRH, a countermeasure against the same channel interference from the macro base station apparatus is required. By using a CoMP scheme in which adjacent base stations cooperate with each other as multi-cell communication (cooperative communication) with the macro base station apparatus and the RRH, a method has been considered which reduces or suppresses interference to the mobile station apparatus in the cell edge region.

Further, it has been considered that the mobile station apparatus receives signals transmitted from both the macro base station apparatus and the RRH using cooperative communication in the downlink, and transmits signals in a form suitable for either the macro base station apparatus or the RRH in the uplink. For example, the mobile station apparatus transmits uplink signals in transmission power suitable for receiving signals in a macro base station apparatus. For example, the mobile station apparatus transmits uplink signals in transmission power suitable for receiving signals in the RRH. This reduces unnecessary interference in an uplink, thereby improving the frequency utilization efficiency.

It is necessary for the mobile station apparatus to obtain, with respect to a reception process of the data signal, control information indicating a modulation scheme, a coding rate, a spatial multiplexing number, a transmission power adjustment value, allocation of resource, and the like which are used for data signals. In LTE-A, introducing a new control channel of control information regarding the data signal has been considered (NPL 1). For example, improving the capacity of all control channels has been considered. For example, supporting interference coordination in a frequency domain for the new control channel has been considered. For example, supporting spatial multiplexing for the new control channel has been considered. For example, supporting beamforming for the new control channel has been considered. For example, supporting diversity for the new control channel has been considered. For example, using the new control channel in a new type of carrier has been considered. For example, in the new type of carrier, not performing transmission of the reference signal which is common to all mobile station apparatuses within a cell has been considered. For example, in the new type of carrier, more reducing the transmission frequency of the reference signal which is common to all mobile station apparatuses within the cell than the conventional transmission frequency has been considered. For example, in the new type of carrier, demodulating signals such as control information by using a reference signal specific to the mobile station apparatus has been considered.

For example, as an application of beamforming, applying cooperative communication and transmission using a plurality of antennas to the new control channel has been considered. Specifically, it has been considered that a plurality of base station apparatuses and a plurality of RRHs, corresponding to LTE-A, apply a pre-coding process on signals of the new control channel and apply the same pre-coding process on a Reference Signal (RS) for demodulating signals of the new control channel. Specifically, it has been considered that a plurality of base station apparatuses and a plurality of RRHs, corresponding to LTE-A, map the signals and RSs of the new control channel to which the same pre-coding process is applied in a region of a resource in which PDSCH is mapped in LTE and transmit them. It has been considered that a mobile station apparatus corresponding to LTE-A demodulates signals of the new control channel which is subjected to the same pre-coding process by using a RS which is received and subjected to the pre-coding process and obtains control information. In this method, it is not necessary to exchange information about the pre-coding process that is applied to the signal of the new control channel between the base station apparatus and the mobile station apparatus.

For example, a method has been considered which configures signals of the new control channel by using different resources in the frequency domain as the application of diversity and obtains an effect of frequency diversity. In contrast, a method has been considered which configures signals of the new control channel by using same resources in the frequency domain when beamforming is applied to the new control channel.

CITATION LIST

Non Patent Literature

NPL 1: 3GPP TSG RAN1 #66bis, Zhuhai, China, 10-14, Oct. 2011, R1-113589 Way Forward on downlink control channel enhancements by UE-specific RS"

SUMMARY OF INVENTION

Technical Problem

When a base station apparatus applies beamforming to new control channel, if channel state information containing sufficient information for determining a suitable pre-coding is not notified from a mobile station apparatus, it is difficult to realize a pre-coding process suitable for the mobile station apparatus. For example, since a plurality of mobile station apparatuses are present in a communication system, due to lack of resources, the base station apparatus cannot configure sufficient uplink resources for a certain mobile station apparatus, as a result, sufficient channel state information may not be notified from the mobile station apparatus to the base station apparatus. For example, the reliability of an uplink signal containing the channel state information may be low due to factors such as interference, so the base station apparatus may not use the received channel state information. For example, there are cases where the transmission of information such as a scheduling request precedes the transmission of channel state information, and thus the mobile station apparatus cannot transmit channel state information, and the base station apparatus cannot obtain the channel state information. For example, when channel state information is notified from the mobile station apparatus to the base station apparatus at a certain frequency domain in order, as a result of a scheduling in view of other mobile station apparatuses, in some cases, signals of a new control channel has to be transmitted using resources in the frequency domain in which the channel state information is not transmitted from the mobile station apparatus for a long period.

In contrast, it is desirable to suppress the amount of resource used in a new control channel and to increase the capacity of a control channel of an overall system by applying the beamforming to a new control channel as far as possible so as to improve the reception performance.

The present invention has been made in view of the above, an object is to provide a communication system, a mobile station apparatus, a base station apparatus, a communication method and an integrated circuit, in which in a communication system including a plurality of mobile station apparatuses and a base station apparatus, the base station apparatus is capable of efficiently transmitting signals containing control information to the mobile station apparatuses and the mobile station apparatuses are capable of efficiently receiving signals containing control information from the base station apparatus, by efficiently configuring a region which may contain signals containing control information.

Solution to Problem (1) According to an embodiment of the present invention, a communication system includes a plurality of mobile station apparatuses and a base station apparatus which performs communication with the plurality of mobile station apparatuses using a control channel. A control channel region to which the control channel is possible to be allocated is constituted of a plurality of physical resource blocks. The control channel is constituted of one or more first elements. The base station apparatus comprises a radio resource control unit that sets, as the control channel region, a first control channel region to which a first physical resource mapping is applied and a second control channel region to which a second physical resource mapping is applied for the mobile station apparatuses. For the first physical resource mapping, each of the first elements is constituted of resources in one physical resource block. For the second physical resource mapping, each of the first elements is constituted of second elements in a plurality of different physical resource blocks. Each of the second elements is resources obtained by dividing one physical resource block. The base station apparatus further comprises a first control unit that allocates the one or more first elements in one of a search space in which decoding detection of the control channel is performed within the first control channel region by the mobile station apparatus and a search space in which decoding detection of the control channel is performed within the second control channel region by the mobile station apparatus, to the control channel to be used in communication. The mobile station apparatus comprises a second control unit that sets a search space for performing decoding detection of the control channel within the first control channel region which is set by the base station apparatus and a search space for performing decoding detection of the control channel within the second control channel region which is set by the base station apparatus, and a reception processing unit that performs decoding detection of the control channel, using the first elements in the search spaces which are set by the second control unit.

(2) According to another embodiment of the present invention, a mobile station apparatus performs communication with a base station apparatus using a control channel. A control channel region to which the control channel is possible to be allocated is constituted of a plurality of physical resource blocks. The control channel is constituted of one or more first elements. A first control channel region to which a first physical resource mapping is applied and a second control channel region to which a second physical resource mapping is applied are set as the control channel region by the base station apparatus. For the first physical resource mapping, each of the first elements is constituted of resources in one physical resource block. For the second physical resource mapping, each of the first elements is constituted of second elements in a plurality of different physical resource blocks. Each of the second elements is resources obtained by dividing one physical resource block. The mobile station apparatus includes a control unit that sets a search space for performing decoding detection of the control channel within the first control channel region which is set by the base station apparatus and a search space for performing decoding detection of the control channel within the second control channel region which is set by the base station apparatus, and a reception processing unit that performs decoding detection of the control channel, using the first elements in the search spaces which are set by the control unit.

(3) Preferably, a pre-coding process based on a channel state is applied to the control channel in the first control channel region, and a pre-coding process based on a channel state is not applied to the control channel in the second control channel region.

(4) Preferably, the number of control channel candidates constituting a search space for performing decoding detection of the control channel within the first control channel region and the number of control channel candidates constituting a search space for performing decoding detection of the control channel within the second control channel region are different.

(5) Preferably, the number of the first elements constituting a control channel in which decoding detection is performed in the search space within the first control channel region and the number of the first elements constituting a control channel in which decoding detection is performed in the search space within the second control channel region are different.

(6) According to still another embodiment of the present invention, a base station apparatus performs communication with a plurality of mobile station apparatuses using a control channel. A control channel region to which the control channel is possible to be allocated is constituted of a plurality of physical resource blocks. The control channel is constituted of one or more first elements. The base station apparatus includes a radio resource control unit that sets, as the control channel region, a first control channel region to which a first physical resource mapping is applied and a second control channel region to which a second physical resource mapping is applied for the mobile station apparatuses. For the first physical resource mapping, each of the first elements is constituted of resources in one physical resource block. For the second physical resource mapping, each of the first elements is constituted of second elements in a plurality of different physical resource blocks. Each of the second elements is resources obtained by dividing one physical resource block. The base station apparatus further includes a control unit that allocates the one or more first elements in one of a search space in which decoding detection of the control channel is performed within the first control channel region by the mobile station apparatus and a search space in which decoding detection of the control channel is performed within the second control channel region by the mobile station apparatus, to the control channel to be used in communication.

(7) According to further still another embodiment of the present invention, a communication method is used in a mobile station apparatus which performs communication with a base station apparatus using a control channel. A control channel region to which the control channel is possible to be allocated is constituted of a plurality of physical resource blocks. The control channel is constituted of one or more first elements. A first control channel region to which a first physical resource mapping is applied and a second control channel region to which a second physical resource mapping is applied are set as the control channel region by the base station apparatus. For the first physical resource mapping, each of the first elements is constituted of resources in one physical resource block. For the second physical resource mapping, each of the first elements is constituted of second elements in a plurality of different physical resource blocks. Each of the second elements is resources obtained by dividing one physical resource block. The communication method includes a step of setting a search space for performing decoding detection of the control channel within the first control channel region which is set by the base station apparatus and a search space for performing decoding detection of the control channel within the second control channel region which is set by the base station apparatus, and a step of performing decoding detection of the control channel, using the first elements in the set search spaces.

(8) According to further still another embodiment of the present invention, a communication method is used in a base station apparatus which performs communication with a plurality of mobile station apparatuses using a control channel. A control channel region to which the control channel is possible to be allocated is constituted of a plurality of physical resource blocks. The control channel is constituted of one or more first elements. The communication method includes a step of setting, as the control channel region, a first control channel region to which a first physical resource mapping is applied and a second control channel region to which a second physical resource mapping is applied for the mobile station apparatuses. For the first physical resource mapping, each of the first elements is constituted of resources in one physical resource block. For the second physical resource mapping, each of the first elements is constituted of second elements in a plurality of different physical resource blocks. Each of the second elements is resources obtained by dividing one physical resource block. The communication method further includes a step of allocating the one or more first elements in one of a search space in which decoding detection of the control channel is performed within the first control channel region by the mobile station apparatus and a search space in which decoding detection of the control channel is performed within the second control channel region by the mobile station apparatus, to the control channel to be used in communication.

(9) According to further still another embodiment of the present invention, an integrated circuit is implemented in a mobile station apparatus which performs communication with a base station apparatus using a control channel. A control channel region to which the control channel is possible to be allocated is constituted of a plurality of physical resource blocks. The control channel is constituted of one or more first elements. A first control channel region to which a first physical resource mapping is applied and a second control channel region to which a second physical resource mapping is applied are set as the control channel region by the base station apparatus. For the first physical resource mapping, each of the first elements is constituted of resources in one physical resource block. For the second physical resource mapping, each of the first elements is constituted of second elements in a plurality of different physical resource blocks. Each of the second elements is resources obtained by dividing one physical resource block. The integrated circuit includes a function of setting a search space for performing decoding detection of the control channel within the first control channel region which is set by the base station apparatus and a search space for performing decoding detection of the control channel within the second control channel region which is set by the base station apparatus, and a function of performing decoding detection of the control channel, using the first elements in the set search spaces.

(10) According to further still another embodiment of the present invention, an integrated circuit is implemented in a base station apparatus which performs communication with a plurality of mobile station apparatuses using a control channel. A control channel region to which the control channel is possible to be allocated is constituted of a plurality of physical resource blocks. The control channel is constituted of one or more first elements. The integrated circuit includes a function of setting, as the control channel region, a first control channel region to which a first physical resource mapping is applied and a second control channel region to which a second physical resource mapping is applied for the mobile station apparatuses. For the first physical resource mapping, each of the first elements is constituted of resources in one physical resource block. For the second physical resource mapping, each of the first elements is constituted of second elements in a plurality of different physical resource blocks. Each of the second elements is resources obtained by dividing one physical resource block. The integrated circuit further includes a function of allocating the one or more first elements in one of a search space in which decoding detection of the control channel is performed within the first control channel region by the mobile station apparatus and a search space in which decoding detection of the control channel is performed within the second control channel region by the mobile station apparatus, to the control channel to be used in communication.

As used herein, although the present invention is disclosed as improvements of a communication system, a mobile station apparatus, a base station apparatus, a communication method and an integrated circuit in which a region that may contain the control channel is configured by a base station apparatus, a communication scheme to which the present invention is applicable is not limited to LTE or a communication scheme having upward compatibility with LTE such as LTE-A. For example, the present invention can be applied to a Universal Mobile Telecommunications System (UMTS).

Advantageous Effects of Invention

According to the present invention, a base station apparatus is capable of efficiently transmitting a signal containing control information to a mobile station apparatus, the mobile station apparatus is capable of efficiently receiving the signal containing the control information from a base station apparatus, and thus it is possible to realize more efficient communication system.

BRIEF DESCRIPTION OF DRAWINGS

FIG. 22 is a diagram illustrating a monitoring of the second PDCCH of the mobile station apparatus 5 according to the embodiment of the present invention.

DESCRIPTION OF EMBODIMENTS

The technology described herein may be used in various wireless communication systems such as a Code Division Multiple Access (CDMA) system, a Time Division Multiple Access (TDMA) System, a Frequency Division Multiple Access (FDMA) system, an Orthogonal FDMA (OFDMA) system, a Single Carrier FDMA (SC-FDMA) system, and other systems. The terms system" and network" may often be used synonymously. The CDMA system can implement wireless technologies (standards) such as Universal Terrestrial Radio Access (UTRA) or cdma2000 (registered trademark). UTRA includes Wideband CDMA (WCDMA) and other improved types of CDMA. The cdma2000 includes IS-2000, IS-95, and IS-856 standards. The TDMA system can implement a wireless technology such as a Global System for Mobile Communications (GSM (registered trademark)). The OFDMA system can implement wireless technologies such as Evolved UTRA (E-UTRA), Ultra Mobile Broadband (UMB), IEEE802.11 (Wi-Fi), IEEE802.16 (WiMAX), IEEE802.20, and Flash-OFDM (registered trademark). UTRA and E-UTRA are a part of a universal mobile communication system (UMTS). 3GPP Long Term Evolution (LTE) is a UMTS that uses E-UTRA employing OFDMA on a downlink and employing SC-FDMA on an uplink. LTE-A is an improved LTE system, wireless technology, and standard. UTRA, E-UTRA, UMTS, LTE, LTE-A and GSM are described in documents issued by an organization called the 3rd Generation Partnership Project (3GPP). Cdma2000 and UMB are described in documents issued by an organization called the 3rd Generation Partnership Project 2 (3GPP2). For clarity, as some aspects of the present technology, data communication in LTE and LTE-A will be described below, and the terms used in LTE and LTE-A are used in much of the description below.

Hereinafter, embodiments of the present invention will be described in detail with reference to the drawings. An overview of a communication system according to the present embodiment and a configuration of a radio frame will be described using FIGS. 9 to 21. A configuration of the communication system according to the present embodiment will be described using FIGS. 1 to 6. An operation process of the communication system according to the present embodiment will be described using FIGS. 7, 8 and 22.

Figure 9:
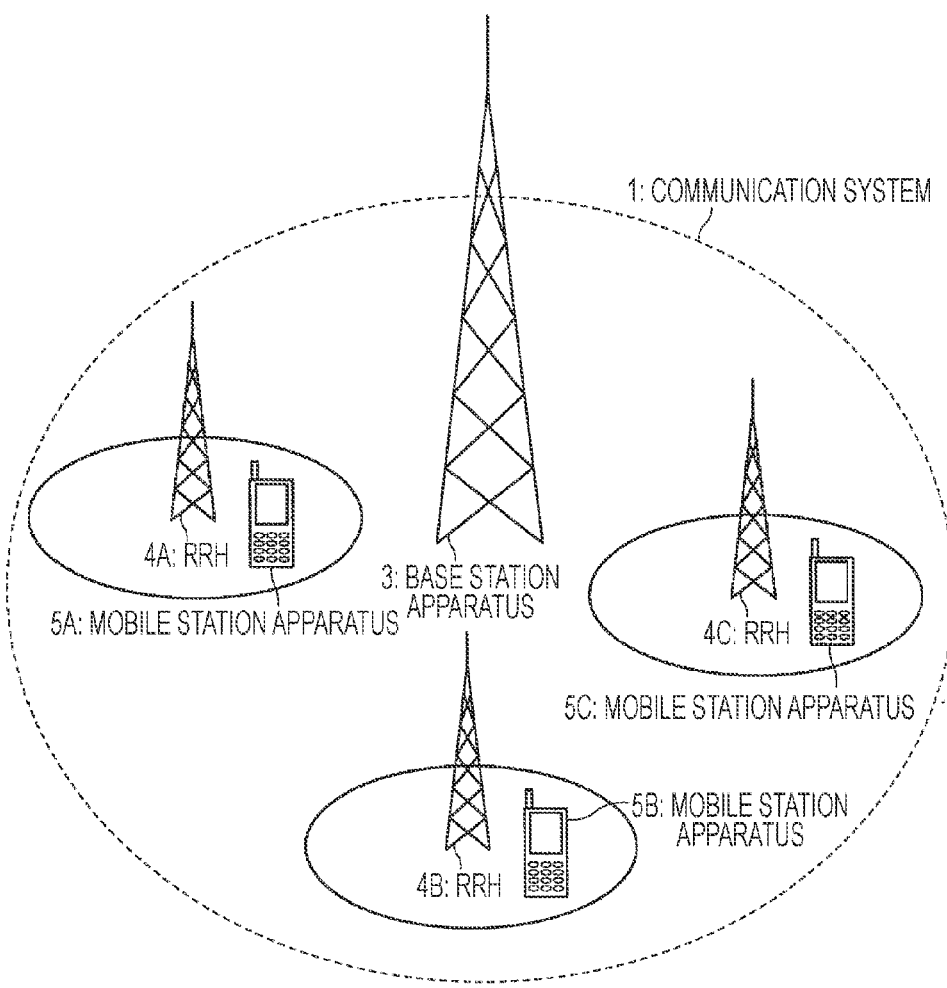
FIG. 9 is a diagram schematically illustrating the overall appearance of a communication system according to an embodiment of the present invention.

FIG. 9 is a diagram schematically illustrating the overall appearance of a communication system according to an embodiment of the present invention. In the communication system 1 shown in FIG. 9, a base station apparatus (also referred to as an eNodeB, a NodeB, a Base Station (BS), an Access Point (AP), or a macro base station) 3, a plurality of RRHs (also referred to as a Remote Radio Head, an apparatus having an outdoor wireless unit smaller than the base station apparatus, a Remote Radio Unit (RRU), a remote antenna, or a distributed antenna) 4A, 4B, and 4C, a plurality of mobile station apparatuses (also referred to as User Equipment (UE), a Mobile Station (MS), a Mobile Terminal (MT), a terminal, a terminal apparatus, or a mobile terminal) 5A, 5B, and 5C perform communication with each other. Hereinafter, in the present embodiment, a description will be made appropriately while the RRHs 4A, 4B, and 4C are referred to as a RRH 4 and the mobile station apparatuses 5A, 5B, and 5C are referred to as a mobile station apparatus 5. In the communication system 1, the base station apparatus 3 and the RRH 4 cooperate to perform communication with the mobile station apparatus 5. In FIG. 9, the base station apparatus 3 and the RRH 4A perform cooperative communication with the mobile station apparatus 5A, the base station apparatus 3 and the RRH 4B perform cooperative communication with the mobile station apparatus 5B, and the base station apparatus 3 and the RRH 4C perform cooperative communication with the mobile station apparatus 5C.

In addition, it may be said that the RRH is a special form of the base station apparatus. For example, it may be said that the RRH is a base station apparatus which has only a signal processing unit and in which a parameter configuration, a scheduling determination and the like used in the RRH are performed by another base station apparatus. Accordingly, it should be noted that the expression "base station apparatus 3" includes the RRH 4 in the following description where appropriate.

<Cooperative Communication>

The communication system 1 according to the embodiment of the present invention uses cooperative communication (Cooperative Multipoint (CoMP) communication) in which a plurality of cells cooperate to perform transmission and reception of signals. In addition, for example, the form in which the base station apparatus performs communication using a certain frequency band will be referred to as a "cell". For example, as cooperative communication, different weighting signal processes (pre-coding process) are applied on signals in a plurality of cells (the base station apparatus 3 and the RRH 4), and the base station apparatus 3 and the RRH 4 cooperate to transmit signals to the same mobile station apparatus 5. For example, as cooperative communication, a plurality of cells (base station apparatus 3 and the RRH 4) cooperate to perform a scheduling on the mobile station apparatus 5 (Coordinated Scheduling: CS). For example, as cooperative communication, a plurality of cells (base station apparatus 3 and the RRH 4) cooperate to perform beamforming on signals and transmit the signals to the mobile station apparatus 5 (Coordinated Beamforming: CB). For example, as cooperative communication, one cell (the base station apparatus 3 or the RRH 4) transmits a signal using a predetermined resource and the other cell (the base station apparatus 3 or the RRH 4) does not transmit a signal using the predetermined resource (Blanking and Muting).

In addition, although a description is omitted in the embodiments of the present invention, with respect to a plurality of cells used in cooperative communication, different cells may be configured by different base station apparatuses 3, may be configured by different RRHs 4 managed by the same base station apparatus 3, or may be configured by the base station apparatus 3 and the RRH 4 managed by another base station apparatus 3 different from the base station apparatus.

In addition, although a plurality of cells are used as physically different cells, they may be used as logically the same cells. Specifically, a configuration in which a common cell identifier (Physical cell ID) is used in each cell may be adopted. A configuration in which a plurality of transmission apparatuses (the base station apparatus 3 and the RRH 4) transmit common signals to the same reception apparatus using the same frequency band is also referred to as a Single Frequency Network (SFN).

The development of the communication system 1 of the embodiment of the present invention is assumed to be a heterogeneous network deployment. The communication system 1 includes the base station apparatus 3 and the RRH 4, and is configured such that the coverage supported by the base station apparatus 3 includes all or a part of the coverage supported by the RRH 4. Here, the coverage is an area in which communication is realized while satisfying a request. In the communication system 1, the base station apparatus 3 and the RRH 4 cooperate to transmit signals to the mobile station apparatus 5 located within an overlapping coverage of the base station apparatus 3 and the RRH 4. Here, the RRH 4 is managed by the base station apparatus 3, and transmission and reception thereof is controlled. In addition, the base station apparatus 3 and the RRH 4 are connected by a wired line such as an optical fiber and/or a wireless line using relay technology.

When the mobile station apparatus 5 is located in the vicinity of the base station apparatus 3 or the RRH 4, the mobile station apparatus 5 may use single cell communication with the base station apparatus 3 or the RRH 4. In other words, some mobile station apparatuses 5 may perform communication with the base station apparatus 3 or the RRH 4 and perform transmission and reception of signals, while not using cooperative communication. For example, the base station apparatus 3 may receive uplink signals from a mobile station apparatus 5 close to the base station apparatus 3 in distance. For example, the RRH 4 may receive uplink signals from a mobile station apparatus 5 close to the RRH 4 in distance. Further, for example, both the base station apparatus 3 and the RRH 4 may receive uplink signals from a mobile station apparatus 5 located in the vicinity of an edge (cell edge) of a coverage of the RRH 4.

Further, the mobile station apparatus 5 may receive signals transmitted from both the base station apparatus 3 and the RRH 4 using cooperative communication in the downlink, and may transmit signals in a form suitable for the base station apparatus 3 or the RRH 4 in the uplink. For example, the mobile station apparatus 5 transmits uplink signals by suitable transmission power for the base station apparatus 3 to receive signals. For example, the mobile station apparatus 5 transmits uplink signals by suitable transmission power suitable for the RRH 4 to receive signals.

In the communication system 1, the DownLink (DL) which is a communication direction from the base station apparatus 3 or the RRH 4 to the mobile station apparatus 5 is configured to include a downlink pilot channel, a Physical Downlink Control CHannel (PDCCH), and a Physical Downlink Shared CHannel (PDSCH). Cooperative communication is applied to or is not applied to the PDSCH. The PDCCH includes a first PDCCH and a second PDCCH (Enhanced-PDCCH (E-PDCCH)). The downlink pilot channel includes a first type of reference signal (CRS described later) used in demodulating the PDSCH, the first PDCCH and a second type of reference signal (UE-specific RS described later) used in demodulating the PDSCH and the second PDCCH, and a third type of reference signal (CSI-RS described later).

In addition, from one viewpoint, the first PDCCH is a physical channel in which the same transmission port (an antenna port and a transmit antenna) as that for the first type of reference signal is used. Further, the second PDCCH is a physical channel in which the same transmission port as that for the second type of reference signal is used. The mobile station apparatus 5 demodulates the signals mapped to the first PDCCH using the first type of reference signal, and demodulates the signals mapped to the second PDCCH using the second type of reference signal. The first type of reference signal is a reference signal which is common to all mobile station apparatuses 5 within a cell, inserted into almost all resource blocks and available also in any mobile station apparatus 5. Therefore, any mobile station apparatus 5 can demodulate the first PDCCH. In contrast, the second type of reference signal is a reference signal which can be basically inserted into only an allocated resource block. The second type of reference signal can be subjected to a pre-coding process adaptively in the same way as data.

In addition, from one viewpoint, the first PDCCH is a control channel mapped in OFDM symbols in which the PDSCH is not mapped. Further, the second PDCCH is a control channel mapped in OFDM symbols in which the PDSCH is mapped. In addition, from one viewpoint, the first PDCCH is basically a control channel in which signals are mapped over all PRBs of the downlink system band, and the second PDCCH is a control channel in which signals are mapped over PRBs configured by the base station apparatus 3 within the downlink system band. In addition, although a detailed description will be made later, from one viewpoint, different signal configurations are used in the first PDCCH and the second PDCCH. A CCE structure described later is used in a signal configuration in the first PDCCH, and a VRB (first element) structure described later is used in a signal configuration in the second PDCCH. In other words, the first PDCCH and the second PDCCH are different in a minimum unit (element) of resources used in the configuration of one control channel, and respective control channels are configured to include one or more respective minimum units. Further, in the second PDCCH, a signal configuration using the VRB that is a minimum unit of resources used in the configuration of one second PDCCH is common, but a plurality of mappings of resources configuring one VRB are used.

Further, in the communication system 1, the UpLink (UL) which is a communication direction from the mobile station apparatus 5 to the base station apparatus 3 or the RRH 4 is configured to include a Physical Uplink Shared CHannel (PUSCH), an uplink pilot channel (Uplink Reference Signal (UL RS), Sounding Reference Signal (SRS), and Demodulation Reference Signal (DM RS)), and a Physical Uplink Control CHannel (PUCCH). The channel means a medium used in transmission of signals. A channel used in a physical layer is called a physical channel, whereas a channel used in a Medium Access Control (MAC) layer is called a logical channel.

Further, the present invention may be applied to a communication system of a case, for example, where cooperative communication is applied to the downlink, and of a case, for example, where transmission of a plurality of antennas is applied to the downlink, and for simplicity of explanation, although a case where cooperative communication is not applied to the uplink and a case where transmission of a plurality of antennas is not applied to the uplink have been described, the present invention is not limited to such cases.

The PDSCH is a physical channel used in transmission and reception of data and control information of the downlink (different from the control information transmitted on the PDCCH). The PDCCH is a physical channel used in transmission and reception of control information of the downlink (different from the control information transmitted on the PDSCH). The PUSCH is a physical channel used in transmission and reception of data and control information of the uplink (different from the control information transmitted in the downlink). The PUCCH is a physical channel used in transmission and reception of control information of the uplink (Uplink Control Information (UCI)). As the types of the UCI, a reception confirmation acknowledgement (ACK/NACK) indicating an ACKnowledgement (ACK) or a Negative ACKnowledgement (NACK) for the data of the downlink of PDSCH, a Scheduling request (SR) indicating whether the allocation of a resource is requested or not, and the like are used. As the types of other physical channels, a Synchronization CHannel (SCH) used for synchronization establishment of the uplink, a Physical Random Access CHannel (PRACH) used for synchronization establishment of the uplink, a Physical Broadcast CHannel (PBCH) used in transmission of system information (also referred to as a System Information Block (SIB)) of the downlink, and the like are used. Further, the PDSCH is used in transmission of system information of the downlink.

The mobile station apparatus 5, the base station apparatus 3, or the RRH 4 map signals generated from control information, data and the like on respective physical channels to transmit the signals. Data transmit on the PDSCH or the PUSCH is referred to as a transport block. Further, areas controlled by the base station apparatus 3 or the RRH 4 are referred to as cells.

<Configuration of Downlink Time Frame>

Figure 10:
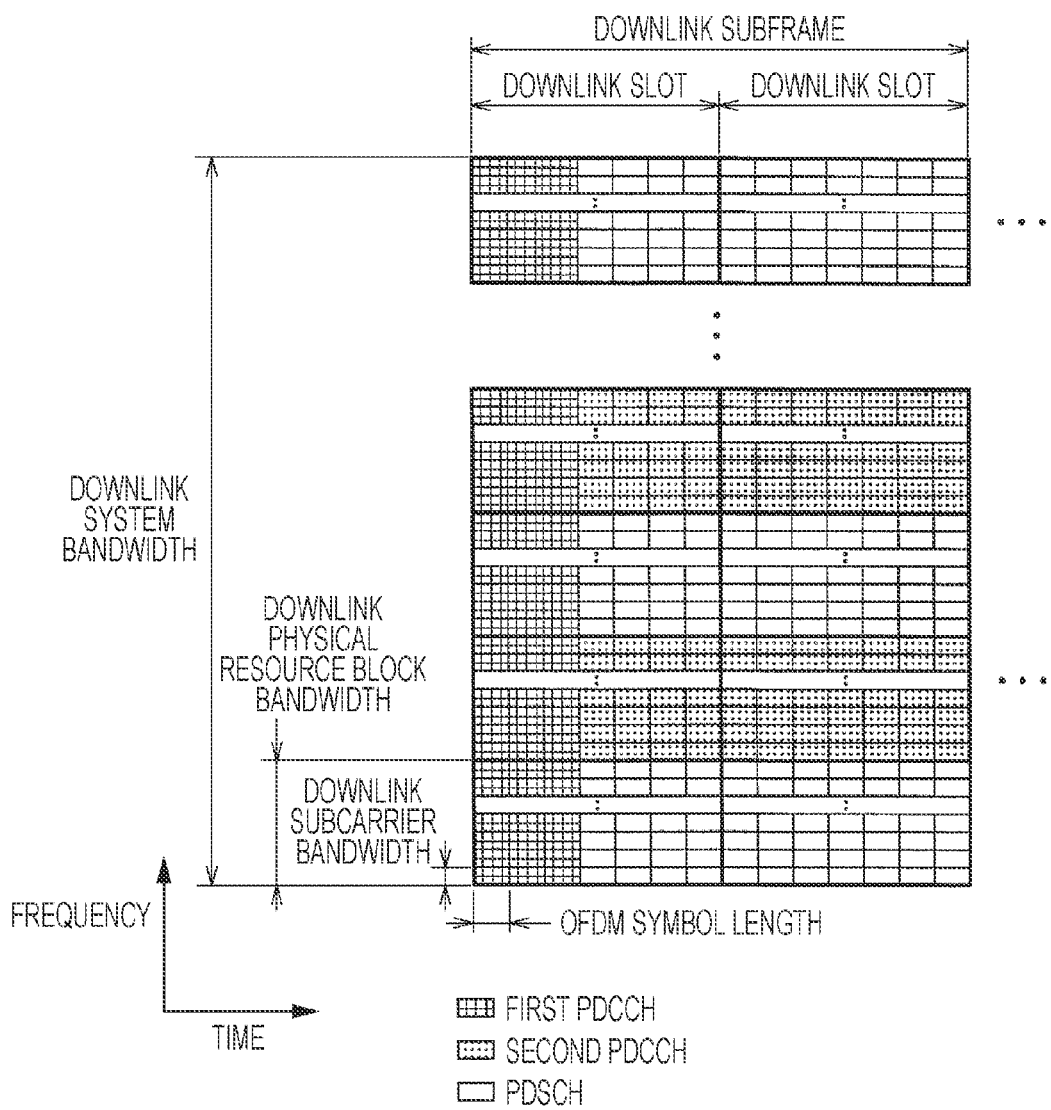
FIG. 10 is a diagram showing a schematic configuration of a time frame of a downlink from the base station apparatus 3 or the RRH 4 to the mobile station apparatus 5, according to the embodiment of the present invention.

FIG. 10 is a diagram showing a schematic configuration of a time frame of a downlink from the base station apparatus 3 or the RRH 4 to the mobile station apparatus 5, according to the embodiment of the present invention. In FIG. 10, the horizontal axis represents a time domain and the vertical axis represents a frequency domain. The downlink time frame is a unit of allocation of resources and the like, and includes a pair (also referred to as Physical Resource Block pair (PRB pair)) of Resource Blocks (RB) (also referred to as a Physical Resource Block (PRB)) composed of a frequency band and a time band having a predetermined width of the downlink. One downlink PRB pair (also referred to as a DownLink Physical Resource Block pair (DL PRB pair)) includes two continuous PRBs in the downlink time domain (also referred to as a DownLink Physical Resource Block (DL PRB)).

Further, in FIG. 10, one DL PRB includes 12 subcarriers (also referred to as a downlink subcarrier) in the downlink frequency domain and seven Orthogonal Frequency Division Multiplexing (OFDM) symbols in the time domain. The downlink system band (referred to as a downlink system band) is a downlink communication band of the base station apparatus 3 or the RRH 4. For example, the downlink system bandwidth (referred to as a downlink system bandwidth) includes a frequency bandwidth of 20 MHz.

In addition, a plurality of DL PRBs are arranged according to the downlink system bandwidth in the downlink system band. For example, the downlink system band of the frequency bandwidth of 20 MHz includes 110 DL PRBs.

Further, in the time domain shown in FIG. 10, there are a slot including 7 OFDM symbols (also referred to as a downlink slot), and a subframe including 2 downlink slots (also referred to as a downlink subframe). In addition, a unit including one downlink subcarrier and one OFDM symbol is referred to as a Resource Element (RE) (downlink resource element). At least the PDSCH used in transmission of information data (referred to as a Transport Block) and the first PDCCH and the second PDCCH which are used in transmission of control information for the PDSCH are mapped in respective downlink subframes. In FIG. 10, the first PDCCH includes the first to third OFDM symbols of the downlink subframe, and the PDSCH and the second PDCCH include the fourth to 14th OFDM symbols of the downlink subframe. In addition, the PDSCH and the second PDCCH are mapped in different DL PRBs. In addition, the number of OFDM symbols configuring the first PDCCH and the number of OFDM symbols configuring the PDSCH and the second PDCCH may vary on respective downlink subframes. In addition, the number of OFDM symbols configuring the second PDCCH may be fixed. For example, irrespective of the number of OFDM symbols configuring the first PDCCH, and the number of OFDM symbols configuring the PDSCH, the second PDCCH may include the fourth to 14th OFDM symbols of the downlink subframe.

Although it is not shown in FIG. 10, the downlink pilot channel used in transmission of the Reference signal (RS) of the downlink (also referred to as a downlink reference signal) is distributed and mapped in a plurality of the downlink resource elements. Here, the downlink reference signal includes the first type of reference signal, the second type of reference signal, and the third type of reference signal which are of at least different types. For example, the downlink reference signal is used in estimation of the channel change of the PDSCH and the PDCCH (first PDCCH and second PDCCH). The first type of reference signal is used in demodulation of the PDSCH and the first PDCCH and is referred to as a Cell specific RS (CRS). The second type of reference signal is used in demodulation of the PDSCH and the second PDCCH and is also referred to as a UE-specific RS. For example, the third type of reference signal is used only in estimation of the channel change, and is also referred to as a Channel State Information RS (CSI-RS). The downlink reference signal is a known signal in the communication system 1. In addition, the number of the downlink resource elements configuring the downlink reference signal may depend on the number of transmit antennas (antenna ports) used in the base station apparatus 3 and the RRH 4 for communication to the mobile station apparatus 5. In the following description, a case where the CRS, the CSI-RS, and the UE-specific RS are respectively used as the first type of reference signal, the second type of reference signal and the third type of reference signal will be described. In addition, the UE-specific RS may be used in the demodulation of a PDSCH to which cooperative communication is applied and a PDSCH to which cooperative communication is not applied. In addition, the UE-specific RS may be used in the demodulation of a second PDCCH to which cooperative communication (pre-coding process) is applied and a second PDCCH to which cooperative communication is not applied.

Signals generated from the control information such as information indicating the allocation of the DL PRB to the PDSCH, information indicating the allocation of the UL PRB to the PUSCH, and information indicating a mobile station identifier (also referred to as a Radio Network Temporary Identifier (RNTI)), a modulation scheme, a coding rate, a retransmission parameter, a spatial multiplexing number, a pre-coding matrix, and a Transmission Power Control command (TPC command) are mapped in the PDCCH (the first PDCCH or the second PDCCH). The control information included in the PDCCH is referred to as Downlink Control Information (DCI). The DCI including information indicating allocation of DL PRB to the PDSCH is referred to as a DownLink assignment (DL assignment) or downlink grant, and the DCI including information indicating allocation of UL PRB to the PUSCH is referred to as an UpLink grant (UL grant). In addition, the downlink assignment includes a transmission power control command for the PUCCH. In addition, the uplink assignment includes a transmission power control command for the PUSCH. In addition, one PDCCH includes only information indicating allocation of one PDSCH resource or information indicating allocation of one PUSCH resource, and does not include information indicating allocation of resources of a plurality of PDSCHs or information indicating allocation of resources of a plurality of PUSCHs.

Further, as information transmitted on the PDCCH, there is a Cyclic Redundancy Check (CRC) code. A relationship between the DCI, the RNTI, and CRC which are transmitted on the PDCCH will be described in detail. The CRC code is generated from the DCI using a predetermined generating polynomial. A process of an exclusive OR (also referred to as a scrambling) is performed on the generated CRC code using RNTI. The signals obtained by modulating a bit indicating the DCI and a bit (also referred to as a CRC masked by UE ID) generated by performing a process of the exclusive OR on the CRC code using RNTI are actually transmitted on the PDCCH.

The PDSCH resource is allocated in the same downlink subframe as the downlink subframe to which the PDCCH resource including the downlink assignment used in the allocation of the PDSCH resource is allocated, in the time domain.

Figure 11:
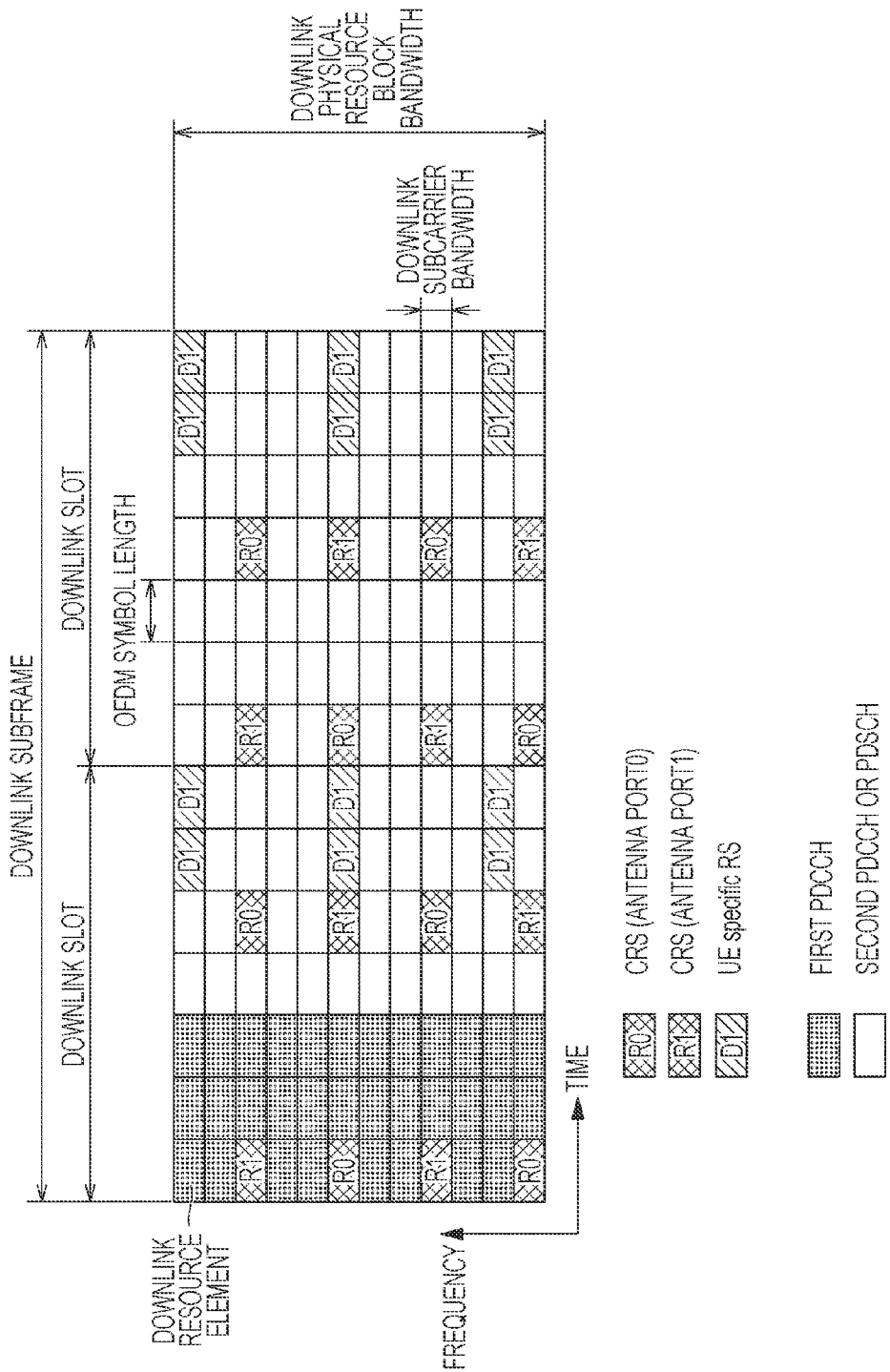
FIG. 11 is a diagram showing an example of an arrangement of the downlink reference signals within a downlink subframe of a communication system 1 according to an embodiment of the present invention.

The arrangement of the downlink reference signal will be described. FIG. 11 is a diagram of an example of an arrangement of the downlink reference signals within the downlink subframe of the communication system 1 according to an embodiment of the present invention. For simplicity of description, although the arrangement of the downlink reference signals within one PRB pair is described in FIG. 11, a common arrangement method is basically used in all PRB pairs within the downlink system band.

Among shaded downlink resource elements, R0 to R1 indicate the CRSs of antenna ports 0 and 1, respectively. Here, the antenna port means a logical antenna used in a signal process, and one antenna port may include a plurality of physical antennas. The plurality of physical antennas configuring the same antenna port transmit the same signal. Although delay diversity or Cyclic Delay Diversity (CDD) may be applied using the plurality of physical antennas in the same antenna port, other signal processes may not be used. Here, although FIG. 11 shows the case where the CRSs correspond to two antenna ports, the communication system of the present embodiment may correspond to different numbers of antenna ports, for example, CRSs for one antenna port and four antenna ports may be mapped to downlink resources. The CRSs are mapped within all DL PRBs in the downlink system band.

Among shaded downlink resource elements, D1 indicates a UE-specific RS. When the UE-specific RS is transmitted using a plurality of antenna ports, different codes are used in respective antenna ports. That is, Code Division Multiplexing (CDM) is applied to the UE-specific RS. Here, with respect to the UE-specific RS, the length of code used in the CDM and/or the number of the downlink resource elements to be mapped vary depending on the type (the number of antenna ports) of the signal process used in the control signal or the data signal mapped to the PRB pair. For example, when the number of antenna ports used in the transmission of the UE-specific RS in the base station apparatus 3 and the RRH 4 is two, the UE-specific RS is multiplexed and mapped, using a code of which the code-length is two, by taking as a unit (a unit of CDM), two downlink resource elements in continuous time domains (OFDM symbol) in the same frequency domain (subcarrier). In other words, in this case, CDM is applied to the multiplexing of the UE-specific RS. For example, when the number of antenna ports used in the transmission of the UE-specific RS in the base station apparatus 3 and the RRH 4 is four, the number of the downlink resource elements to which the UE-specific RS is mapped is changed to double, and the UE-specific RS is multiplexed to and mapped in different downlink resource elements for every two antenna ports. In other words, in this case, CDM and Frequency Division Multiplexing (FDM) are applied to the multiplexing of the UE-specific RS. For example, when the number of antenna ports used in the transmission of the UE-specific RS in the base station apparatus 3 and the RRH 4 is eight, the number of the downlink resource elements to which the UE-specific RS is mapped is changed to double, and the UE-specific RS is multiplexed and mapped by using a code of which the code-length is four and by taking four downlink resource elements as a unit. In other words, in this case, CDMs of different code-lengths are applied to the multiplexing of the UE-specific RS.

Further, in the UE-specific RS, a scramble code is further superimposed on the code of each antenna port. The scramble code is generated based on the cell ID and the scramble ID, which are notified from the base station apparatus 3 and the RRH 4. For example, the scramble code is generated from the pseudo-random sequence generated based on the cell ID and the scramble ID, which are notified from the base station apparatus 3 and the RRH 4. For example, the scramble ID is a value indicating 0 or 1. Further, the used scramble ID and the used antenna port are subjected to a Joint coding, and thus it is also possible to index the information indicating them. The UE-specific RS is mapped within the DL PRB of the PDSCH and the second PDCCH allocated to the mobile station apparatus 5 which is configured to use the UE-specific RS.

Further, in the base station apparatus 3 and the RRH 4, the CRS may be allocated to different downlink resource elements, or the CRS may be allocated to the same downlink resource element. When the cell IDs notified from the base station apparatus 3 and the RRH 4 are different, the CRS may be allocated to different downlink resource elements. In a separate example, only base station apparatus 3 allocates the CRS to some downlink resource elements, the RRH 4 may not allocate the CRS to any downlink resource element. When the cell ID is notified only from the base station apparatus 3, as described above, the CRS may be allocated. In a separate example, the base station apparatus 3 and the RRH 4 may allocate the CRS to the same downlink resource element, and the base station apparatus 3 and the RRH 4 may transmit the same sequence. When the cell ID notified from the base station apparatus 3 and the RRH 4 is the same, as described above, the CRS may be allocated.

Figure 12:
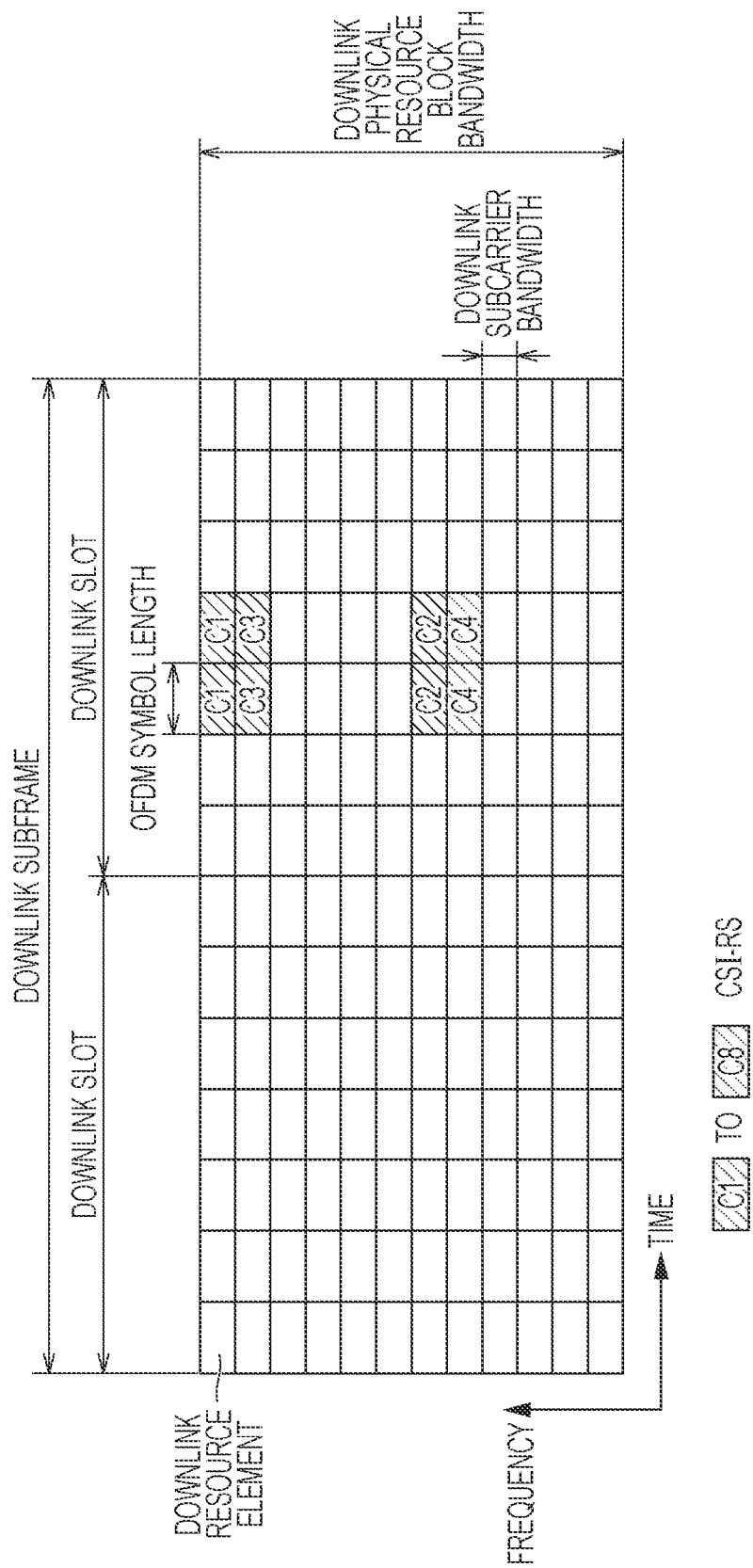
FIG. 12 is a diagram showing a DL PRB pair to which a Channel State Information-Reference Signal (CSI-RS) for eight antenna ports are mapped.

FIG. 12 is a diagram showing DL PRB pairs to which Channel State Information-Reference Signals (CSI-RS) for eight antenna ports are mapped. FIG. 12 shows a case where the CSI-RSs are mapped when the number (the number of CSI ports) of antenna ports used in the base station apparatus 3 and the RRH 4 is eight. In addition, in FIG. 12, the descriptions about the CRS, the UE-specific RS, the PDCCH, the PDSCH, and the like are omitted for simplicity of explanation.

The orthogonal codes (Walsh code) of two chips are used in each CDM groups, a CSI port (port of CSI-RS (antenna port, resource grid)) is allocated to each orthogonal code, and the CSI-RS is code division multiplexed for each two CSI port. Further, each CDM groups is frequency division multiplexed. By using four CDM groups, the CSI-RSs of eight antenna ports of the CSI ports 1 to 8 (antenna ports 15 to 22) are mapped. For example, in the CDM group C1 of the CSI-RS, the CSI-RSs of the CSI ports 1 and 2 (antenna ports 15 and 16) are code division multiplexed and mapped. In the CDM group C2 of the CSI-RS, the CSI-RSs of the CSI ports 3 and 4 (antenna ports 17 and 18) are code division multiplexed and mapped. In the CDM group C3 of the CSI-RS, the CSI-RSs of the CSI ports 5 and 6 (antenna ports 19 and 20) are code division multiplexed and mapped. In the CDM group C4 of the CSI-RS, the CSI-RSs of the CSI ports 7 and 8 (antenna ports 21 and 22) are code division multiplexed and mapped.

When the number of antenna ports of the CSI-RS of the base station apparatus 3 and the RRH 4 is eight, the base station apparatus 3 and the RRH 4 can make the number (the number of ranks and a spatial multiplexing number) of layers applied to the PDSCH to eight as a maximum. Further, the base station apparatus 3 and the RRH 4 can transmit the CSI-RS when the number of antenna ports of the CSI-RS is 1, 2 or 4. The base station apparatus 3 and the RRH 4 can transmit the CSI-RS for one antenna port or two antenna ports, using the CDM group C1 of the CSI-RS shown in FIG. 12. The base station apparatus 3 and the RRH 4 can transmit the CSI-RS for four antenna ports, using the CDM groups C1 and C2 of the CSI-RS shown in FIG. 12.

Further, the base station apparatus 3 and the RRH 4 may allocate the CSI-RSs to different downlink resource elements, respectively, or may allocate the signal of CSI-RS to the same downlink resource element. For example, the base station apparatus 3 and the RRH 4 may allocate different downlink resource elements and/or different signal sequences to the CSI-RS, respectively. In the mobile station apparatus 5, the CSI-RS transmitted from the base station apparatus 3 and the CSI-RS transmitted from the RRH 4 are recognized as the CSI-RSs respectively corresponding to different antenna ports. For example, the base station apparatus and the RRH 4 may allocate the same downlink resource element to the CSI-RS, and the same sequence may be transmitted from the base station apparatus 3 and the RRH 4.

The configuration of the CSI-RS (CSI-RS-Config-r10) is notified from the base station apparatus 3 and the RRH 4 to the mobile station apparatus 5. The configuration of the CSI-RS includes at least information (antennaPortsCount-r10) indicating the number of antenna ports which are configured in the CSI-RS, information (subframeConfig-r10) indicating downlink subframes in which the CSI-RS is mapped, and information (ResourceConfig-r10) indicating the frequency domain in which the CSI-RS is mapped. The number of antenna ports of the CSI-RS may be, for example, any value of 1, 2, 4, and 8. As information indicating a frequency domain to which the CSI-RS is mapped, an index indicating a position of the first resource element among resource elements in which the CSI-RS corresponding to the antenna port 15 (CSI port 1) is used. If the position of the CSI-RS corresponding to the antenna port 15 is decided, the CSI-RSs corresponding to other antenna ports are uniquely decided based on the predetermined rule. As information indicating a downlink subframe in which the CSI-RS is mapped, the position and the period of the downlink subframe in which the CSI-RS is mapped are indicated by an index. For example, if the index of the subframeConfig-r10 is 5, the index indicates that the CSI-RS is mapped at every 10 subframes and the CSI-RS is mapped in the subframe 0 (the subframe number in the radio frame) among radio frames taking 10 subframes as a unit. Further, in a separate example, for example, if the index of the subframeConfig-r10 is 1, the index indicates that the CSI-RS is mapped at every five subframes and the CSI-RS is mapped in the subframes 1 and 6 among radio frames taking 10 subframes as a unit.

<Configuration of Uplink Time Frame>

Figure 13:
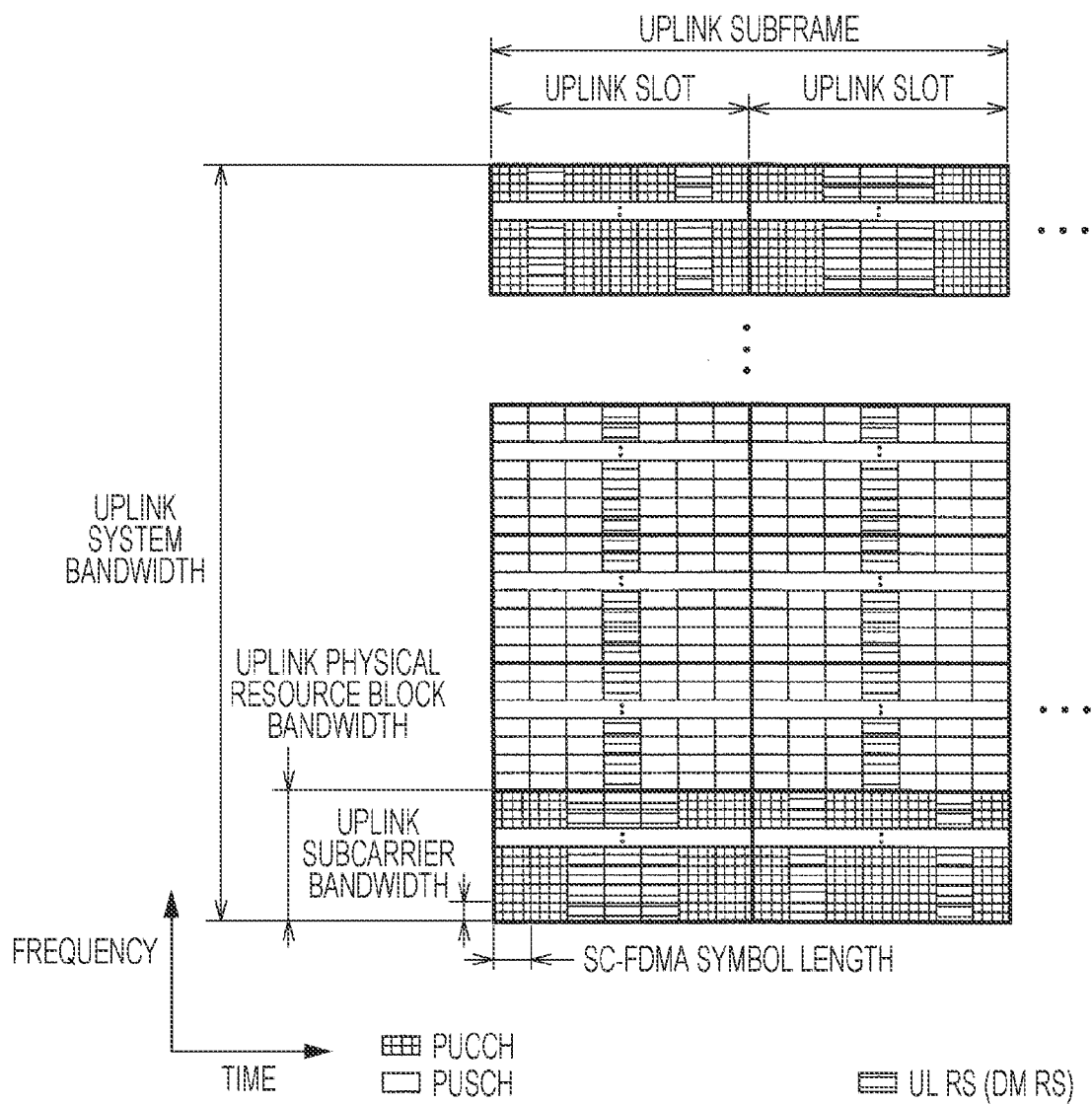
FIG. 13 is a diagram showing a schematic configuration of a time frame of an uplink from the mobile station apparatus 5 to the base station apparatus 3 and the RRH 4, according to the embodiment of the present invention.

FIG. 13 is a diagram showing a schematic configuration of the uplink time frame from the mobile station apparatus 5 to the base station apparatus 3 and the RRH 4, according to the embodiment of the present invention. In FIG. 13, the horizontal axis represents a time domain and the vertical axis represents a frequency domain. The uplink time frame is a unit of allocation of a resource and the like, and includes pairs (also referred to as an UpLink Physical Resource Block pair (UL PRB pair)) of Physical Resource Blocks (RB) (PRB) composed of the frequency band and the time band of a predetermined width of the uplink. One UL PRB pair includes two continuous uplink PRBs in the uplink time domain (also referred to as an UpLink Physical Resource Block (UL PRB)).

Further, in FIG. 13, one UL PRB includes 12 subcarriers in the uplink frequency domain (also referred to as an uplink subcarrier) and seven Single-Carrier Frequency Division Multiple access (SC-FDMA) symbols in the time domain. A system band of the uplink (referred to as an uplink system band) is uplink communication bands of the base station apparatus 3 and the RRH 4. For example, a system bandwidth of the uplink (referred to as an uplink system bandwidth) includes a frequency bandwidth of 20 MHz.

In addition, a plurality of UL PRBs are arranged in the uplink system band according to the uplink system bandwidth. For example, the uplink system band of a frequency bandwidth of 20 MHz includes 110 UL PRBs. Further, in the time domain shown in FIG. 13, there are a slot (referred to as an uplink slot) including seven SC-FDMA symbols, and a subframe (referred to as an uplink subframe) including two uplink slots. In addition, a unit including one uplink subcarrier and one SC-FDMA symbol is referred to as a resource element (referred to as an uplink resource element).

The PUSCH used in transmission of at least information data, the PUCCH used in transmission of the uplink Control Information (UCI), and the UL RS(DM RS) for demodulation (channel change estimation) of the PUSCH and the PUCCH are mapped in each uplink subframe. Further, although not shown, the PRACH used for synchronization establishment of the uplink is mapped in any uplink subframe. Further, although not shown, the UL RS (SRS) used in measurement of channel quality and synchronization deviation, and the like is mapped in any uplink subframe. The PUCCH is used for transmitting a UCI (ACK/NACK) indicating Acknowledgement (ACK) or Negative Acknowledgement (NACK) for data received using the PDSCH, a UCI (SR: Scheduling Request) indicating at least whether a request for the uplink resource allocation is made or not, and a UCI (CQI: Channel Quality Indicator) indicating reception quality of the downlink (also referred to as channel quality).

In addition, when the mobile station apparatus 5 indicates to the base station apparatus 3 that it makes a request for uplink resource allocation, the mobile station apparatus 5 transmits signals on the PUCCH for transmission of the SR. The base station apparatus 3 recognizes that the mobile station apparatus 5 makes a request for the uplink resource allocation, from the result in which signals are detected on the PUCCH resource for transmission of the SR. When the mobile station apparatus 5 indicates to the base station apparatus 3 that it does not make a request for uplink resource allocation, the mobile station apparatus 5 does not transmit any signals on the PUCCH resource for transmission of the pre-allocated SR. The base station apparatus 3 recognizes that the mobile station apparatus 5 does not make a request for the uplink resource allocation, from the result in which signals are not detected on the PUCCH resource for transmission of the SR.

Further, different types of signal configurations are used in the PUCCH in a case where the UCI composed of ACK/NACK is transmitted, a case where the UCI composed of the SR is transmitted, and a case where the UCI composed of the CQI is transmitted. The PUCCH used in the transmission of the ACK/NACK is referred to as a PUCCH format 1a or a PUCCH format 1b. In the PUCCH format 1a, Binary Phase Shift Keying (BPSK) is used as a modulation scheme of modulating information regarding the ACK/NACK. In the PUCCH format 1a, one bit of information is presented from a modulation signal. In the PUCCH format 1b, Quadrature Phase Shift Keying (QPSK) is used as a modulation scheme of modulating information regarding the ACK/NACK. In the PUCCH format 1b, two bits of information are presented from a modulation signal. The PUCCH used in the transmission of the SR is referred to as a PUCCH format 1. The PUCCH used in the transmission of CQI is referred to as a PUCCH format 2. The PUCCH used in the simultaneous transmission of the CQI and the ACK/NACK is referred to as a PUCCH format 2a or a PUCCH format 2b. In the PUCCH format 2b, a reference signal (DM RS) of an uplink pilot channel is multiplied by a modulation signal generated from the ACK/NACK information. In the PUCCH format 2a, one bit of information regarding the ACK/NACK and information of CQI are transmitted. In the PUCCH format 2b, two-bit information regarding the ACK/NACK and information of CQI are transmitted.

In addition, one PUSCH includes one or more UL PRBs. One PUCCH is in a symmetrical relationship with the frequency domain in the uplink system band, and includes two UL PRBs located in different uplink slots. One PRACH includes six UL PRB pairs. For example, in FIG. 13, one UL PRB pair used in the PUCCH includes the UL PRB having the lowest frequency in the first uplink slot and the UL PRB having the highest frequency in the second uplink slot within the uplink subframe. Further, if it is configured such that simultaneous transmission of the PUSCH and the PUCCH is not performed, when the PUCCH resource and the PUSCH resource are allocated in the same uplink subframe, the mobile station apparatus 5 transmits signals using only the PUSCH resource. Furthermore, if it is configured such that simultaneous transmission of the PUSCH and the PUCCH is performed, when the PUCCH resource and the PUSCH resource are allocated in the same uplink subframe, the mobile station apparatus 5 may transmit signals using both the PUCCH resource and the PUSCH resource, basically.

The UL RS is a signal used in the uplink pilot channel. The UL RS includes a DeModulation Reference Signal (DM RS) used in the estimation of the channel change of the PUSCH and the PUCCH and a Sounding Reference Signal (SRS) used in the measurement of the channel quality for frequency scheduling and the adaptive modulation of the PUSCH of the base station apparatus 3 and the RRH 4 and the measurement of the synchronization deviation between the base station apparatus 3, the RRH 4 and the mobile station apparatus 5. In addition, for simplicity of explanation, the SRS is not shown in FIG. 13. When the DM RS is mapped in the same UL PRB as in the PUSCH and is mapped in the same UL PRB as in the PUCCH, the DM RS is mapped in different SC-FDMA symbols. The DM RS which is used in the estimation of the channel change of the PUSCH and the PUCCH is a known signal in the communication system 1.

When the DM RS is mapped in the same UL PRB as the PUSCH, it is mapped in the fourth SC-FDMA symbol within the uplink slot. When the DM RS is mapped within the same UL PRB as the PUCCH including ACK/NACK, it is mapped in the third, fourth and fifth SC-FDMA symbols within the uplink slot. When the DM RS is mapped in the same UL PRB as the PUCCH including the SR, it is mapped in the third, fourth and fifth SC-FDMA symbols within the uplink slot. When the DM RS is mapped within the same UL PRB as the PUCCH including the CQI, it is mapped in the second and sixth SC-FDMA symbols within the uplink slot.

The SRS is mapped within the UL PRB decided by the base station apparatus 3, and mapped in the 14th SC-FDMA symbol within the uplink subframe (the seventh SC-FDMA symbol of the second uplink slot in the uplink subframe). The SRS may be mapped only in the uplink subframe in the cell of a period decided by the base station apparatus 3 (also referred to as a Sounding Reference Signal subframe (SRS subframe)). The base station apparatus 3 allocates a period of transmitting a SRS for every mobile station apparatus 5 and UL PRB allocated to the SRS in the SRS subframe.

Although FIG. 13 shows a case where the PUCCHs are mapped in the UL PRB nearest the edge in the frequency domain of the uplink system band, the second and third UL PRBs from the edge of the uplink system band may be used for the PUCCH.

In addition, a code multiplexing in the frequency domain and a code multiplexing in the time domain are used in the PUCCH. The code multiplexing in the frequency domain is processed by multiplying a modulation signal obtained through modulation of the uplink control information and each code of a code sequence in a unit of a subcarrier. The code multiplexing in the time domain is processed by multiplying a modulation signal obtained through modulation of the uplink control information by each code of a code sequence in a unit of a SC-FDMA symbol. A plurality of PUCCHs are mapped in the same UL PRB, different codes are allocated to respective PUCCHs, and the code multiplexing in the frequency domain or the time domain is realized by the allocated codes. The code multiplexing in the frequency domain and the time domain is used in the PUCCH (referred to as a PUCCH format 1a or a PUCCH format 1b) used for transmitting an ACK/NACK. The code multiplexing in the frequency domain and the time domain is used in the PUCCH (referred to as the PUCCH format 1) used for transmitting the SR. The code multiplexing in the frequency domain is used in the PUCCH (referred to as a PUCCH format 2, a PUCCH format 2a or a PUCCH format 2b) used for transmitting the CQI. In addition, for simplicity of explanation, the description of the contents related to the code multiplexing of the PUCCH will be appropriately omitted.

In the time domain, the resource of the PUSCH is allocated in the uplink subframe located after a predetermined number (for example, four) from the downlink subframe in which the resource of PDCCH including the uplink grant used in the allocation of the resource of the PUSCH is allocated.

In the time domain, the resource of the PDSCH is allocated in the same downlink subframe as the downlink subframe in which the resource of PDCCH including the downlink assignment used in the allocation of the resource of the PDSCH is allocated.

<Configuration of First PDCCH>

The first PDCCH includes a plurality of Control Channel Elements (CCE). The number of CCEs used in each downlink system band depends on the downlink system bandwidth, the number of OFDM symbols configuring the first PDCCH, and the number of the downlink reference signals of the downlink pilot channel according to the number of the transmit antennas of the base station apparatus 3 (or the RRH 4) used in the communication. As described below, the CCE includes a plurality of the downlink resource elements.

Figure 14:
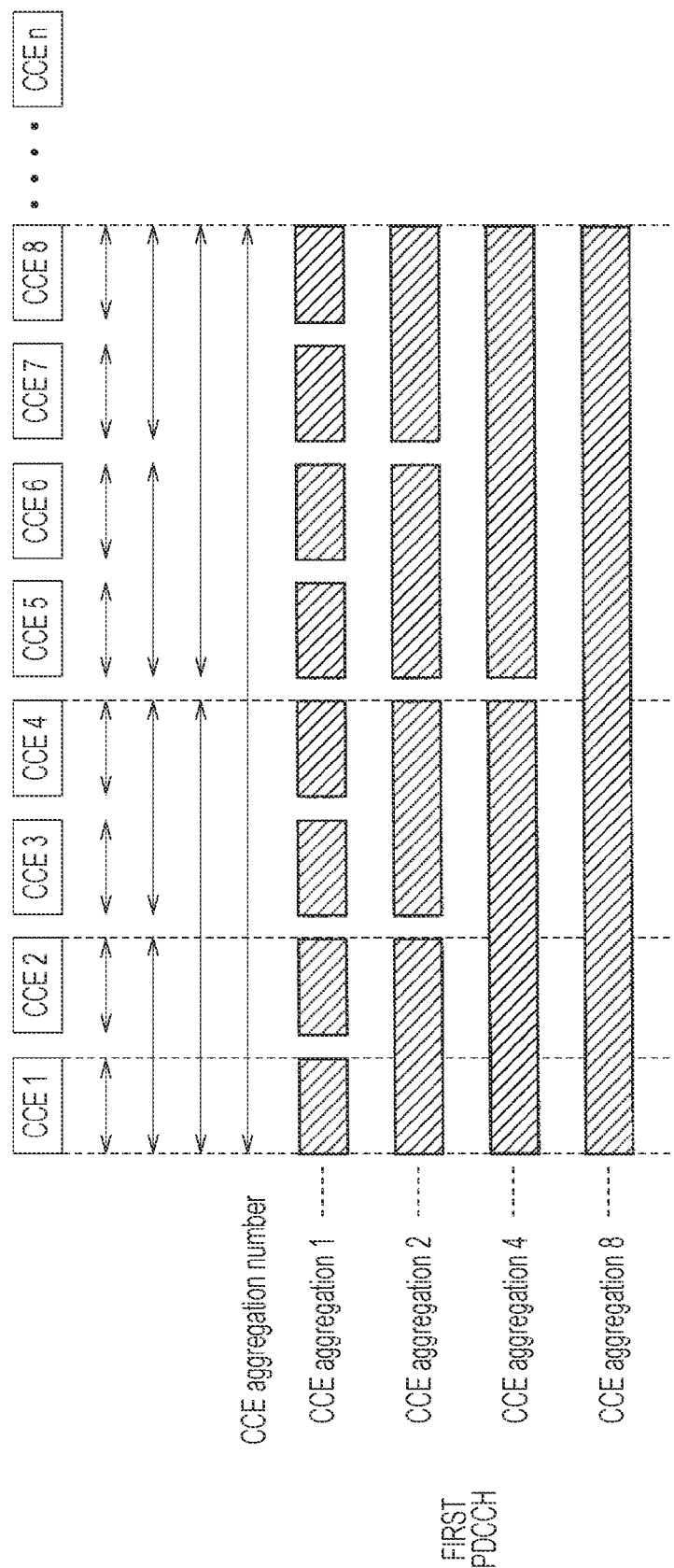
FIG. 14 is a diagram illustrating a logical relationship between a first PDCCH and a CCE of the communication system 1 according to the embodiment of the present invention.

FIG. 14 is a diagram illustrating a logical relationship between the first PDCCH and the CCE in the communication system 1 according to the embodiment of the present invention. The numbers for identifying CCEs are given to the CCEs used between the base station apparatus 3 (or the RRH 4) and the mobile station apparatus 5. The CCE numbering is performed on the basis of a predetermined rule. Here, CCEt indicates the CCE of the CCE number t. The first PDCCH includes an aggregation formed of a plurality of CCEs (CCE aggregation). Hereinafter, the number of CCEs configuring an aggregation is referred to as CCE aggregation number". The CCE aggregation number configuring the first PDCCH is configured according to a coding rate which is configured in the first PDCCH and the number of bits of the DCI included in the first PDCCH by the base station apparatus 3. Further, hereinafter, the aggregation including n CCEs is referred to as CCE aggregation n".

For example, the base station apparatus 3 configures the first PDCCH with one CCE (CCE aggregation 1), configures the first PDCCH with two CCEs (CCE aggregation 2), configures the first PDCCH with four CCEs (CCE aggregation 4), and configures the first PDCCH with eight CCEs (CCE aggregation 8). For example, the base station apparatus 3 uses the CCE aggregation number having a small number of CCEs for use in configuring the first PDCCH for the mobile station apparatus 3 having a good channel quality, and uses the CCE aggregation number having a great number of CCEs for use in configuring the first PDCCH for the mobile station apparatus 3 having a bad channel quality. Further, for example, when the base station apparatus 3 transmits a small number of bits of DCI, the base station apparatus 3 uses the CCE aggregation number having a small number of CCEs for use in configuring the first PDCCH, and when the base station apparatus 3 transmits a great number of bits of DCI, the base station apparatus 3 uses the CCE aggregation number having a great number of CCEs for use in configuring the first PDCCH.

In FIG. 14, those represented by the diagonal lines mean first PDCCH candidates. The first PDCCH candidates are to be subjected to decoding detection of the first PDCCH by the mobile station apparatus 5, and the first PDCCH candidates are configured independently for each CCE aggregation number. The first PDCCH candidates configured for each CCE aggregation number respectively include different one or more CCEs. The number of the first PDCCH candidates is configured independently for each CCE aggregation number. The first PDCCH candidates configured for each CCE aggregation number include continuous numbers of CCEs. The mobile station apparatus 5 performs decoding detection of the first PDCCH on the first PDCCH candidates of the number which is configured for each CCE aggregation number. In addition, when the mobile station apparatus 5 determines that the first PDCCH addressed thereto is detected, the mobile station apparatus 5 may not perform (may stop) the decoding detection of the first PDCCH for some first PDCCH candidates which are configured.

Figure 15:
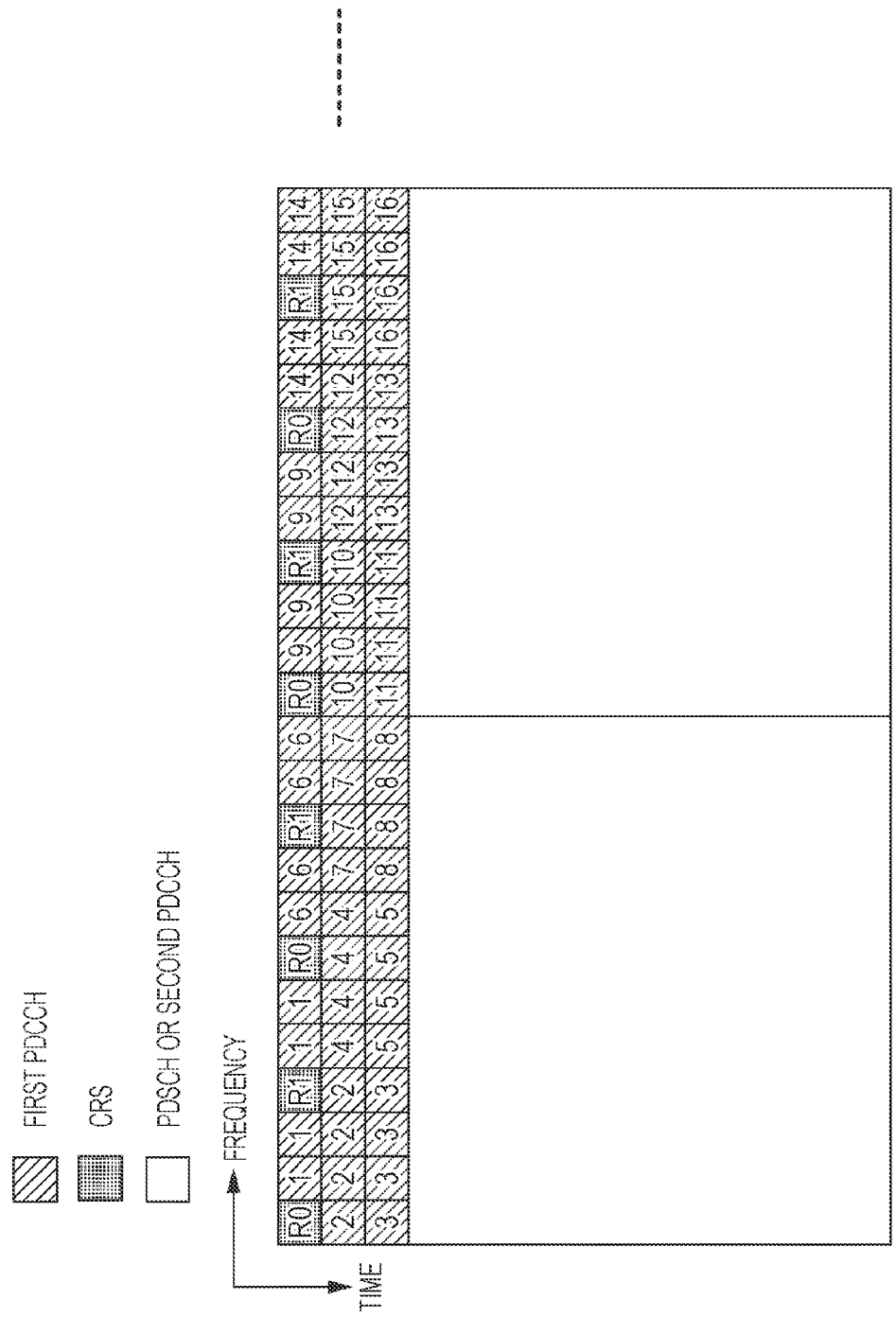
FIG. 15 is a diagram showing an example of an arrangement of a resource element group in a downlink radio frame of the communication system 1 according to the embodiment of the present invention.

A plurality of downlink resource elements configuring the CCE include a plurality of resource element groups (also referred to as a REG, mini-CCE). The resource element group includes a plurality of the downlink resource elements. For example, one resource element group includes four downlink resource elements. FIG. 15 is a diagram showing an example of an arrangement of a resource element group in a downlink radio frame of the communication system 1 according to the embodiment of the present invention. Here, the resource element group used in the first PDCCH is shown, and the portions that are not related (PDSCH, second PDCCH, UE-specific RS, and CSI-RS) are neither shown nor described. Here, a case where the first PDCCH includes the first to third OFDM symbols and the downlink reference signals (R0 and R1) corresponding to the CRS of two transmit antennas (antenna port 0 and antenna port 1) are shown. In FIG. 15, the vertical axis represents a frequency domain and the horizontal axis represents a time domain.

In the arrangement example of FIG. 15, one resource element group includes four contiguous downlink resource elements in the frequency domain. FIG. 15 shows that the downlink resource elements having the same code of the first PDCCH attached therein belong to the same resource element group. In addition, the resource element group is configured while the resource elements R0 (downlink reference signal of the antenna port 0) and R1 (downlink reference signal of the antenna port 1) in which the downlink reference signals are mapped are skipped. FIG. 15 shows that numbering (code 1") is performed from a resource element group of the first OFDM symbols having the lowest frequency, numbering (code 2") is subsequently performed for a resource element group of the second OFDM symbols having the lowest frequency, and numbering (code 3") is subsequently performed for a resource element group of the third OFDM symbols having the lowest frequency. FIG. 15 shows that numbering (code 4") is subsequently performed for a resource element group of the second OFDM symbols, in which the downlink reference signals are not mapped, contiguous to the frequency of the resource element group subjected to the numbering (code 2"), and numbering (code 5") is subsequently performed for a resource element group of the third OFDM symbols, in which the downlink reference signals are not mapped, contiguous to the frequency of the resource element group subjected to the numbering (code 3"). FIG. 15 shows that numbering (code 6") is subsequently performed for a resource element group of the first OFDM symbols contiguous to the frequency of the resource element group subjected to the numbering (code 1"), numbering (code 7") is subsequently performed for a resource element group of the second OFDM symbols contiguous to the frequency of the resource element group subjected to the numbering (code 4"), and numbering (code 8") is subsequently performed for a resource element group of the third OFDM symbols contiguous to the frequency of the resource element group subjected to the numbering (code 5"). The same numbering is performed for the following resource element groups.

The CCE includes a plurality of resource element groups shown in FIG. 15. For example, one CCE includes nine different resource element groups which are distributed in the frequency domain and the time domain. Specifically, in the CCEs used in the first PDCCH, all resource element groups subjected to the numbering as shown in FIG. 15 are subjected to interleaving in units of resource element groups using a block interleaver for all downlink system bands, and one CCE includes nine resource element groups of continuous numbers after being interleaved.

<Configuration of Second PDCCH>

Figure 16:
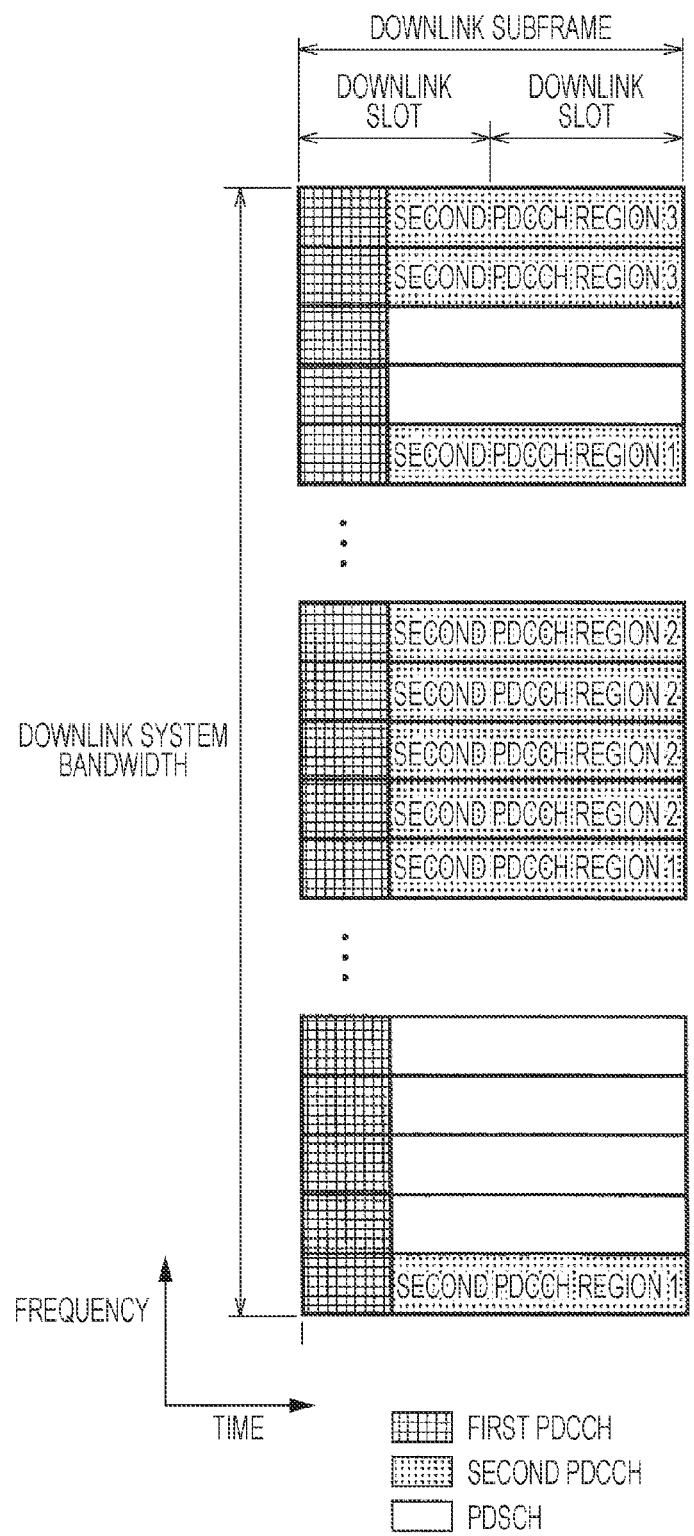
FIG. 16 is a diagram showing an example of a schematic configuration of a region in which the second PDCCH may be arranged in the communication system 1 according to the embodiment of the present invention.

FIG. 16 is a diagram showing an example of a schematic configuration of a region in which the second PDCCH may be arranged (for simplicity of explanation, hereinafter, referred to as a second PDCCH region) in the communication system 1 according to the embodiment of the present invention. The base station apparatus 3 can configure (arrange) a plurality of second PDCCH regions (a second PDCCH region 1, a second PDCCH region 2, and a second PDCCH region 3) within a downlink system band. One second PDCCH region includes one or more PRBs. When one second PDCCH region includes a plurality of PRBs, it may include PRBs which are dispersed in the frequency domain or may include PRBs which are contiguous in the frequency domain. For example, the base station apparatus 3 can configure the second PDCCH regions for each of a plurality of mobile station apparatuses 5.

Different transmission methods are configured in signals to be mapped with respect to respective second PDCCH regions. For example, with respect to a certain second PDCCH region, a pre-coding process based on the channel state is applied to signals to be mapped. For example, the base station apparatus 3 performs a pre-coding process suitable for the mobile station apparatus 5 on the signals, based on the channel state information which is notified from the mobile station apparatus 5. For example, the pre-coding process based on the channel state is not applied to the signals to be mapped, with respect to a certain second PDCCH region. For example, the base station apparatus 3 performs a random pre-coding process on the signals with respect to the mobile station apparatus 5. In the following description, pre-coding process being applied" means pre-coding process based on the channel state of the mobile station apparatus 5 being applied". In the following description, pre-coding process being not applied" means pre-coding process based on the channel state of the mobile station apparatus 5 being not applied". In addition, pre-coding process based on the channel state of the mobile station apparatus 5 being not applied" means random pre-coding process being applied". The random pre-coding process means performing the weighting process (phase rotation process) by randomly selecting different weightings (phase rotation) for respective signals. In addition, in the second PDCCH region in which the pre-coding process is applied to the signals to be mapped, the same pre-coding process is applied to the second PDCCH and the UE-specific RS within the PRB. In addition, in the second PDCCH region in which the pre-coding process is applied to the signals to be mapped, as the pre-coding process which is applied to the second PDCCH and the UE-specific RS, different pre-coding processes (pre-coding vectors to be applied are different) (pre-coding matrix to be applied are different) may be applied.

Figure 17:
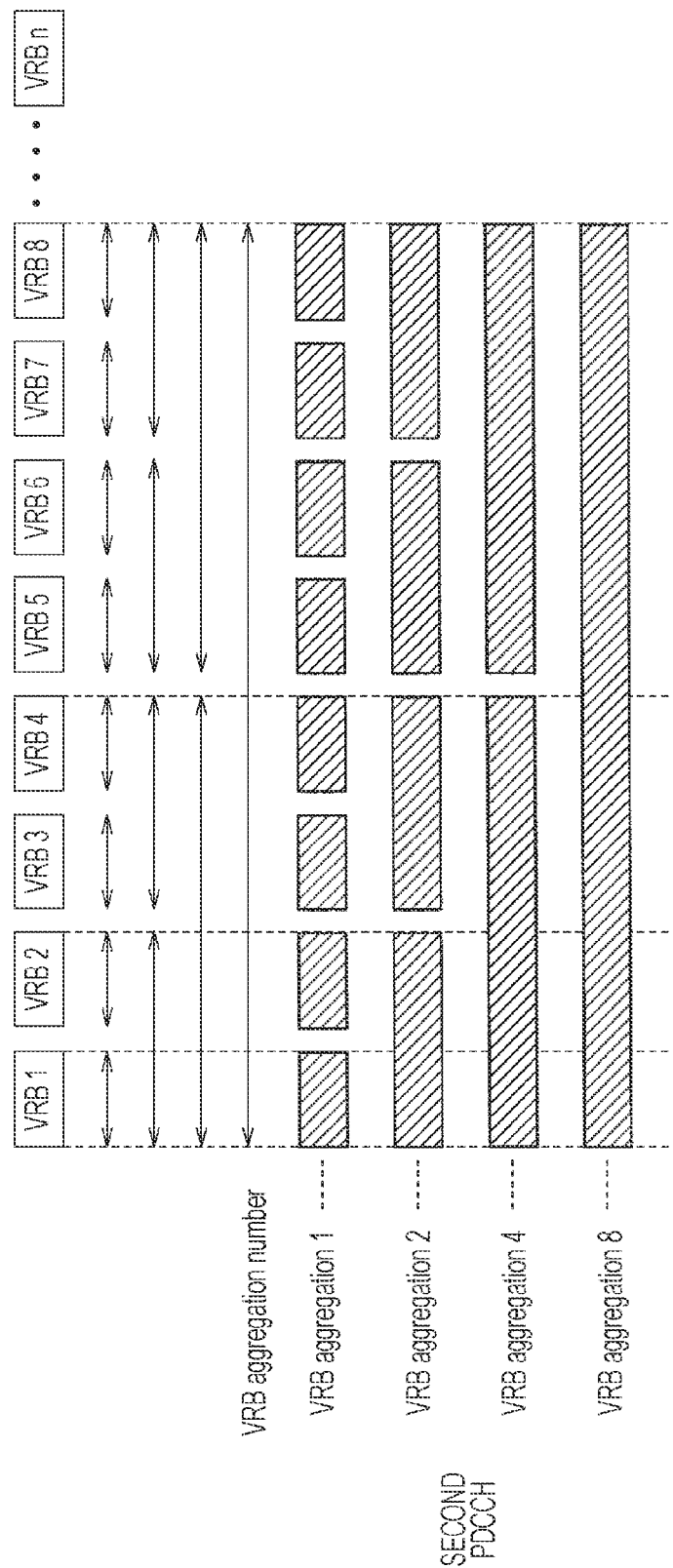
FIG. 17 is a diagram illustrating a logical relationship between the second PDCCH and a VRB of the communication system 1 according to the embodiment of the present invention.

One second PDCCH includes one or more Virtual Resource Blocks (VRB) (first element). FIG. 17 is a diagram illustrating a logical relationship between the second PDCCH and the VRB in the communication system 1 according to the embodiment of the present invention. The numbers for identifying VRBs are given to the VRBs used between the base station apparatus 3 (or the RRH 4) and the mobile station apparatus 5. The VRB numbering is performed based on predetermined rules. Here, VRBt indicates the VRB of the VRB number t. The second PDCCH includes an aggregation composed of a plurality of VRBs (VRB aggregation). Hereinafter, the number of VRBs configuring the aggregation is referred to as VRB aggregation number". For example, the VRB aggregation number configuring the second PDCCH is configured according to a coding rate which is configured in the second PDCCH and the number of bits of the DCI included in the second PDCCH in the base station apparatus 3. Further, hereinafter, the aggregation including n VRBs is referred to as VRB aggregation n".

For example, the base station apparatus 3 configures the second PDCCH with one VRB (VRB aggregation 1), configures the second PDCCH with two VRBs (VRB aggregation 2), configures the second PDCCH with four VRBs (VRB aggregation 4), and configures the second PDCCH with eight VRBs (VRB aggregation 8). For example, the base station apparatus 3 uses the VRB aggregation number having a small number of VRBs for use in configuring the second PDCCH for the mobile station apparatus 3 having a good channel quality, and uses the VRB aggregation number having a great number of VRBs for use in configuring the second PDCCH for the mobile station apparatus 3 having a bad channel quality. Further, for example, when the base station apparatus 3 transmits a DCI having a small number of bits, the base station apparatus 3 uses the VRB aggregation number having a small number of VRBs for use in configuring the second PDCCH, and when the base station apparatus 3 transmits a DCI having a large number of bits, the base station apparatus 3 uses the VRB aggregation number having a great number of VRBs for use in configuring the second PDCCH.

In FIG. 17, those represented by the diagonal lines mean second PDCCH candidates. The second PDCCH candidates are to be subjected to the decoding detection of the second PDCCH by the mobile station apparatus 5, and the second PDCCH candidates are configured independently for each VRB aggregation number. The second PDCCH candidates configured for each VRB aggregation number respectively include different one or more VRBs. The number of the second PDCCH candidates is configured independently for each VRB aggregation number. The second PDCCH candidates configured for each VRB aggregation number include continuous numbers of VRBs. The mobile station apparatus 5 performs decoding detection of the second PDCCH on the second PDCCH candidates of the number which is configured for each VRB aggregation number. In addition, when the mobile station apparatus 5 determines that it detects the second PDCCH addressed thereto, the decoding detection of the second PDCCH may not be performed (may be stopped) for some second PDCCH candidates which are configured.

The number of VRBs configured in the second PDCCH region is the same as the number of PRBs configuring the second PDCCH region. The amount of resources corresponding to one VRB (the number of resource elements) is substantially the same as the amount of resources capable of being used for the signals of the second PDCCH within one PRB (except for downlink reference signal and resource elements used in the first PDCCH). The second PDCCH regions may be configured independently in a first slot and a second slot within a downlink subframe. Further, one second PDCCH region may include a plurality of PRB pairs. In other words, one second PDCCH may include both the resources (PRB) of the first slot and the resources (PRB) of the second slot within the downlink subframe. In addition, in the embodiment of the present invention, for simplicity of explanation, although a case where the second PDCCH region includes a plurality of PRBs of the first slot within the downlink subframe has been mainly described, the present invention is not limited to such a case.

Figure 18:
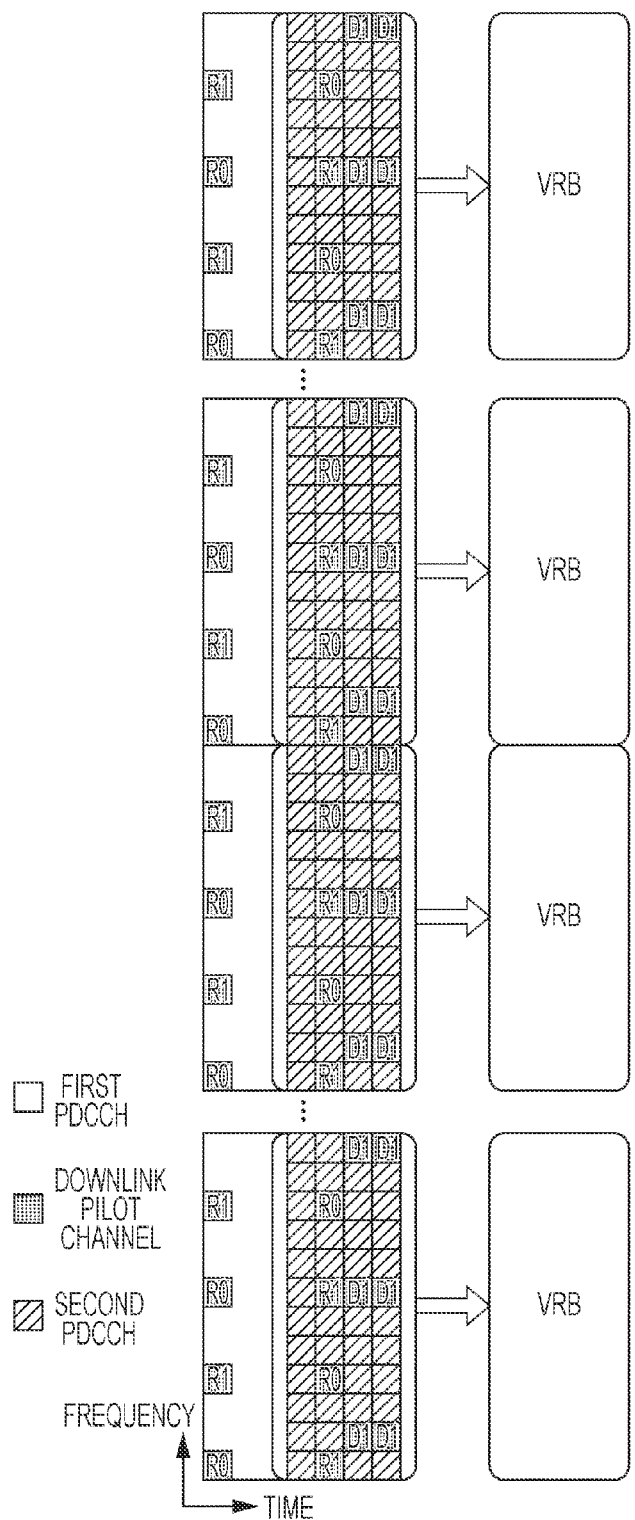
FIG. 18 is a diagram illustrating a first physical resource mapping of a second PDCCH region.

Different physical resource mappings (first physical resource mapping and second physical resource mapping) are applied to respective second PDCCH regions. Specifically, the configurations of the resources configuring one VRB are different. FIG. 18 is a diagram illustrating the first physical resource mapping of the second PDCCH region. Here, the resources used in the second PDCCH are shown, and the portions that are not related (PDSCH and a first PDCCH) are neither shown nor described. Here, the case where the second PDCCH includes the fourth to seventh OFDM symbols in the first slot in the downlink subframe and CRSs (R0 and R1) for two transmit antennas (antenna port 0 and antenna port 1) and UE-specific RS (D1) for one transmit antenna (antenna port 7, not shown) are mapped is shown. In FIG. 18, the vertical axis represents a frequency domain and the horizontal axis represents a time domain. In the first physical resource mapping, the resource configuring one VRB includes one PRB. The resource corresponding to one VRB includes the resources capable of being used for the signal of the second PDCCH within one PRB. In a plurality of PRBs configuring the second PDCCH region, the PRBs of which numbering is performed again in an ascending order (or descending order) of the numbers of the PRB within the second PDCCH region are used as VRBs as they are. For example, when the second PDCCH region includes the PRB1, the PRB4, the PRB5 and the PRB10, the VRB1 corresponds to the PRB1, the VRB2 corresponds to the PRB4, the VRB3 corresponds to the PRB5, and the VRB4 corresponds to the PRB10. In the first physical resource mapping, one VRB includes contiguous resources (contiguous subcarriers) in the frequency domain.

Figure 19:
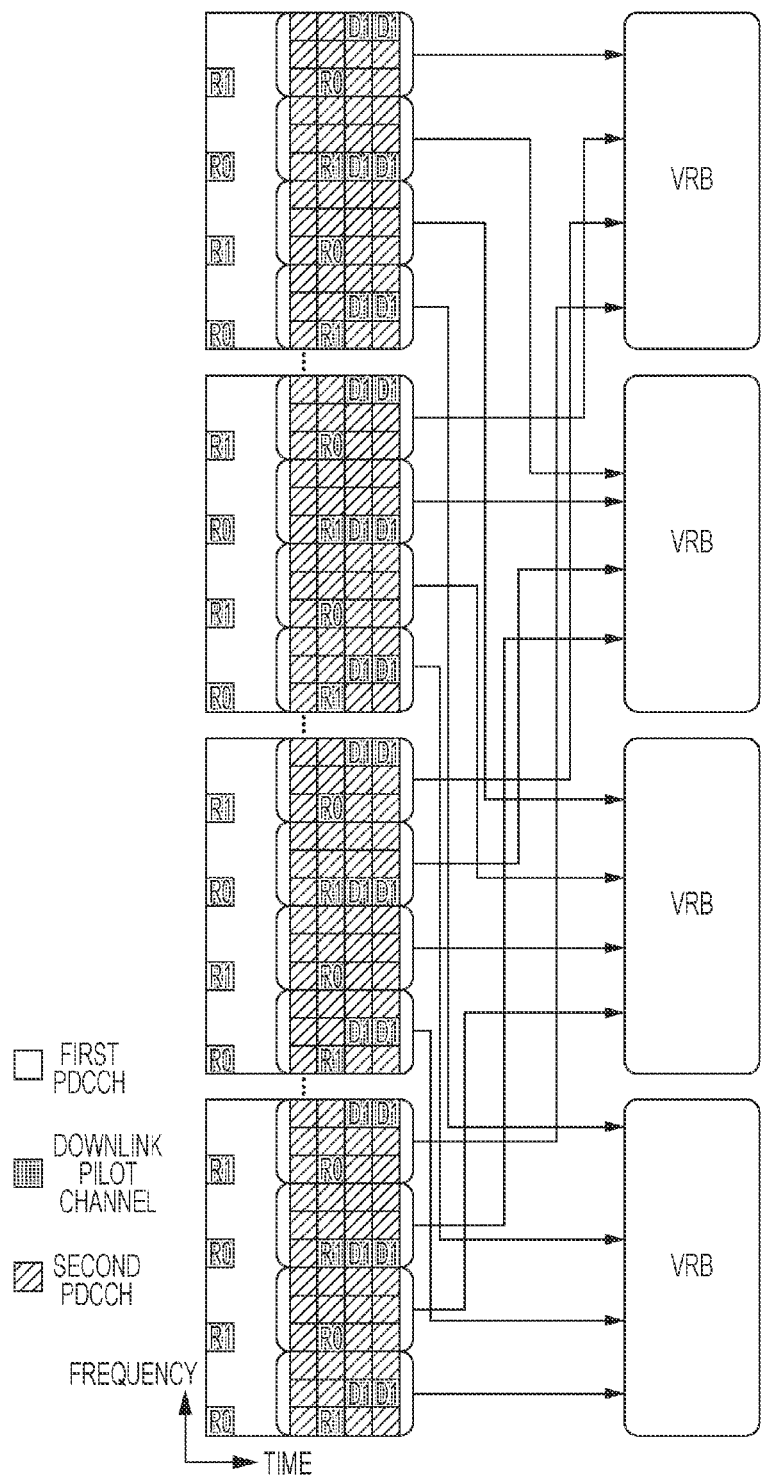
FIG. 19 is a diagram illustrating a second physical resource mapping of the second PDCCH region.

FIG. 19 is a diagram illustrating a second physical resource mapping of the second PDCCH region. Here, the resources used in the second PDCCH are shown, and the portions that are not related (PDSCH, a first PDCCH) are neither shown nor described. Here, the case where the second PDCCH includes the fourth to seventh OFDM symbols in the first slot in the downlink subframe and CRSs (R0 and R1) for two transmit antennas (antenna port 0 and antenna port 1) and UE-specific RS (D1) for one transmit antenna (antenna port 7, not shown) are mapped is shown. In FIG. 19, the vertical axis represents a frequency domain and the horizontal axis represents a time domain. In the second physical resource mapping, the resource configuring one VRB includes resources of a plurality of PRBs. The resources corresponding to one VRB include the resources obtained by arranging the resources (second elements) which are obtained by dividing the resources capable of being used for the signal of the second PDCCH in each PRB.

In FIG. 19, one PRB is divided into four resources, and one VRB includes each one separate resource in the four separate resources from different PRBs. For example, the numbering is performed again on a plurality of PRBs configuring the second PDCCH region in an ascending order (or a descending order) of the PRB numbers within the second PDCCH region, and one VRB is configured using resources of a plurality of PRBs of continuous numbers subjected to the numbering again. The VRBs of the same number as the number of PRBs configuring the second PDCCH region are used. The physical resource mapping for the VRBs of the same number as that of the PRBs is performed in a plurality of PRB units of the continuous numbers subjected to numbering again. A certain number of VRB is configured by arranging the separate resources having the lowest frequency, the next number of VRB is configured by arranging the separate resources having the next lowest frequency, the next number of VRB is configured by arranging the separate resources having the next lowest frequency, and the next number of VRB is configured by arranging the separate resources having the next lowest frequency, in other words, the separate resources having the highest frequency. The physical resource mapping described above is performed in a plurality of PRB units of the continuous numbers subjected to numbering again from a plurality of PRB units including PRBs having the smallest number in order. In the second physical resource mapping, one VRB includes non-contiguous resources (non-contiguous subcarriers) in the frequency domain. Here, the meaning of including non-contiguous resources in the frequency domain is not limited to including all non-contiguous subcarriers in the frequency domain, but is at least some subcarriers being non-contiguous.

In addition, FIG. 19 describes only an example of the second physical resource mapping, one PRB may be divided into four different numbers, and one VRB may include a plurality of separate resources. In addition, in the second physical resource mapping, if a plurality of PRBs to which discontinuous numbers are given after the numbering is performed again within the second PDCCH region, the physical resource mapping may be performed for the VRBs of the same number as that of the PRBs. For example, the second physical resource mapping may be performed for four VRBs using a PRB1, a PRB3, a PRB5, and a PRB7 to which numbers are given after the numbering is performed again. In addition, in the second physical resource mapping, the VRBs may include the separate resources of which frequency positions within respective PRBS of the separate resources configuring one VRB are different. For example, one VRB may include a separate resource having the lowest frequency within the PRB1 to which the number is given after the numbering is performed again, a separate resource having the second lowest frequency within the PRB2 to which the number is given after the numbering is performed again, a separate resource having the third lowest frequency within the PRB3 to which the number is given after the numbering is performed again, and a separate resource having the fourth lowest frequency within the PRB4 to which the number is given after the numbering is performed again.

Figure 20:
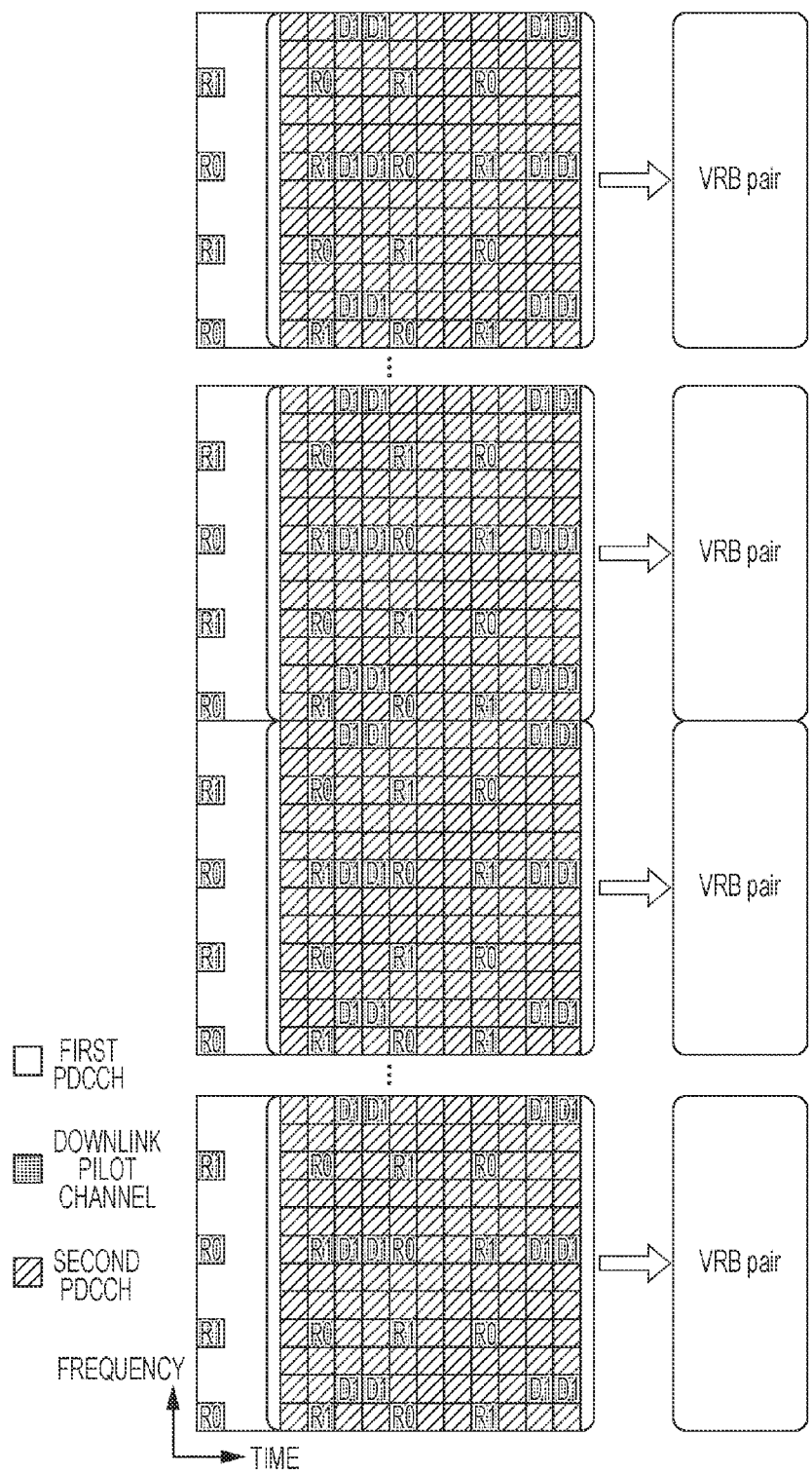
FIG. 20 is a diagram illustrating the first physical resource mapping of the second PDCCH region, when one second PDCCH includes one or more VRB pairs.
Figure 21:
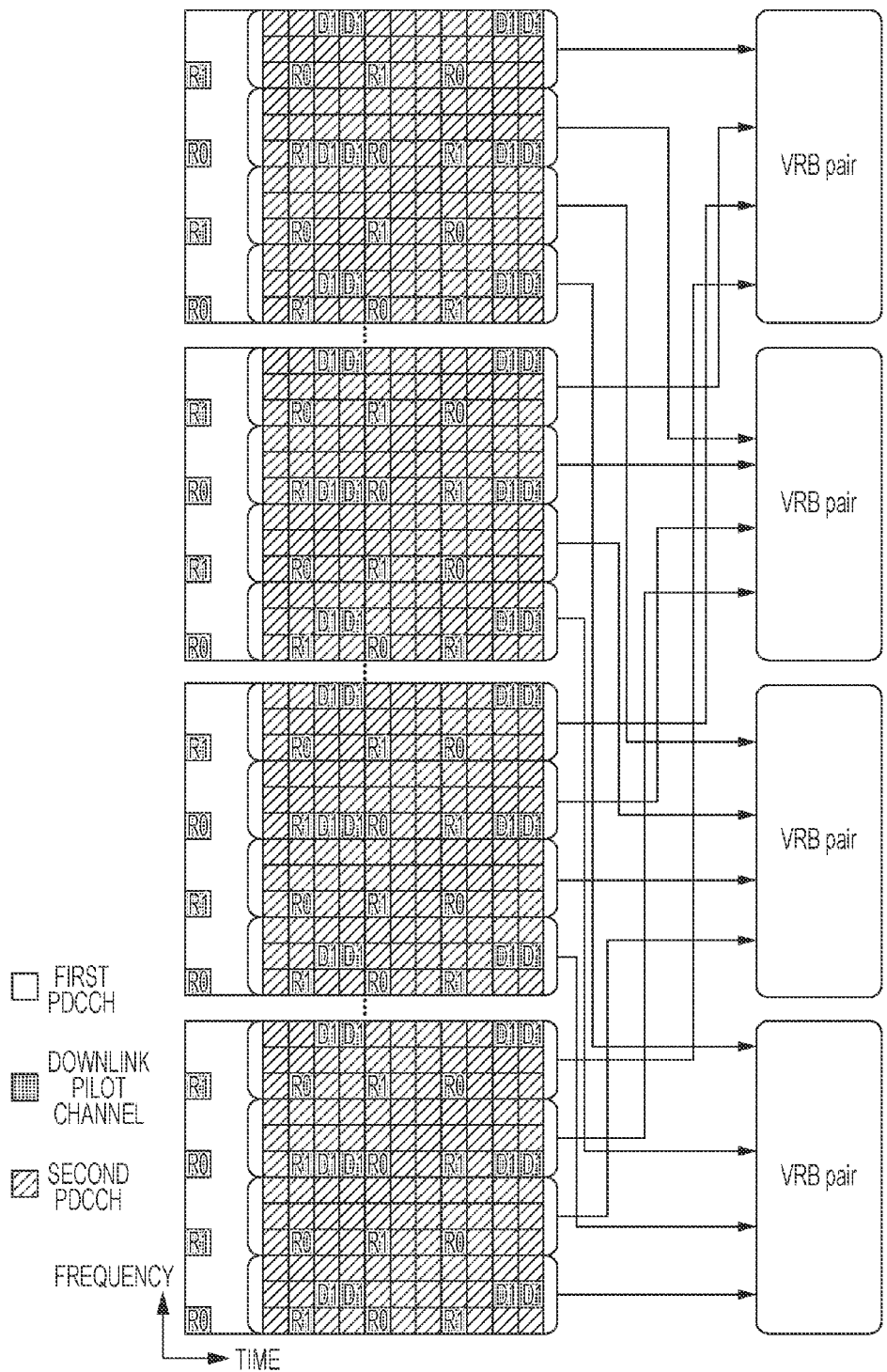
FIG. 21 is a diagram illustrating the second physical resource mapping of the second PDCCH region, when one second PDCCH includes one or more VRB pairs.

Further, the present invention can be applied to even a case where one second PDCCH includes one or more VRB pairs. The VRB pair means a set of VRBs for the first slot and VRBs for the second slot in the downlink subframe. In other words, the present invention can be applied to even a case where a minimum unit of the resources configuring the second PDCCH is a VRB pair. FIG. 20 is a diagram illustrating the first physical resource mapping of the second PDCCH region, when one second PDCCH includes one or more VRB pairs. FIG. 21 is a diagram illustrating the second physical resource mapping of the second PDCCH region, when one second PDCCH includes one or more VRB pairs.

Further, one second PDCCH includes one or more VRBs (the minimum unit of the resources configuring the second PDCCH is VRB), and the separate resources configuring one VRB may be resources obtained by dividing a PRB pair (the PRB of the first slot and the PRB of the second slot) in the second PDCCH region to which the second physical resource mapping is applied, as shown in FIG. 21. Further, it may be configured such that within the PRB configured in the second PDCCH region, all resources (downlink resource elements) excepting for the first PDCCH and downlink reference signal are not used for signals of the second PDCCH and signals are not mapped in some resources (downlink resource elements) (null).

Basically, the first physical resource mapping is applied to the second PDCCH region to which the pre-coding process based on the channel state is applied, and the second physical resource mapping is applied to the second PDCCH region to which the pre-coding process based on the channel state is not applied. In the second physical resource mapping, since one VRB includes non-contiguous resources in the frequency domain, a frequency diversity effect is achieved.

In the mobile station apparatus 5, one or more second PDCCH regions are configured by the base station apparatus 3. For example, two second PDCCH regions including a second PDCCH region to which the first physical resource mapping is applied and the pre-coding process based on the channel state is applied and a second PDCCH region to which the second physical resource mapping is applied and the pre-coding process based on the channel state is not applied are configured in the mobile station apparatus 5. For example, only the second PDCCH region to which the second physical resource mapping is applied and the pre-coding process based on the channel state is not applied is configured in the mobile station apparatus 5. The mobile station apparatus 5 is designated (configured) to perform a process of detecting (monitoring) the second PDCCH in the second PDCCH region which is configured by the base station apparatus 3. The designation of the monitoring of the second PDCCH may be made automatically (implicitly), by the second PDCCH region being configured in the mobile station apparatus 5, or by a different signaling from the signaling indicating the configuration of the second PDCCH region. A plurality of mobile station apparatuses 5 may be designated for the same second PDCCH region by the base station apparatus 3.

Before communication using the second PDCCH is started, information indicating the configuration (designation and configuration) of the second PDCCH region is exchanged between the base station apparatus 3 and the mobile station apparatus 5. For example, the information is exchanged using a Radio Resource Control (RRC) signaling. Specifically, the mobile station apparatus 5 receives information indicating the position (allocation) of the PRBs of the second PDCCH region from the base station apparatus 3. Further, for each second PDCCH region, information indicating the type of the physical resource mapping (the first physical resource mapping and the second physical resource mapping) of the VRB is notified from the base station apparatus 3 to the mobile station apparatus 5. In addition, it may be configured that not only the information indicating explicitly the type of the physical resource mapping of the VRB, but also other types of information are notified from the base station apparatus 3 to the mobile station apparatus 5, and the type of the physical resource mapping of the VRB is implicitly recognized by the mobile station apparatus 5 based on the information. For example, information indicating a transmission method of the second PDCCH in each second PDCCH region is notified from the base station apparatus 3 to the mobile station apparatus 5, and when a transmission method employing the pre-coding process is presented, the mobile station apparatus 5 recognizes that the physical resource mapping of the second PDCCH region is the first physical resource mapping, whereas when a transmission method without employing the pre-coding process is presented, the mobile station apparatus 5 recognizes that the physical resource mapping of the second PDCCH region is the second physical resource mapping. Further, it may be configured that as a default, only when the physical resource mapping of a certain VRB is configured in advance in the second PDCCH region and the physical resource mapping different from the configuration is used, is the information indicating the above fact notified from the base station apparatus 3 to the mobile station apparatus 5. The mobile station apparatus 5 performs demodulation of the signals of the second PDCCH and performs a process of detecting the second PDCCH addressed thereto, using a UE-specific RS received within the second PDCCH region which is configured by the base station apparatus 3. For example, the mobile station apparatus 5 performs demodulation of the signal of the second PDCCH, using the UE-specific RS within the PRB to which the resource subjected to demodulation belongs.

In the following description, control signals mapped to the second PDCCH will be described. The control signal mapped to the second PDCCH is processed for each piece of control information for one mobile station apparatus 5, and is subjected to a scramble process, a modulation process, a layer mapping process, a pre-coding process and the like. Here, the layer mapping process means some MIMO signal processes performed when transmission through a plurality of antennas is applied to the second PDCCH. For example, the layer mapping process is performed on the second PDCCH to which the pre-coding process is applied and on the second PDCCH to which the pre-coding process is not applied but transmission diversity is applied. Further, a common pre-coding process can be performed on the control signal mapped to the second PDCCH and the UE-specific RS. At this time, it is preferable that the pre-coding process be performed by a pre-coding weighting suitable for each mobile station apparatus 5.

Further, the UE-specific RS is multiplexed by the base station apparatus 3 in the PRB in which the second PDCCH is mapped. The mobile station apparatus 5 performs the demodulation process on the signals of the second PDCCH with the UE-specific RS. Further, all or a portion of a plurality of antenna ports (antenna ports 7 to 14) may be used for the second PDCCH and the UE-specific RS. When a plurality of antenna ports are used, the base station apparatus 3 performs MIMO transmission of the signals of the second PDCCH, using a plurality of antenna ports.

For example, the UE-specific RS used in the demodulation of the second PDCCH is transmitted using the pre-defined antenna port and scramble code. Specifically, the UE-specific RS used in the demodulation of the second PDCCH is generated using the predefined antenna port 7 and scramble ID.

Further, for example, the UE-specific RS used in the demodulation of the second PDCCH is generated using information indicating an antenna port which is notified through a RRC signaling using the PDSCH or through a signaling using the first PDCCH and scramble ID. Specifically, as information indicating the antenna port used for the UE-specific RS used in the demodulation of the second PDCCH, either antenna port 7 or antenna port 8 is notified through the RRC signaling using the PDSCH or through the signaling using the first PDCCH. As the scramble ID used for the UE-specific RS used in the demodulation of the second PDCCH, any value of 0 to 3 is notified through the RRC signaling using the PDSCH or through the signaling using the first PDCCH.

The present invention will be described conceptually. FIG. 22 is a diagram illustrating a monitoring of the second PDCCH of the mobile station apparatus 5 according to the embodiment of the present invention. With respect to the mobile station apparatus 5, a plurality of second PDCCH regions (a second PDCCH region 1 and a second PDCCH region 2) are configured. In the mobile station apparatus 5, a search space is configured in each second PDCCH region. The search space means a logical region in which the mobile station apparatus 5 performs decoding detection of the second PDCCH within the second PDCCH region. The search space includes a plurality of second PDCCH candidates. The second PDCCH candidates are subjected to the decoding detection of the second PDCCH by the mobile station apparatus 5. For each VRB aggregation number, different second PDCCH candidates include different VRBs (including one VRB and a plurality of VRBs). The VRBs configuring a plurality of second PDCCH candidates of the search space include a plurality of VRBs of continuous VRB numbers. The first VRB number used in the search space within the second PDCCH region is configured for each mobile station apparatus 5. For example, the first VRB number used in the search space is configured by a random function using an identifier (RNTI) allocated to the mobile station apparatus 5. For example, the base station apparatus 3 notifies the mobile station apparatus 5 of the first VRB number used in the search space, using the RRC signaling.

In the mobile station apparatus 5 in which a plurality of second PDCCH regions are configured, a plurality of search spaces (a first search space and a second search space) are configured. A first physical resource mapping is applied to some part of the second PDCCH region (second PDCCH region 1) of a plurality of second PDCCH regions configured in the mobile station apparatus 5 and a second physical resource mapping is applied to the other part of the second PDCCH region (second PDCCH region 2).

The number of the second PDCCH candidates of the first search space may be different from the number of the second PDCCH candidates of the second search space. If the number of the second PDCCH candidates increases, the mobile station apparatus 5 is likely not to handle the second PDCCH candidates and the detection accuracy of the second PDCCH is degraded, so that it is desirable to efficiently allocate the second PDCCH candidates to the first search space and second search space while suppressing the number of the second PDCCH candidates to an appropriate number. For example, in order to perform control of basically using the second PDCCH to which the pre-coding process is applied and of using the second PDCCH having a frequency diversity effect without applying the pre-coding process when it is difficult for the base station apparatus 3 to realize the suitable pre-coding process, it is effective that the number of second PDCCH candidates of the first search space be greater than the number of second PDCCH candidates of the second search space. For example, the number of second PDCCH candidates of VRB aggregation 1 of the first search space is different from the number of second PDCCH candidates of VRB aggregation 1 of the second search space. For example, the number of second PDCCH candidates of VRB aggregation 1 of the first search space is greater than the number of second PDCCH candidates of VRB aggregation 1 of the second search space.

Further, in a certain VRB aggregation number, the number of second PDCCH candidates of the first search space may be the same as the number of second PDCCH candidates of the second search space, and in a different VRB aggregation number, the number of second PDCCH candidates of the first search space and the number of second PDCCH candidates of the second search space may be different. Further, in a certain VRB aggregation number, the number of second PDCCH candidates of the first search space may be greater than the number of second PDCCH candidates of the second search space, and in a different VRB aggregation number, the number of second PDCCH candidates of the first search space and the number of second PDCCH candidates of the second search space may be small. The gain due to the pre-coding process implemented when the suitable channel state information is notified from the mobile station apparatus 5 to the base station apparatus 3 is typically greater than the gain due to frequency diversity. In other words, when it is assumed that somewhat suitable channel state information is notified from the mobile station apparatus 5 to the base station apparatus 3, the second PDCCH of the first physical resource mapping to which the pre-coding process is applied has typically better quality than the second PDCCH of the second physical resource mapping to which the pre-coding process is not applied. Therefore, there is a case where the VRB aggregation number necessary for satisfying the requested quality of the control information is greater in the second PDCCH of the second physical resource mapping than in the second PDCCH of the first physical resource mapping. In such a case, in the VRB aggregation number of a small value, the number of the second PDCCH candidates of the first search space is greater than the number of the second PDCCH candidates of the second search space, and in the VRB aggregation number of a great value, the number of the second PDCCH candidates of the first search space is smaller than the number of the second PDCCH candidates of the second search space, thereby allowing an efficient scheduling using the second PDCCH to be realized.

Further, it is possible that the second PDCCH candidate of a certain VRB aggregation number is configured in the search space of one second PDCCH region and is not configured in the search space of another second PDCCH region. The gain due to the pre-coding process implemented when suitable channel state information is notified from the mobile station apparatus 5 to the base station apparatus 3 is typically greater than the gain due to frequency diversity. In other words, when it is assumed that somewhat suitable channel state information is notified from the mobile station apparatus 5 to the base station apparatus 3, the second PDCCH of the first physical resource mapping to which the pre-coding process is applied has typically better quality than the second PDCCH of the second physical resource mapping to which the pre-coding process is not applied. Therefore, there is a case where the VRB aggregation number necessary for satisfying the requested quality of the control information is greater in the second PDCCH of the second physical resource mapping than in the second PDCCH of the first physical resource mapping. In such a case, in the VRB aggregation number of a small value, the second PDCCH candidate is configured only in the first search space and the second PDCCH candidate is not configured in the second search space, in contrast, in the VRB aggregation number of a great value, the second PDCCH candidate is configured only in the second search space and the second PDCCH candidate is not configured in the first search space, thereby allowing an efficient scheduling using the second PDCCH to be realized.

Further, it is possible that the number of the second PDCCH candidates of the search space within one second PDCCH region varies depending on the number of the second PDCCH regions configured in the mobile station apparatus 5. For example, as the number of the second PDCCH region configured in the mobile station apparatus 5 increases, the number of the second PDCCH candidates of the search space within one second PDCCH region is reduced. Thus, it is possible to increase the flexibility in the configuration of the second PDCCH region by the base station apparatus 3, while suppressing the mobile station apparatus 5 from not handling the second PDCCH candidates and prevent the detection accuracy of the second PDCCH from being degraded.

<Overall Configuration of Base Station Apparatus 3>

Figure 1:
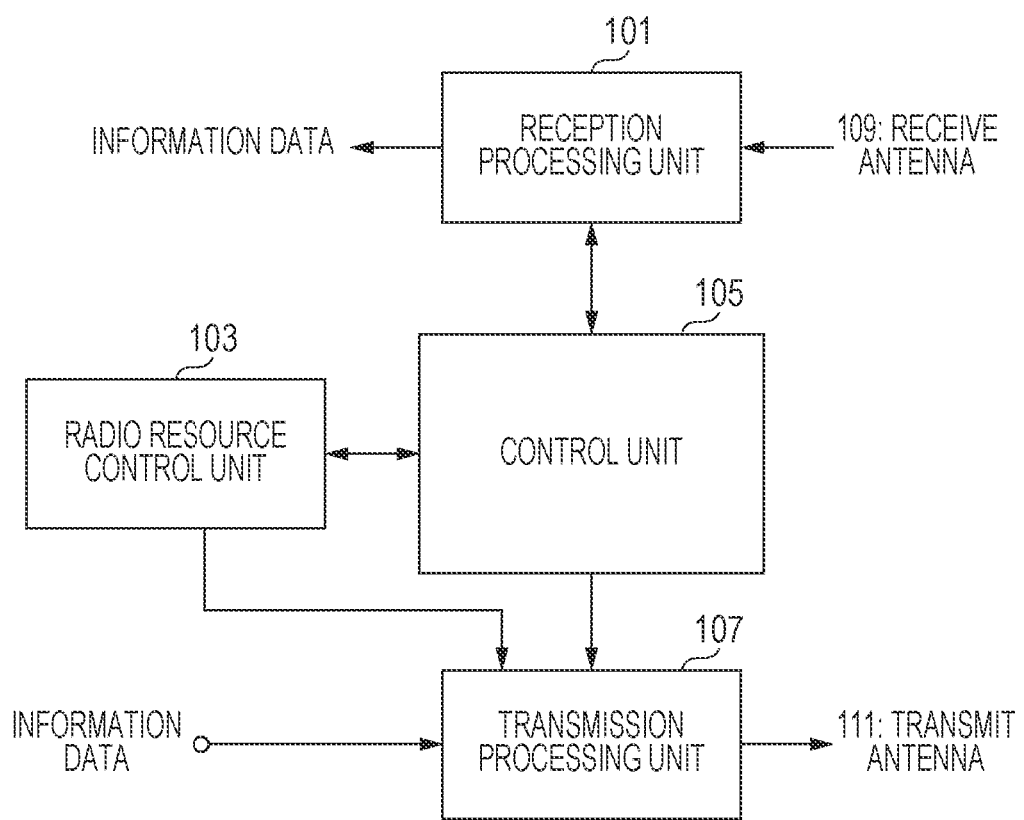
FIG. 1 is a schematic block diagram showing a configuration of a base station apparatus 3 according to an embodiment of the present invention.

Hereinafter, the configuration of the base station apparatus 3 according to the present embodiment will be described with reference to FIGS. 1 to 3. FIG. 1 is a schematic block diagram showing a configuration of the base station apparatus 3 according to an embodiment of the present invention. As shown in FIG. 1, the base station apparatus 3 is configured to include a reception processing unit 101, a radio resource control unit 103, a control unit 105, and a transmission processing unit 107.

The reception processing unit 101 demodulates and decodes reception signals of the PUCCH and the PUSCH which are received from the mobile station apparatus 5 by the receive antenna 109 according to an instruction of the control unit 105 using the UL RS, and extracts control information and information data. The reception processing unit 101 performs a process to extract UCI on the uplink subframe and the UL PRB in which the base station apparatus 3 allocates the resource of PUCCH to the mobile station apparatus 5. The control unit 105 instructs which process the reception processing unit 101 is to perform for which uplink subframe and which UL PRB. For example, the control unit 105 instructs the reception processing unit 101 to perform a detection process of performing a multiplication and a combining of code sequences in the time domain and a multiplication and a combining of code sequences in the frequency domain for the signals in the PUCCH for ACK/NACK (PUCCH format 1a and PUCCH format 1b). The control unit 105 instructs the reception processing unit 101 of code sequences in the frequency domain and/or the code sequences in the time domain which are used in the process of detecting UCI from the PUCCH. The reception processing unit 101 outputs the extracted UCI to the control unit 105 and outputs information data to a higher layer. The details of the reception processing unit 101 will be described later.

Further, the reception processing unit 101 detects (receives) a preamble sequence from the reception signal of the PRACH which is received by the receive antenna 109 from the mobile station apparatus 5, according to an instruction of the control unit 105. Further, the reception processing unit 101 performs estimation of an arrival timing (reception timing) together with the detection of the preamble sequence. The reception processing unit 101 performs a process to detect the preamble sequence for the uplink subframe and the UL PRB in which the base station apparatus 3 allocates the resource of PRACH. The reception processing unit 101 outputs information regarding the estimated arrival timing to the control unit 105.

Further, the reception processing unit 101 measures channel quality of one or more UL PRBs, using a SRS received from the mobile station apparatus 5. Further, the reception processing unit 101 detects (calculates and measures) synchronization deviation of the uplink, using the SRS received from the mobile station apparatus 5. The control unit 105 instructs which process the reception processing unit 101 is to perform for which uplink subframe and which UL PRB. The reception processing unit 101 outputs information regarding the measured channel quality and detected synchronization deviation of the uplink to the control unit 105. The details of the reception processing unit 101 will be described later.

The radio resource control unit 103 configures allocation of the resource for the PDCCH (the first PDCCH and the second PDCCH), allocation of the resource for the PUCCH, allocation of the DL PRB for the PDSCH, allocation of the UL PRB for the PUSCH, allocation of the resource for the PRACH, allocation of the resource for the SRS, modulation schemes of various channels, coding rates of various channels, transmission power control values of various channels, phase rotation amounts (weighting value) used in the pre-coding process of various channels, a phase rotation amount (weighting value) used in the pre-coding process of the UE-specific RS, and the like. In addition, the radio resource control unit 103 configures the code sequence of the frequency domain, the code sequence of the time domain for the PUCCH, and the like. Further, the radio resource control unit 103 configures a plurality of second PDCCH regions, and configures the DL PRB used in each second PDCCH region. Further, the radio resource control unit 103 configures the physical resource mapping of each second PDCCH region. Some pieces of information which are configured in the radio resource control unit 103 are notified to the mobile station apparatus 5 through the transmission processing unit 107, for example, information indicating the DL PRB of the second PDCCH region and information indicating the physical resource mapping of the second PDCCH region (information indicating the first physical resource mapping or the second physical resource mapping) is notified to the mobile station apparatus 5.

Further, the radio resource control unit 103 configures allocation of the radio resource of the PDSCH, based on the UCI which is obtained using the PUCCH in the reception processing unit 101 and is input through the control unit 105. For example, when ACK/NACK obtained using the PUCCH is input, the radio resource control unit 103 performs allocation of the resource of the PDSCH shown by the NACK in the ACK/NACK with respect to the mobile station apparatus 5.

The radio resource control unit 103 outputs various control signals to the control unit 105. For example, the control signals include a control signal indicating the physical resource mapping of the second PDCCH region, a control signal indicating allocation of the resource of the second PDCCH, a control signal indicating a phase rotation amount used in the pre-coding process, and the like.

The control unit 105 performs control such as allocation of DL PRB for the PDSCH, allocation of resource for the PDCCH, configuration of a modulation scheme for the PDSCH, configuration of coding rates for the PDSCH and the PDCCH, and configuration of a pre-coding process for the PDSCH, the PDCCH and the UE-specific RS for the transmission processing unit 107, based on the control signal which is input from the radio resource control unit 103. Further, the control unit 105 generates DCI transmitted using the PDCCH based on the control signal which is input from the radio resource control unit 103 and outputs the DCI to the transmission processing unit 107. The DCI transmitted using the PDCCH is a downlink assignment, an uplink grant, and the like. Further, the control unit 105 performs control of transmitting the information indicating the second PDCCH region, information indicating the physical resource mapping of the second PDCCH region, and the like to the mobile station apparatus 5 using the PDSCH, through the transmission processing unit 107.

The control unit 105 performs control such as allocation of the UL PRB for the PUSCH, allocation of the resource for the PUCCH, configuring modulation schemes of the PUSCH and the PUCCH, configuration of a coding rate of the PUSCH, a detection process for the PUCCH, configuration of a code sequence for the PUCCH, allocation of the resource for the PRACH, and allocation of the resource for the SRS to the reception processing unit 101, based on the control signal which is input from the radio resource control unit 103. Further, the UCI transmitted using the PUCCH by the mobile station apparatus 5 is input to the control unit 105 through the reception processing unit 101 and the control unit 105 outputs the input UCI to the radio resource control unit 103.

Further, if information indicating an arrival timing of the detected preamble sequence and information indicating synchronization deviation of the uplink which is detected from the received SRS is input by the reception processing unit 101, the control unit 105 calculates an adjustment value of a transmission timing of the uplink (TA value, TA: Timing Advance, Timing Adjustment, Timing Alignment). Information indicating the calculated adjustment value of the transmission timing of the uplink (TA command) is notified to the mobile station apparatus 5 through the transmission processing unit 107.

The transmission processing unit 107 generates a signal transmitted using the PDCCH and PDSCH based on the control signal which is input from the control unit 105, and transmits the generated signals through the transmit antenna 111. The transmission processing unit 107 transmits information indicating the second PDCCH region which is input from the radio resource control unit 103, information indicating the physical resource mapping of the second PDCCH region, information which is input from the higher layer, and the like to the mobile station apparatus 5 using the PDSCH. The transmission processing unit 107 transmits the DCI which is input from the control unit 105 to the mobile station apparatus 5, using the PDCCHs (first PDCCH and the second PDCCH). Further, the transmission processing unit 107 transmits the CRS, the UE-specific RS, and the CSI-RS. In addition, for simplicity of explanation, hereinafter, it is assumed that information data includes information regarding various types of control. The details of the transmission processing unit 107 will be described later.

<Configuration of Transmission Processing Unit 107 of Base Station Apparatus 3>

Hereinafter, the details of the transmission processing unit 107 of the base station apparatus 3 will be described. FIG. 2 is a schematic block diagram showing a configuration of a transmission processing unit 107 of the base station apparatus 3 according to the embodiment of the present invention. As shown in FIG. 2, the transmission processing unit 107 is configured to include a plurality of physical downlink shared channel processing units 201-1 to 201-M

(hereinafter, denoted by the physical downlink shared channel processing unit 201 including the physical downlink shared channel processing units 201-1 to 201-M), a plurality of physical downlink control channel processing units 203-1 to 203-M (hereinafter, denoted by the physical downlink control channel processing unit 203 including the physical downlink control channel processing units 203-1 to 203-M), a downlink pilot channel processing unit 205, a pre-coding processing unit 231, a multiplexing unit 207, an Inverse Fast Fourier Transform (IFFT) unit 209, a Guard Interval (GI) insertion unit 211, a D/A (Digital/Analog converter; a digital-to-analog conversion) unit 213, a transmission Radio Frequency (RF) unit 215, and a transmit antenna 111. In addition, since each physical downlink shared channel processing unit 201 and each physical downlink control channel processing unit 203 respectively have the same configuration and function, one of them will be described as a representative thereof. In addition, for simplicity of explanation, it is assumed that the transmit antenna 111 is configured by a plurality of antenna ports being arranged.

Figure 2:
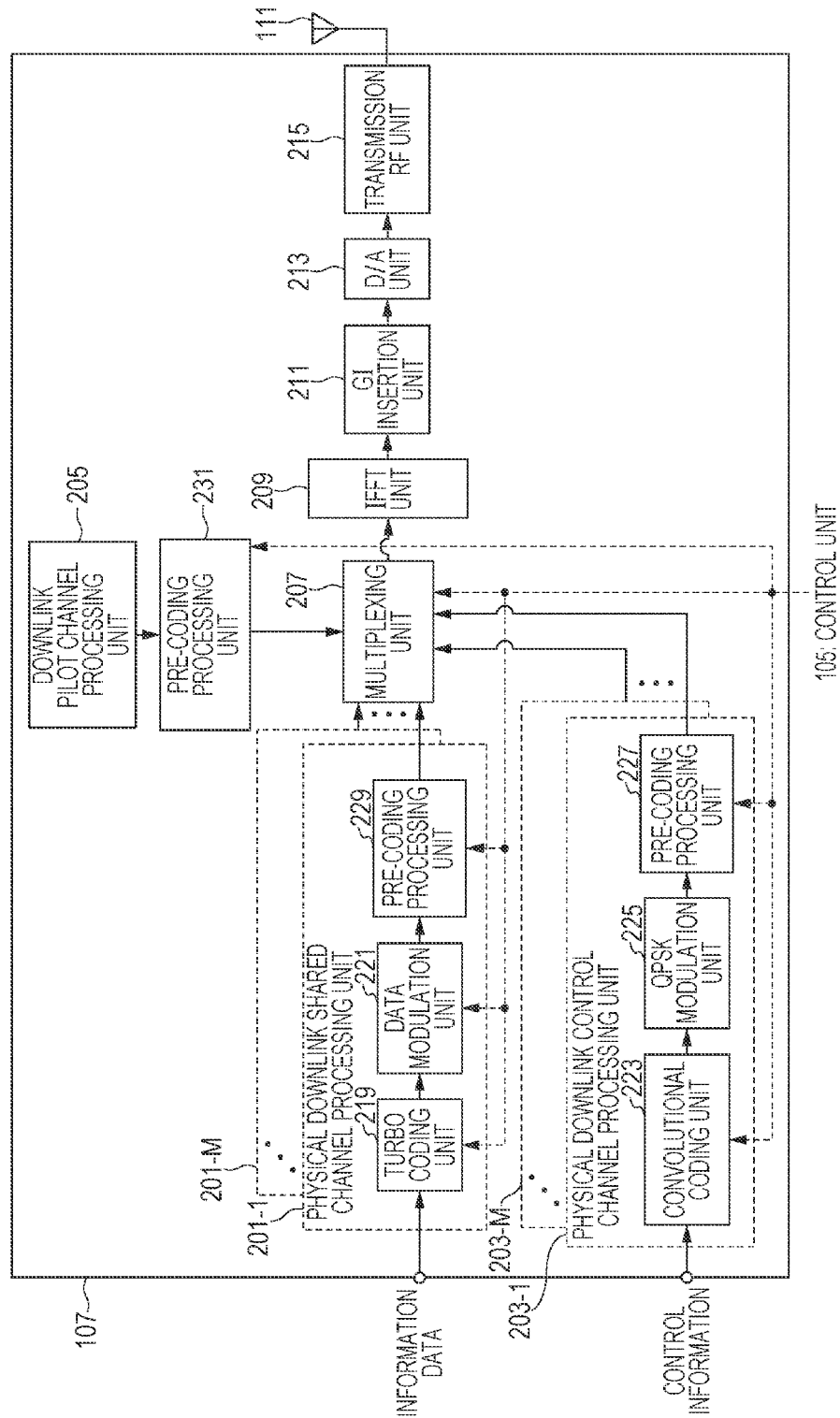
FIG. 2 is a schematic block diagram showing a configuration of a transmission processing unit 107 of the base station apparatus 3 according to the embodiment of the present invention.
Figure 3:
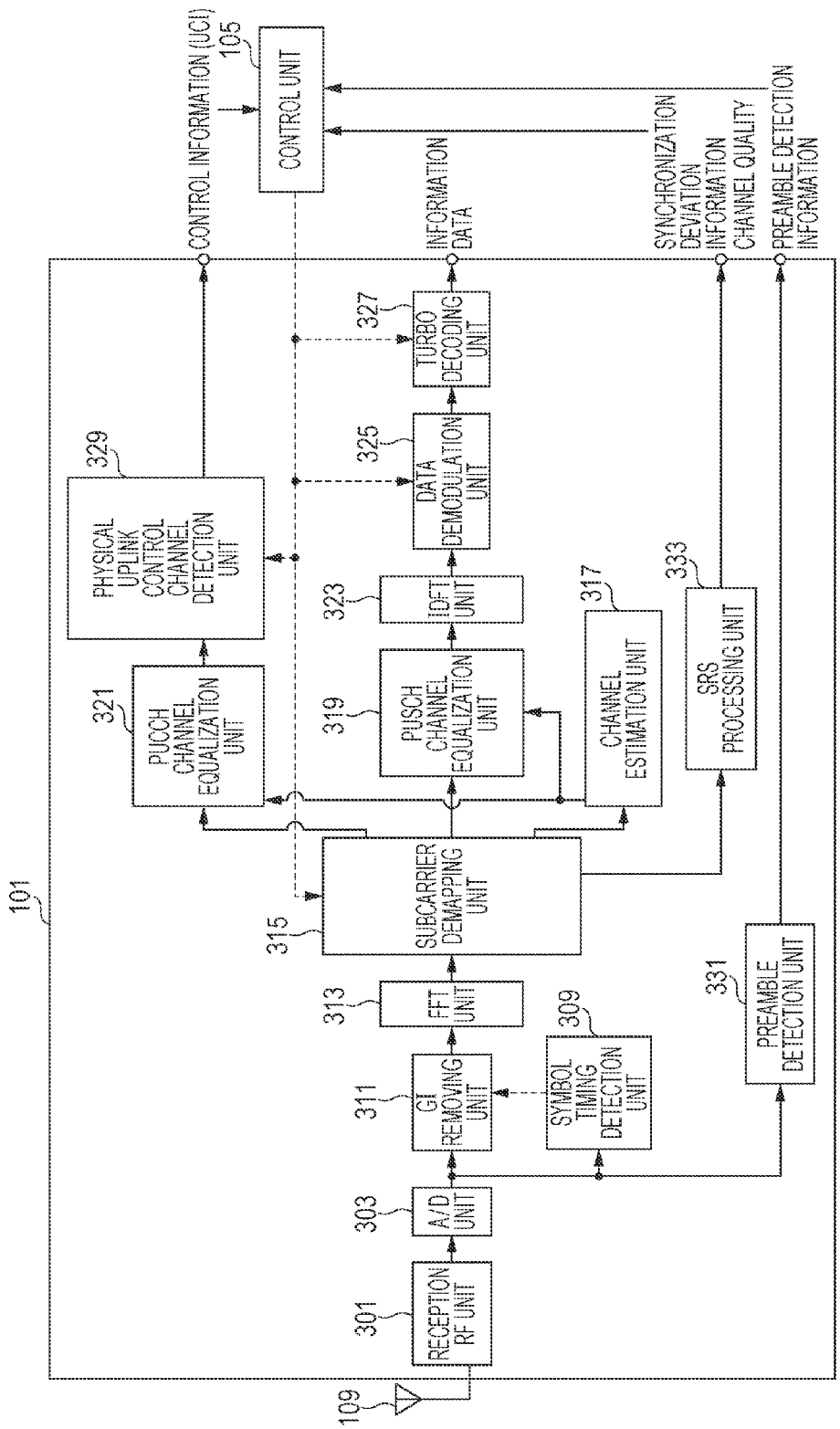
FIG. 3 is a schematic block diagram showing a configuration of a reception processing unit 101 of the base station apparatus 3 according to the embodiment of the present invention.

Further, as shown in FIG. 2, each physical downlink shared channel processing unit 201 includes a turbo coding unit 219, a data modulation unit 221 and a pre-coding processing unit 229. Further, as shown in FIG. 2, each physical downlink control channel processing unit 203 includes a convolutional coding unit 223, a QPSK modulation unit 225 and a pre-coding processing unit 227. The physical downlink shared channel processing unit 201 performs a baseband signal process for transmitting information data addressed to the mobile station apparatus 5 by an OFDM scheme. The turbo coding unit 219 performs a turbo coding for enhancing error tolerance of data on the information data which is input by a coding rate which is input from the control unit 105, and outputs the information data to the data modulation unit 221. The data modulation unit 221 modulates the data coded by the turbo coding unit 219 by a modulation scheme which is input from the control unit 105, for example, modulation schemes such as a Quadrature Phase Shift Keying (QPSK), a 16 Quadrature Amplitude Modulation (16QAM), and a 64 Quadrature Amplitude Modulation (64AQM) and generates a signal sequence of modulation symbols. The data modulation unit 221 outputs the generated signal sequence to the pre-coding processing unit 229. The pre-coding processing unit 229 performs a pre-coding process (beamforming process) on signals which are input from the data modulation unit 221 and outputs the signals to the multiplexing unit 207. Here, it is preferable that the pre-coding process perform phase rotation or the like on the generated signals such that the mobile station apparatus 5 efficiently performs reception (for example, such that reception power becomes maximum and interference becomes minimum). In addition, when the pre-coding process is not performed on signals which are input from the data modulation unit 221, the pre-coding processing unit 229 outputs the signals which are input from the data modulation unit 221, as they are, to the multiplexing unit 207.

The physical downlink control channel processing unit 203 performs a baseband signal process for transmission by an OFDM scheme on the DCI which is input from the control unit 105. The convolutional coding unit 223 performs a convolutional coding for enhancing error tolerance of the DCI based on a coding rate which is input from the control unit 105. Here, the DCI is controlled in units of bits. Further, the convolutional coding unit 223 performs a rate matching for adjusting the number of output bits for bits subjected to a convolutional coding process based on the coding rate which is input from the control unit 105. The convolutional coding unit 223 outputs the coded DCI to the QPSK modulation unit 225. The QPSK modulation unit 225 modulates the DCI which is coded by the convolutional coding unit 223 in a QPSK modulation scheme, and outputs the signal sequence of the modulation symbols which are modulated to the pre-coding processing unit 227. The pre-coding processing unit 227 performs the pre-coding process on the signal which is input from the QPSK modulation unit 225, and outputs the signal to the multiplexing unit 207. In addition, the pre-coding processing unit 227 outputs signals which are input from the QPSK modulation unit 225 while not being subjected to the pre-coding process to the multiplexing unit 207.

The downlink pilot channel processing unit 205 generates downlink reference signals (CRS, UE-specific RS, and CSI-RS) which are known signals in the mobile station apparatus 5 so as to be output to the pre-coding processing unit 231. The pre-coding processing unit 231 outputs the CRS, the CSI-RS, and some UE-specific RS which are input from the downlink pilot channel processing unit 205 while not being subjected to the pre-coding process to the multiplexing unit 207. The UE-specific RS which is not subjected to the pre-coding process in the pre-coding processing unit 231 is the UE-specific RS within the DL PRB used in the second PDCCH in the second PDCCH region of the second physical resource mapping. The pre-coding processing unit 231 outputs some UE-specific RS which is input from the downlink pilot channel processing unit 205 while not being subjected to the pre-coding process to the multiplexing unit 207. The UE-specific RS which is subjected to the pre-coding process in the pre-coding processing unit 231 is the UE-specific RS within the DL PRB used in the second PDCCH in the second PDCCH region of the first physical resource mapping. The pre-coding processing unit 231 performs the same process as the process performed in the PDSCH in the pre-coding processing unit 229 and/or the process performed in the second PDCCH in the pre-coding processing unit 227 on some UE-specific RS. Therefore, at the time of demodulating the signals of the second PDCCH to which the pre-coding process is applied in the mobile station apparatus 5, it is possible to estimate an equalized channel which the change in the channel in the downlink and the phase rotation by pre-coding processing unit 227 are combined using the UE-specific RS. In other words, it is not necessary for the base station apparatus 3 to notify the mobile station apparatus 5 the information of the pre-coding process (phase rotation amount) in the pre-coding processing unit 227, and the mobile station apparatus 5 can demodulate the signal subjected to the pre-coding process. In addition, when the pre-coding process is not used in the PDSCH on which the demodulation process such as channel compensation is performed using the UE-specific RS, the pre-coding processing unit 231 outputs the UE-specific RS while not being subjected to the pre-coding process to the multiplexing unit 207.

The multiplexing unit 207 multiplexes signals which are input from the downlink pilot channel processing unit 205, signals which are input from each physical downlink shared channel processing unit 201, and signals which are input from each physical downlink control channel processing unit 203 into the downlink subframe, according to an instruction from the control unit 105. Control signals regarding allocation of DL PRB for the PDSCH which is configured by the radio resource control unit 103, allocation of resource for the PDCCH (the first PDCCH and the second PDCCH), and a physical resource mapping of the second PDCCH region are input to the control unit 105, and the control unit 105 controls the process of the multiplexing unit 207 based on the control signal. The multiplexing unit 207 outputs the multiplexed signals to the IFFT unit 209.

The IFFT unit 209 performs inverse fast Fourier transform and performs modulation of an OFDM scheme on the signals multiplexed by the multiplexing unit 207, and outputs the signals to the GI insertion unit 211. The GI insertion unit 211 generates a digital signal of a baseband including symbols by an OFDM scheme by inserting a guard interval to the signal on which the IFFT unit 209 performs modulation of an OFDM scheme. As known already, the guard interval is generated by replicating a portion of the top or end of the OFDM symbol to be transmitted. The GI insertion unit 211 outputs the generated digital signal of a baseband to the D/A unit 213. The D/A unit 213 converts the digital signal of a baseband which is input from the GI insertion unit 211 into an analog signal and outputs the signals to the transmission RF unit 215. The transmission RF unit 215 generates the in-phase component and the orthogonal component of the intermediate frequency, from the analog signal which is input from the D/A unit 213, and cancels the excess frequency component with respect to the intermediate frequency band. Next, the transmission RF unit 215 converts the signals of the intermediate frequency into the signals of a high frequency (up-convert), cancels the excess frequency component, amplifies the power, and transmits the signals to the mobile station apparatus 5 through the transmit antenna 111.

<Configuration of Reception Processing Unit 101 of Base Station Apparatus 3>

Hereinafter, the details of the reception processing unit 101 of the base station apparatus 3 will be described. FIG. 3 is a schematic block diagram showing a configuration of the reception processing unit 101 of the base station apparatus 3 according to the embodiment of the present invention. As shown in FIG. 3, the reception processing unit 101 is configured to include a reception RF unit 301, an A/D (Analog/Digital converter; analog-to-digital conversion) unit 303, a symbol timing detection unit 309, a GI removing unit 311, a FFT unit 313, a subcarrier demapping unit 315, a channel estimation unit 317, a PUSCH channel equalization unit 319, a PUCCH channel equalization unit 321, an IDFT unit 323, a data demodulation unit 325, a turbo decoding unit 327, a physical uplink control channel detection unit 329, a preamble detection unit 331, and a SRS processing unit 333.

The reception RF unit 301 appropriately amplifies the signals which are received in the receive antenna 109, converts the amplified signals to signals of the intermediate frequency (down-convert), cancels the unnecessary frequency component, controls the amplification level so as to appropriately maintain the signal level, and performs orthogonal demodulation, based on the in-phase component and the orthogonal component of the received signals. The reception RF unit 301 outputs the analog signal subjected to the orthogonal demodulation, to the A/D unit 303. The A/D unit 303 converts the analog signal subjected to the orthogonal demodulation by the reception RF unit 301 into the digital signal, and outputs the converted digital signal to the symbol timing detection unit 309 and the GI removing unit 311.

The symbol timing detection unit 309 detects the timing of the symbol, based on the signals which are input by the A/D unit 303. The symbol timing detection unit 309 outputs a control signal indicating a timing of the detected symbol boundary to the GI removing unit 311. The GI removing unit 311 removes a portion corresponding to the guard interval from signals which are input by the A/D unit 303, based on the control signal from the symbol timing detection unit 309. The GI removing unit 311 outputs the signal of a remaining part to the FFT unit 313. The FFT unit 313 performs fast Fourier transform on signals which are input from the GI removing unit 311, performs demodulation of a DFT-Spread-OFDM scheme and outputs the signals to the subcarrier demapping unit 315. In addition, the number of points of the FFT unit 313 is the same as the number of points of the IFFT unit of the mobile station apparatus 5 described later.

The subcarrier demapping unit 315 separates the signals demodulated by the FFT unit 313 into a DM RS, a SRS, a signal of the PUSCH and a signal of the PUCCH, based on the control signal which is input from the control unit 105. The subcarrier demapping unit 315 outputs the separated DM RS to the channel estimation unit 317, the separated SRS to the SRS processing unit 333, the separated signals of the PUSCH to the PUSCH channel equalization unit 319, and the separated PUCCH signals to the PUCCH channel equalization unit 321.

The channel estimation unit 317 estimates the change in the channel using the DM RS separated by the subcarrier demapping unit 315 and the known signal. The channel estimation unit 317 outputs the estimated channel estimation value to the PUSCH channel equalization unit 319 and the PUCCH channel equalization unit 321. The PUSCH channel equalization unit 319 equalizes the amplitude and the phase of the PUSCH signal which is separated by the subcarrier demapping unit 315 based on the channel estimation value which is input from the channel estimation unit 317. Here, the equalization represents a process to recover the change in the channel that the signal receives during the wireless communication. The PUSCH channel equalization unit 319 outputs the adjusted signal to the IDFT unit 323.

The IDFT unit 323 performs an inverse discrete Fourier transform on the signals which are input from the PUSCH channel equalization unit 319 and outputs the transformed signals to the data demodulation unit 325. The data demodulation unit 325 demodulates the PUSCH signals which are converted by the IDFT unit 323, and outputs the demodulated PUSCH signal to the turbo decoding unit 327. The demodulation is the demodulation corresponding to a modulation scheme used in the data modulation unit of the mobile station apparatus 5, and the modulation scheme is input by the control unit 105. The turbo decoding unit 327 decodes information data from the demodulated PUSCH signal which is input from the data demodulation unit 325. The coding rate is input by the control unit 105.

The PUCCH channel equalization unit 321 equalizes the amplitude and the phase of the PUCCH signal which is separated by the subcarrier demapping unit 315 based on the channel estimation value which is input from the channel estimation unit 317. The PUCCH channel equalization unit 321 outputs the equalized signal to the physical uplink control channel detection unit 329.

The physical uplink control channel detection unit 329 demodulates and decodes the signals which are input from the PUCCH channel equalization unit 321 so as to detect a UCI. The physical uplink control channel detection unit 329 performs demultiplexing of the code-multiplexed signals in the frequency domain and/or the time domain. The physical uplink control channel detection unit 329 performs a process to detect the ACK/NACK, the SR, and the CQI from the code-multiplexed PUCCH signals in the frequency domain and/or the time domain, using the code sequence used on the transmission side. Specifically, the physical uplink control channel detection unit 329 multiplies the signal for each subcarrier of the PUCCH by each code of a code sequence and combines signals multiplied by each code, as a detection process using the code sequence in the frequency domain, that is, a process to demultiplex the code-multiplexed signals in the frequency domain. Specifically, the physical uplink control channel detection unit 329 multiplies the signal for each SC-FDMA symbol of the PUCCH by each code of a code sequence and combines signals multiplied by each code, as a detection process using the code sequence in the time domain, that is, a process to demultiplex the code-multiplexed signals in the time domain. In addition, the physical uplink control channel detection unit 329 configures a detection process for the PUCCH signal based on the control signal from the control unit 105.

The SRS processing unit 333 measures the channel quality using the SRS which is input from the mapping unit 315 in the subcarrier, and outputs the measurement result of the channel quality of the UL PRB to the control unit 105. The control unit 105 instructs the SRS processing unit 333 from which uplink subframe and from which UL PRB signals are to be measured for the channel quality of the mobile station apparatus 5. Further, the SRS processing unit 333 detects the synchronization deviation of the uplink using the SRS which is input from the mapping unit 315 in the subcarrier, and outputs information (synchronization deviation information) indicating the synchronization deviation of the uplink to the control unit 105. In addition, the SRS processing unit 333 may perform a process to detect the synchronization deviation of the uplink from the reception signal in the time domain. The specific process may perform the same process as the process performed in the preamble detection unit 331 described later.

The preamble detection unit 331 performs a process to detect (receive) the preamble transmitted for the reception signal corresponding to the PRACH, based on the signal which is input by the A/D unit 303. Specifically, the preamble detection unit 331 performs a correlation process with the replica signal generated using each preamble sequence which may be transmitted for the reception signals of various timings within the guard time. For example, when the correlation value is higher than a threshold that is configured in advance, the preamble detection unit 331 determines that the same signal as the preamble sequence used in the generation of the replica signal used in the correlation process is transmitted from the mobile station apparatus 5. Then, the preamble detection unit 331 determines the timing having the highest correlation value as the arrival timing of the preamble sequence. Then, the preamble detection unit 331 generates preamble detection information including at least information indicating the detected preamble sequence and information indicating the arrival timing and outputs the information to the control unit 105.

The control unit 105 performs control of the subcarrier demapping unit 315, the data demodulation unit 325, the turbo decoding unit 327, the channel estimation unit 317, and the physical uplink control channel detection unit 329, based on the control information (DCI) which is transmitted to the mobile station apparatus 5 using the PDCCH by the base station apparatus 3 and the control information (RRC signaling) which is transmitted using the PDSCH. Further, the control unit 105 determines with which resource (the uplink subframe, the UL PRB, the code sequence of the frequency domain, and the code sequence of the time domain) the PRACH, the PUSCH, the PUCCH, and the SRS which have been transmitted by each mobile station apparatus 5 (having a possibility of being transmitted) is configured, based on the control information transmitted to the mobile station apparatus 5 by the base station apparatus 3.

<Overall Configuration of Mobile Station Apparatus 5>

Figure 4:
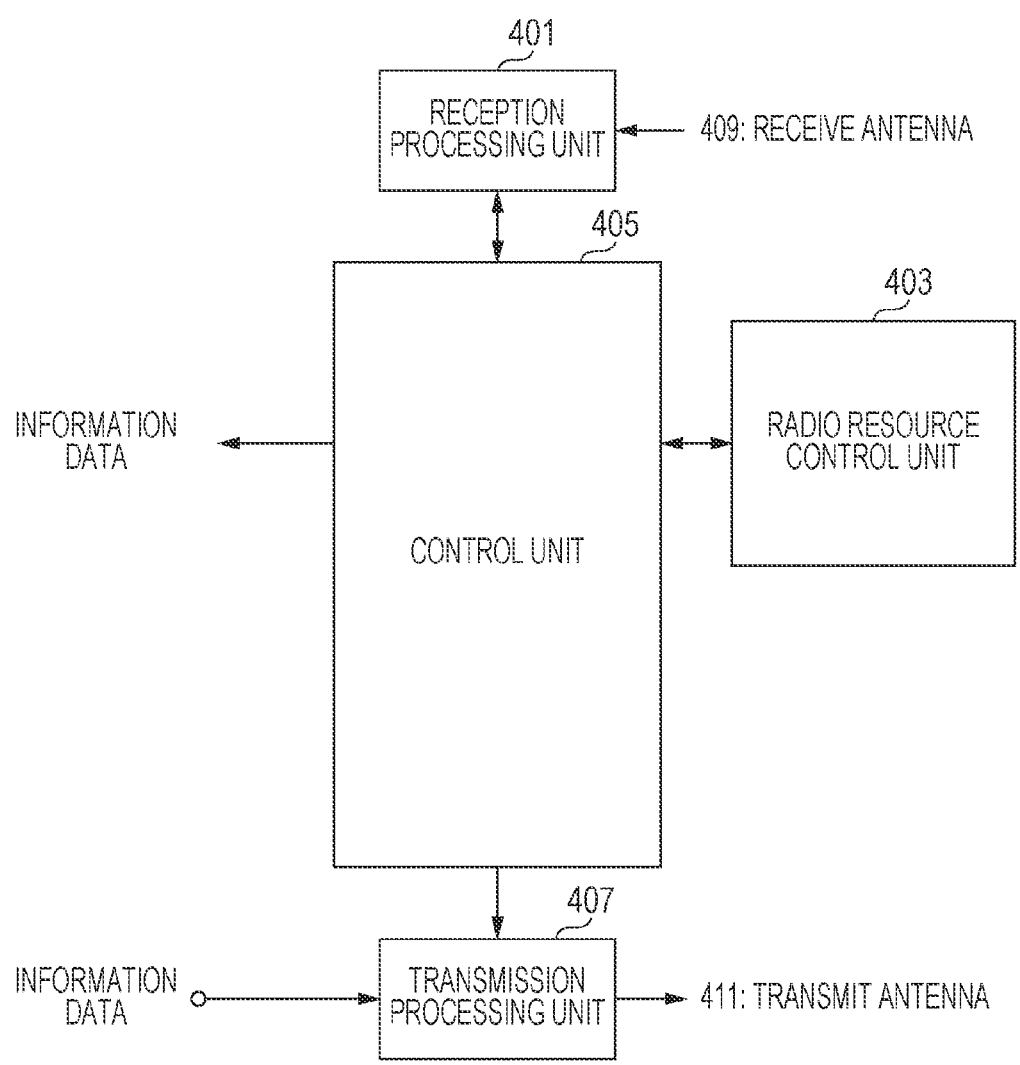
FIG. 4 is a schematic block diagram showing a configuration of a mobile station apparatus 5 according to the embodiment of the present invention.
Figure 5:
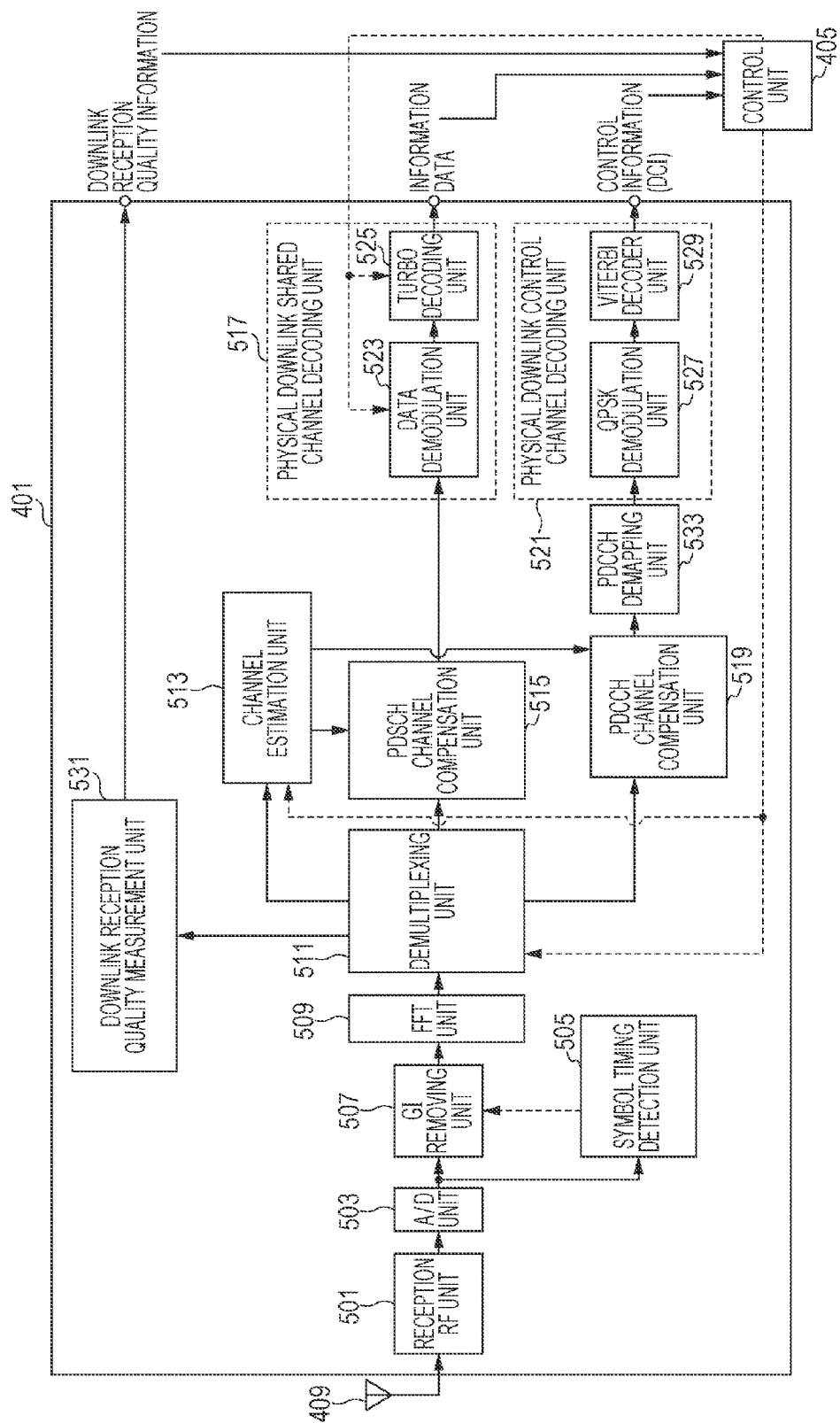
FIG. 5 is a schematic block diagram showing a configuration of a reception processing unit 401 of the mobile station apparatus 5 according to the embodiment of the present invention.

Hereinafter, the configuration of the mobile station apparatus 5 according to the present embodiment will be described using FIGS. 4 to 6. FIG. 4 is a schematic block diagram showing the configuration of a mobile station apparatus 5 according to the embodiment of the present invention. As shown in FIG. 4, the mobile station apparatus 5 is configured to include a reception processing unit 401, a radio resource control unit 403, a control unit 405, and a transmission processing unit 407.

The reception processing unit 401 receives signals from the base station apparatus 3, and demodulates and decodes the reception signal according to the instruction of the control unit 405. When the signals of the PDCCH (the first PDCCH and the second PDCCH) addressed to the mobile station apparatus 5 are detected, the reception processing unit 401 outputs the DCI obtained by decoding the PDCCH signal to the control unit 405. For example, the reception processing unit 401 performs a process to detect the second PDCCH addressed to the mobile station apparatus 5 in the search space within the second PDCCH region which is designated from the base station apparatus 3. For example, the reception processing unit 401 performs (i) a process to perform an estimation of the channel using the UE-specific RS within the second PDCCH region which is designated from the base station apparatus 3, (ii) a process to perform the demodulation of signals of the second PDCCH, and (iii) a process to detect the signal including the control information addressed to the mobile station apparatus 5. Further, the reception processing unit 401 outputs information data obtained by decoding the PDSCH addressed to the mobile station apparatus 5 to a higher layer through the control unit 405, based on the instruction of the control unit 405 after the DCI included in the PDCCH is output to the control unit 405. The downlink assignment among the DCI included in the PDCCH includes information indicating the allocation of the PDSCH resource. Further, the reception processing unit 401 outputs the control information, which is obtained by decoding the PDSCH and is generated in the radio resource control unit 103 of the base station apparatus 3, to the control unit 405. Further, the reception processing unit 401 outputs control information to the radio resource control unit 403 of the mobile station apparatus 5 through the control unit 405. For example, the control information generated in the radio resource control unit 103 of the base station apparatus 3 includes information indicating the DL PRB of the second PDCCH region and information indicating the physical resource mapping of the second PDCCH region (information indicating first physical resource mapping or second physical resource mapping).

Further, the reception processing unit 401 outputs the Cyclic Redundancy Check (CRC) code included in the PDSCH to the control unit 405. Although it is not described in the description of the base station apparatus 3, the transmission processing unit 107 of the base station apparatus 3 generates the CRC code from the information data and transmits the information data and the CRC code in the PDSCH. The CRC code is used in the mobile station apparatus 5 to determine whether data that is included in the PDSCH is incorrect, or is not incorrect. For example, when information generated from the data by using a generated polynomial expression which is determined in advance in the mobile station apparatus 5 and a CRC code which is generated in the base station apparatus 3 and is transmitted in the PDSCH are the same, the mobile station apparatus 5 determines that data is not incorrect. When information generated from the data by using a generated polynomial expression which is determined in advance in the mobile station apparatus 5 and a CRC code which is generated in the base station apparatus 3 and is transmitted in the PDSCH are different, the mobile station apparatus 5 determines that data is incorrect.

Further, the reception processing unit 401 measures reception quality of the downlink (Reference Signal Received Power (RSRP)), and outputs the measurement result to the control unit 405. The reception processing unit 401 measures (calculates) the RSRP from the CRS or the CSI-RS, based on the instruction from the control unit 405. The details of the reception processing unit 401 will be described later.

The control unit 405 confirms data which is transmitted from the base station apparatus 3 using the PDSCH, and is input by the reception processing unit 401. The control unit 405 outputs the information data among data to the higher layer. The control unit 405 controls the reception processing unit 401 and the transmission processing unit 407, based on the control information generated in the radio resource control unit 103 of the base station apparatus 3 among data. Further, the control unit 405 controls the reception processing unit 401 and the transmission processing unit 407, based on the instruction from the radio resource control unit 403. For example, the control unit 405 controls the reception processing unit 401 so as to perform a process to detect the second PDCCH for the signals within the DL PRB of the second PDCCH region which is instructed from the radio resource control unit 403. For example, the control unit 405 controls the reception processing unit 401 so as to perform demapping of the physical resource of the second PDCCH region, based on the information indicating a physical resource mapping of the second PDCCH region which is instructed from the radio resource control unit 403. Here, the demapping of the physical resource of the second PDCCH region is, for example, as shown in FIGS. 18 and 19, a process to configure (form, build and create) one VRB from the signals within the second PDCCH region. Further, the control unit 405 controls a process to detect the second PDCCH within the second PDCCH region for the reception processing unit 401. Specifically, the control unit 405 indicates (configures) the first VRB number on which the process to detect the second PDCCH within the second PDCCH region is performed and the number of the second PDCCH candidates for each second PDCCH region, to the reception processing unit 401, for each VRB aggregation number.

Further, the control unit 405 controls the reception processing unit 401 and the transmission processing unit 407, based on the DCI which is transmitted from the base station apparatus 3 using the PDCCH and input by the reception processing unit 401. Specifically, the control unit 405 controls the reception processing unit 401 mainly based on the detected downlink assignment, and controls the transmission processing unit 407 mainly based on the detected uplink grant. Further, the control unit 405 controls the transmission processing unit 401, based on the control information indicating the transmission power control command of the PUCCH included in the downlink assignment. The control unit 405 compares information generated from the data input by the reception processing unit 401 by using a generated polynomial expression which is determined in advance with a CRC code which is input from the reception processing unit 401 so as to determine whether data is incorrect or not and to generate ACK/NACK based on the determination result. Further, the control unit 405 generates a SR and a CQI based on an instruction from the radio resource control unit 403. Further, the control unit 405 controls a transmission timing of a signal of the transmission processing unit 407, based on the adjustment value of the uplink transmission timing notified from the base station apparatus 3 and the like.

The radio resource control unit 403 stores and holds control information which is generated in the radio resource control unit 103 of the base station apparatus 3, and notified by the base station apparatus 3, and performs control of the reception processing unit 401 and the transmission processing unit 407 through the control unit 405. In other words, the radio resource control unit 403 has a memory function of holding various parameters. For example, the radio resource control unit 403 holds information regarding the DL PRB of the second PDCCH region and the physical resource mapping of the second PDCCH region, and outputs various control signals to the control unit 405. The radio resource control unit 403 holds parameters associated with the transmission power of each of the PUSCH, the PUCCH, the SRS, and the PRACH, and outputs the control signal to the control unit 405 so as to use parameters notified by the base station apparatus 3.

The radio resource control unit 403 configures values of parameters associated with the transmission power such as the PUCCH, the PUSCH, the SRS, and the PRACH. The value of transmission power which is configured in the radio resource control unit 403 is output by the control unit 405 to the transmission processing unit 407. In addition, the DM RS configured using the resource within the same UL PRB as the PUCCH is subjected to the same transmission power control as the PUCCH. In addition, the DM RS configured using the resource within the same UL PRB as the PUSCH is subjected to the same transmission power control as the PUSCH. The radio resource control unit 403 configures values such as a parameter based on the number of UL PRBs allocated to the PUSCH, the cell-specific and mobile station apparatus-specific parameters which are notified in advance by the base station apparatus 3, a parameter based on the modulation scheme used in the PUSCH, a parameter based on the estimated path-loss value, and a parameter based on the transmission power control command notified by the base station apparatus 3, for the PUSCH. The radio resource control unit 403 configures values such as a parameter based on the signal configuration of PUCCH, the cell-specific and mobile station apparatus-specific parameters which are notified in advance by the base station apparatus 3, a parameter based on the estimated path-loss value, and a parameter based on the notified transmission power control command, for the PUCCH.

In addition, as parameters associated with the transmission power, the cell-specific and mobile station apparatus-specific parameters are notified by the base station apparatus 3 using the PDSCH, and the transmission power control command is notified by the base station apparatus 3 using the PDCCH. The transmission power control command for the PUSCH is included in the uplink grant. The transmission power control command for the PUCCH is included in the downlink assignment. In addition, various parameters which are notified by the base station apparatus 3 and associated with the transmission power are appropriately stored in the radio resource control unit 403. The stored value is input to the control unit 405.

The transmission processing unit 407 transmits signals obtained by coding and modulating the information data and the UCI, using the resources of the PUSCH and the PUCCH, to the base station apparatus 3 through the transmit antenna 411, according to the instruction of the control unit 405. Further, the transmission processing unit 407 configures the transmission power of each of the PUSCH, the PUCCH, the SRS, the DM RS, and the PRACH according to an instruction of the control unit 405. The details of the transmission processing unit 407 will be described later.

<Reception Processing Unit 401 of Mobile Station Apparatus 5>

Hereinafter, the details of the reception processing unit 401 of the mobile station apparatus 5 will be described. FIG. 5 is a schematic block diagram showing a configuration of a reception processing unit 401 of the mobile station apparatus 5 according to the embodiment of the present invention. As shown in FIG. 5, the reception processing unit 401 is configured to include a reception RF unit 501, an A/D unit 503, a symbol timing detection unit 505, a GI removing unit 507, a FFT unit 509, a demultiplexing unit 511, a channel estimation unit 513, a PDSCH channel compensation unit 515, a physical downlink shared channel decoding unit 517, a PDCCH channel compensation unit 519, a physical downlink control channel decoding unit 521, a downlink reception quality measurement unit 531, and a PDCCH demapping unit 533. Further, as shown in FIG. 5, the physical downlink shared channel decoding unit 517 includes a data demodulation unit 523 and a turbo decoding unit 525. Further, as shown in FIG. 5, the physical downlink control channel decoding unit 521 includes a QPSK demodulation unit 527 and a Viterbi decoder unit 529.

The reception RF unit 501 appropriately amplifies the signals which are received in the receive antenna 409, converts the amplified signals to signals of the intermediate frequency (down-convert), cancels the unnecessary frequency component, controls the amplification level so as to appropriately maintain the signal level, and performs orthogonal demodulation, based on the in-phase component and the orthogonal component of the received signals. The reception RF unit 501 outputs the analog signal subjected to the orthogonal demodulation, to the A/D unit 503.

The A/D unit 503 converts the analog signal subjected to the orthogonal demodulation by the reception RF unit 501 into the digital signal. The A/D unit 503 outputs the converted digital signal to the symbol timing detection unit 505 and the GI removing unit 507. The symbol timing detection unit 505 detects the timing of the symbol, based on the digital signal which is converted by the A/D unit 503. The symbol timing detection unit 505 outputs a control signal indicating the detected timing of the symbol boundary to the GI removing unit 507. The GI removing unit 507 removes the portion corresponding to the guard interval from the digital signal which is output by the A/D unit 503, based on the control signal from the symbol timing detection unit 505. The GI removing unit 507 outputs the signals of the remaining parts to the FFT unit 509. The FFT unit 509 performs fast Fourier transform and a demodulation of an OFDM scheme on the signals which are input from the GI removing unit 507, and outputs the signals to the demultiplexing unit 511.

The demultiplexing unit 511 separates the signals demodulated by the FFT unit 509 into a signal of the PDCCH (first PDCCH and the second PDCCH) and the signal of the PDSCH, based on the control signal which is input from the control unit 405. The demultiplexing unit 511 outputs the separated signals of the PDSCH to the PDSCH channel compensation unit 515. Further, the demultiplexing unit 511 outputs separated signals of the PDCCH to the PDCCH channel compensation unit 519. For example, the demultiplexing unit 511 outputs the signals of the second PDCCH of the second PDCCH region which is designated to the mobile station apparatus 5, to the PDCCH channel compensation unit 519. Further, the demultiplexing unit 511 separates the downlink resource element in which the downlink reference signal is mapped. The demultiplexing unit 511 outputs the downlink reference signal (CRS and UE-specific RS) to the channel estimation unit 513. For example, the demultiplexing unit 511 outputs the UE-specific RS of the second PDCCH region designated to the mobile station apparatus 5, to the channel estimation unit 513. Further, the demultiplexing unit 511 outputs the downlink reference signal (CRS and CSI-RS) to the downlink reception quality measurement unit 531.

The channel estimation unit 513 estimates the change in the channel using the downlink reference signal separated by the demultiplexing unit 511 and known signals. The channel estimation unit 513 outputs the channel compensation value for adjusting the amplitude and the phase in order to compensate for the change in the channel, to the PDSCH channel compensation unit 515 and the PDCCH channel compensation unit 519. The channel estimation unit 513 estimates independently the change in the channel by respectively using the CRS and the UE-specific RS, and outputs the estimated change as the channel compensation value. For example, the channel estimation unit 513 generates a channel compensation value from the channel estimation value which is estimated using the UE-specific RS mapped in a plurality of DL PRBs within the second PDCCH region designated to the mobile station apparatus 5, and outputs the generated value to the PDCCH channel compensation unit 519. For example, the channel estimation unit 513 generates a channel compensation value from the channel estimation value which is estimated using the UE-specific RS mapped in the plurality of DL PRBs which are allocated to the mobile station apparatus 5 and the PDSCH, and outputs the generated value to the PDSCH channel compensation unit 515. For example, the channel estimation unit 513 generates a channel compensation value from the channel estimation value which is estimated using the CRS, and outputs the generated value to the PDCCH channel compensation unit 519. For example, the channel estimation unit 513 generates a channel compensation value from the channel estimation value which is estimated using the CRS, and outputs the generated value to the PDSCH channel compensation unit 515.

The PDSCH channel compensation unit 515 adjusts the amplitude and the phase of the PDSCH signals which are separated by the demultiplexing unit 511 according to the channel compensation value which is input from the channel estimation unit 513. For example, the PDSCH channel compensation unit 515 adjusts the signals of a certain PDSCH according to the channel compensation value generated based on the UE-specific RS in the channel estimation unit 513, and adjusts the signals of a different PDSCH according to the channel compensation value generated based on the CRS in the channel estimation unit 513. The PDSCH channel compensation unit 515 outputs the signals of which channel is adjusted to the data demodulation unit 523 of the physical downlink shared channel decoding unit 517.

The physical downlink shared channel decoding unit 517 performs demodulation and decoding of the PDSCH, based on the instruction from the control unit 405 and detects information data. The data demodulation unit 523 performs demodulation of the signals of the PDSCH which are input from the channel compensation unit 515, and outputs the demodulated signals of the PDSCH to the turbo decoding unit 525. The demodulation is a demodulation corresponding to the modulation scheme used in the data modulation unit 221 of the base station apparatus 3. The turbo decoding unit 525 decodes information data from the demodulated signals of the PDSCH which are input from the data demodulation unit 523, and outputs the decoded information data to the higher layer through the control unit 405. In addition, control information which is transmitted using the PDSCH and is generated in the radio resource control unit 103 of the base station apparatus 3, and the like is output to the control unit 405, and is output also to the radio resource control unit 403 through the control unit 405. In addition, the CRC code included in the PDSCH is also output to the control unit 405.

The PDCCH channel compensation unit 519 adjusts the amplitude and the phase of the PDCCH signals which are separated by the demultiplexing unit 511 according to the channel compensation value which is input from the channel estimation unit 513. For example, the PDCCH channel compensation unit 519 adjusts the signals of the second PDCCH according to the channel compensation value generated based on the UE-specific RS in the channel estimation unit 513, and adjusts the signals of the first PDCCH according to the channel compensation value generated based on the CRS in the channel estimation unit 513. The PDCCH channel compensation unit 519 outputs the adjusted signals to the PDCCH demapping unit 533.

The PDCCH demapping unit 533 performs a demapping for the first PDCCH or a demapping for the second PDCCH, on the signals which are input from the PDCCH channel compensation unit 519. In addition, the PDCCH demapping unit 533 performs a demapping for the first physical resource mapping or a demapping for the second physical resource mapping on the signals of the second PDCCH which are input from the PDCCH channel compensation unit 519. The PDCCH demapping unit 533 converts the signals of the first PDCCH which are input into signals in a unit of a CCE as described using FIG. 15 such that a process in a unit of a CCE shown in FIG. 14 is performed for the signals of the first PDCCH which are input, in the physical downlink control channel decoding unit 521. The PDCCH demapping unit 533 converts the signals of the second PDCCH which are input into signals in a unit of a VRB such that a process in a unit of a VRB shown in FIG. 17 is performed for the signals of the second PDCCH which are input, in the physical downlink control channel decoding unit 521. The PDCCH demapping unit 533 converts the signals of the second PDCCH of the second PDCCH region, which are input, and to which the first physical resource mapping is applied into signals of a unit of a VRB, as described using FIG. 18. The PDCCH demapping unit 533 converts the signals of the second PDCCH of the second PDCCH region, which are input, to which the second physical resource mapping is applied into signals of a unit of a VRB, as described using FIG. 19. The PDCCH demapping unit 533 outputs the converted signals to the QPSK demodulation unit 527 of the physical downlink control channel decoding unit 521.

The physical downlink control channel decoding unit 521 performs demodulation and decoding on the signals which are input from the PDCCH channel compensation unit 519 as below, and detects the control data. The QPSK demodulation unit 527 performs QPSK demodulation on the signals of the PDCCH, and outputs the signals to the Viterbi decoder unit 529. The Viterbi decoder unit 529 decodes the signals demodulated by the QPSK demodulation unit 527, and outputs the decoded DCI to the control unit 405. Here, the signal is represented in a unit of a bit, and the Viterbi decoder unit 529 performs a rate dematching for adjusting the number of bits for performing a Viterbi decoding process on the input bits.

First, a detection process for the first PDCCH will be described. The mobile station apparatus 5 assumes a plurality of CCE aggregation numbers, and performs a process to detect a DCI addressed to the mobile station apparatus 5. The mobile station apparatus 5 performs a different decoding process on the signal of the first PDCCH for each assumed CCE aggregation number (coding rate), and obtains a DCI included in the first PDCCH in which an error is not detected in the CRC code added to the first PDCCH with the DCI. Such a process is referred to as a blind decoding. In addition, the mobile station apparatus 5 does not perform the blind decoding in which the first PDCCH is assumed on the signals (reception signals) of all CCEs (REG) of the downlink system band but performs the blind decoding on only some CCE. Some CCE (CCEs) on which the blind decoding is performed is referred to as a search space (search space for the first PDCCH). Further, different search spaces (search space for the first PDCCH) are defined for each CCE aggregation number. In the communication system 1 according to an embodiment of the present invention, respective different search spaces (search space for first PDCCH) are configured for the first PDCCH in the mobile station apparatus 5. Here, the search space (search space for the first PDCCH) for the first PDCCH of each mobile station apparatus 5 may be configured by all different CCE (CCEs), may be configured by all the same CCE (CCEs), and may be configured by a partially overlapping CCE (CCEs).

Next, a detection process for the second PDCCH will be described. The mobile station apparatus 5 assumes a plurality of VRB aggregation numbers, and performs a process to detect a DCI addressed to the mobile station apparatus 5. The mobile station apparatus 5 performs a different decoding process on the signal of the second PDCCH for each assumed VRB aggregation number (coding rate), and obtains a DCI included in the second PDCCH in which an error is not detected in the CRC code added to the second PDCCH with the DCI. Such a process is referred to as a blind decoding. In addition, the mobile station apparatus 5 does not perform the blind decoding in which the second PDCCH is assumed on the signals of VRB (reception signal) of the second PDCCH region configured by the base station apparatus 3, but performs the blind decoding on only some VRB. Some VRB (VRBs) on which the blind decoding is performed is referred to as a search space (search space for the second PDCCH). Further, different search spaces (search space for the second PDCCH) are defined for each VRB aggregation number. In the mobile station apparatus 5 in which a plurality of second PDCCH regions are configured, the search spaces are configured (defined) in respective configured second PDCCH regions. In the mobile station apparatus 5, the search spaces are configured for the second PDCCH region to which the first physical resource mapping is applied and the second PDCCH region to which the second physical resource mapping is applied. In the mobile station apparatus 5 in which a plurality of second PDCCH regions are configured, a plurality of search spaces are simultaneously configured in a certain downlink subframe.

In the communication system 1 according to an embodiment of the present invention, with respect to the second PDCCH, respective different search spaces (search space for the second PDCCH) are configured in the mobile station apparatus 5. Here, the search space (search space for the second PDCCH) for the second PDCCH of each mobile station apparatus 5 in which the same second PDCCH region is configured, may be configured by all different VRB (VRBs), may be configured by all the same VRB (VRBs), and may be configured by a partially overlapping VRB (VRBs).

In the mobile station apparatus 5 in which a plurality of second PDCCH regions are configured, search spaces (search space for the second PDCCH) are configured in each second PDCCH region. The search space (search space for the second PDCCH) means a logical region in which the mobile station apparatus 5 performs decoding detection of the second PDCCH within the second PDCCH region. The search space (search space for the second PDCCH) includes a plurality of second PDCCH candidates. The second PDCCH candidates are to be subjected to the decoding detection of the second PDCCH by the mobile station apparatus 5. For each VRB aggregation number, different second PDCCH candidates include different VRBs (including one VRB and a plurality of VRBs). The VRBs configuring a plurality of second PDCCH candidates of the search space (search space for the second PDCCH) include a plurality of VRBs of continuous VRB numbers. The first VRB number used in the search space (search space for the second PDCCH) within the second PDCCH region is configured for each mobile station apparatus 5. For example, the first VRB number used in the search space (search space for the second PDCCH) is configured by a random function using an identifier (RNTI) allocated to the mobile station apparatus 5. For example, the base station apparatus 3 notifies the mobile station apparatus 5 of the first VRB number used in the search space (search space for the second PDCCH), using a RRC signaling.

The number of second PDCCH candidates may be different in respective search spaces (search spaces for the second PDCCH) of a plurality of second PDCCH regions. The number of second PDCCH candidates of the search space (search space for the second PDCCH) of the second PDCCH region to which the first physical resource mapping is applied is set greater than the number of second PDCCH candidates of the search space (search space for the second PDCCH) of the second PDCCH region to which the first physical resource mapping is applied. For example, the number of second PDCCH candidates of VRB aggregation number 1 of the search space (search space for the second PDCCH) of the second PDCCH region to which the first physical resource mapping is applied is set greater than the number of second PDCCH candidates of VRB aggregation number 1 of the search space (search space for the second PDCCH) of the second PDCCH region to which the second physical resource mapping is applied.

Since in a certain VRB aggregation number, the number of second PDCCH candidates of the search space (search space for the second PDCCH) of the second PDCCH region to which the first physical resource mapping is applied is the same as the number of second PDCCH candidates of the search space (search space for the second PDCCH) of the second PDCCH region to which the second physical resource mapping is applied, in a different VRB aggregation number, the number of second PDCCH candidates of the search space (search space for the second PDCCH) of the second PDCCH region to which the first physical resource mapping is applied and the number of second PDCCH candidates of the search space (search space for the second PDCCH) of the second PDCCH region to which the second physical resource mapping is applied may be different. For example, in a certain VRB aggregation number, the number of second PDCCH candidates of the search space (search space for the second PDCCH) of the second PDCCH region to which the first physical resource mapping is applied is greater than the number of second PDCCH candidates of the search space (search space for the second PDCCH) of the second PDCCH region to which the second physical resource mapping is applied, and in a different VRB aggregation number, the number of second PDCCH candidates of the search space (search space for the second PDCCH) of the second PDCCH region to which the first physical resource mapping is applied is smaller than the number of second PDCCH candidates of the search space (search space for the second PDCCH) of the second PDCCH region to which the second physical resource mapping is applied. For example, in the VRB aggregation number of a small value, the number of second PDCCH candidates of the search space (search space for the second PDCCH) of the second PDCCH region to which the first physical resource mapping is applied is greater than the number of second PDCCH candidates of the search space (search space for the second PDCCH) of the second PDCCH region to which the second physical resource mapping is applied, and in the VRB aggregation number of a great value, the number of second PDCCH candidates of the search space (search space for the second PDCCH) of the second PDCCH region to which the first physical resource mapping is applied is smaller than the number of second PDCCH candidates of the search space (search space for the second PDCCH) of the second PDCCH region to which the second physical resource mapping is applied.

Further, the second PDCCH candidates of a certain VRB aggregation number may be configured in the search space (search space for the second PDCCH) of one second PDCCH region, and may not be configured in the search space (search space for the second PDCCH) of another second PDCCH region. For example, in the VRB aggregation number of a small value, the second PDCCH candidates are configured only in the search space (search space for the second PDCCH) of the second PDCCH region to which the first physical resource mapping is applied, and the second PDCCH candidates are not configured in the search space (search space for the second PDCCH) of the second PDCCH region to which the second physical resource mapping is applied, in contrast, in the VRB aggregation number of a great value, the second PDCCH candidates are configured only in the search space (search space for the second PDCCH) of the second PDCCH region to which the second physical resource mapping is applied, and the second PDCCH candidates are not configured in the search space (search space for the second PDCCH) of the second PDCCH region to which the first physical resource mapping is applied.

Further, the number of second PDCCH candidates of the search space (search space for the second PDCCH) within one second PDCCH region may vary depending on the number of second PDCCH regions configured in the mobile station apparatus 5. For example, as the number of second PDCCH regions configured in the mobile station apparatus 5 increases, the number of second PDCCH candidates of the search space (search space for the second PDCCH) within one second PDCCH region is reduced.

In addition, the control unit 405 determines whether the DCI which is input from the Viterbi decoder unit 529 has no error and is a DCI addressed to the mobile station apparatus 5 or not. When it is determined that there is no error in the DCI and it is the DCI addressed to the mobile station apparatus 5, the control unit 405 controls the demultiplexing unit 511, the data demodulation unit 523, the turbo decoding unit 525, and the transmission processing unit 407, based on the DCI. For example, when the DCI is downlink assignment, the control unit 405 controls the reception processing unit 401 so as to decode the signal of the PDSCH. In addition, similar to the PDSCH, even in the PDCCH, a CRC code is included and the control unit 405 determines whether the DCI of the PDCCI has an error or not using the CRC code.

The downlink reception quality measurement unit 531 measures reception quality (RSRP) of the downlink of the cell, using the downlink reference signal (CRS and CSI-RS), and outputs the measured reception quality information of the downlink to the control unit 405. Further, the downlink reception quality measurement unit 531 performs temporary channel quality measurement for generating the CQI to be notified to the base station apparatus 3 in the mobile station apparatus 5. The downlink reception quality measurement unit 531 outputs information such as the measured RSRP to the control unit 405.

<Transmission Processing Unit 407 of Mobile Station Apparatus 5>

Figure 6:
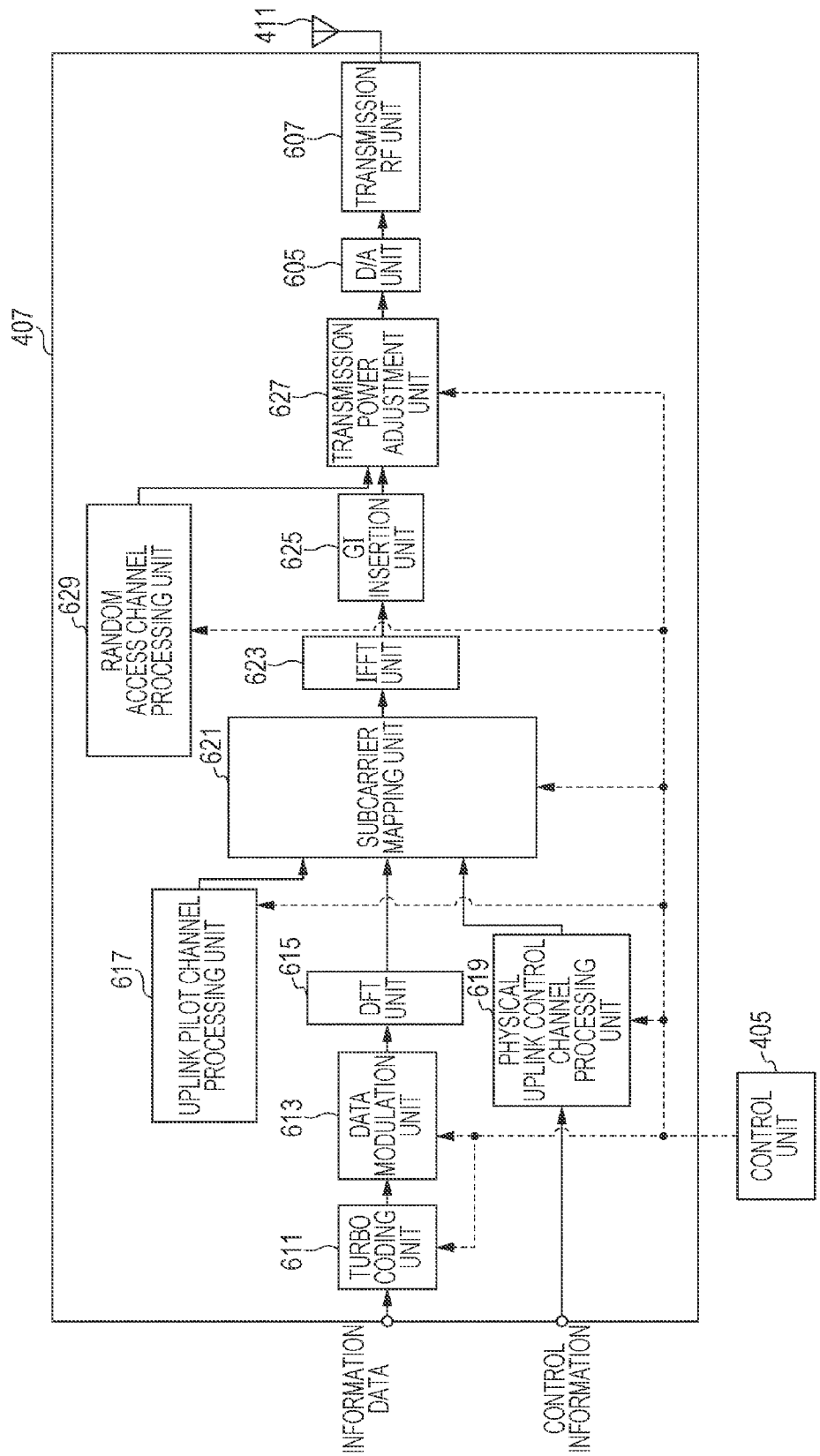
FIG. 6 is a schematic block diagram showing a configuration of a transmission processing unit 407 of the mobile station apparatus 5 according to the embodiment of the present invention.

FIG. 6 is a schematic block diagram showing a configuration of a transmission processing unit 407 of the mobile station apparatus 5 according to the embodiment of the present invention. As shown in FIG. 6, the transmission processing unit 407 is configured to include a turbo coding unit 611, a data modulation unit 613, a DFT unit 615, an uplink pilot channel processing unit 617, a physical uplink control channel processing unit 619, a subcarrier mapping unit 621, an IFFT unit 623, a GI insertion unit 625, a transmission power adjustment unit 627, a random access channel processing unit 629, a D/A unit 605, a transmission RF unit 607, and a transmit antenna 411. The transmission processing unit 407 performs coding and modulation on the information data and the UCI. The transmission processing unit 407 generates signals to be transmitted using the PUSCH and the PUCCH, and adjusts transmission power of the PUSCH and the PUCCH. The transmission processing unit 407 generates signals using the PRACH, and adjusts transmission power of the PRACH. The transmission processing unit 407 generates a DM RS and a SRS, and adjusts transmission power of the DM RS and the SRS.

The turbo coding unit 611 performs a turbo coding for enhancing error tolerance of the data on the information data which is input in a coding rate which is instructed from the control unit 405, and output the information data to the data modulation unit 613. The data modulation unit 613 modulates the code data which is coded by the turbo coding unit 611 by a modulation scheme which is instructed from the control unit 405, for example, modulation schemes such as the QPSK, the 16QAM, and the 64QAM, and generates a signal sequence of modulation symbols. The data modulation unit 613 outputs the generated signal sequence of modulation symbols to the DFT unit 615. The DFT unit 615 performs a discrete Fourier transform on the signals which are output by the data modulation unit 613 and outputs the transformed signals to the subcarrier mapping unit 621.

The physical uplink control channel processing unit 619 performs a baseband signal process for transmitting a UCI which is input from the control unit 405. The UCI which is input to the physical uplink control channel processing unit 619 is the ACK/NACK, the SR, and the CQI. The physical uplink control channel processing unit 619 outputs the generated signals to the subcarrier mapping unit 621 while being subjected to the baseband signal process. The physical uplink control channel processing unit 619 generates signals by coding the information bit of the UCI.

Further, the physical uplink control channel processing unit 619 performs a signal process associated with the code multiplexing of the frequency domain and/or the code multiplexing of the time domain on the signals generated from the UCI. The physical uplink control channel processing unit 619 multiplies the signal of the PUCCH generated from the information bit of ACK/NACK, the information bit of SR, or the information bit of CQI by a code sequence instructed from the control unit 405 in order to realize a code multiplexing of the frequency domain. The physical uplink control channel processing unit 619 multiplies the signal of the PUCCH generated from the information bit of ACK/NACK, or the information bit of SR, by a code sequence instructed from the control unit 405 in order to realize a code multiplexing of the time domain.

The uplink pilot channel processing unit 617 generates the SRS and the DM RS which are known signals in the base station apparatus 3 based on the instruction from the control unit 405, and outputs the generated signals to the subcarrier mapping unit 621.

The subcarrier mapping unit 621 places the signals which are input from the uplink pilot channel processing unit 617, the signals which are input from the DFT unit 615, and the signals which are input from the physical uplink control channel processing unit 619 in the subcarrier according to the instruction from the control unit 405 so as to be output to the IFFT unit 623.

The IFFT unit 623 performs inverse fast Fourier transform on the signals which are output by the subcarrier mapping unit 621, and outputs the signals to the GI insertion unit 625. Here, the number of points of the IFFT unit 623 is greater than the number of points of the DFT unit 615. The mobile station apparatus 5 performs demodulation of a DFT-Spread-OFDM scheme on signals which are transmitted using the PUSCH, by using the DFT unit 615, the subcarrier mapping unit 621, and the IFFT unit 623. The GI insertion unit 625 adds the guard interval to the signals which are input from the IFFT unit 623, and outputs the signals to the transmission power adjustment unit 627.

The random access channel processing unit 629 generates signals transmitted on the PRACH by using a preamble sequence instructed from the control unit 405, and outputs the generated signals to the transmission power adjustment unit 627.

The transmission power adjustment unit 627 adjusts the transmission power of the signals which are input from the GI insertion unit 625 or the signals which are input from the random access channel processing unit 629, based on the control signal from the control unit 405, and outputs the adjusted power to the D/A unit 605. In addition, the transmission power adjustment unit 627 controls average transmission power of each of the PUSCH, the PUCCH, the DM RS, the SRS, and the PRACH for each uplink subframe.

The D/A unit 605 converts the digital signal of a baseband which is input from the transmission power adjustment unit 627 into an analog signal and outputs the signals to the transmission RF unit 607. The transmission RF unit 607 generates the in-phase component and the orthogonal component of the intermediate frequency, from the analog signal which is input from the D/A unit 605, and cancels the excess frequency component with respect to the intermediate frequency band. Next, the transmission RF unit 607 converts the signals of the intermediate frequency into the signals of a high frequency (up-convert), cancels the excess frequency component, amplifies the power, and transmits the signals to the base station apparatus 3 through the transmit antenna 411.

Figure 7:
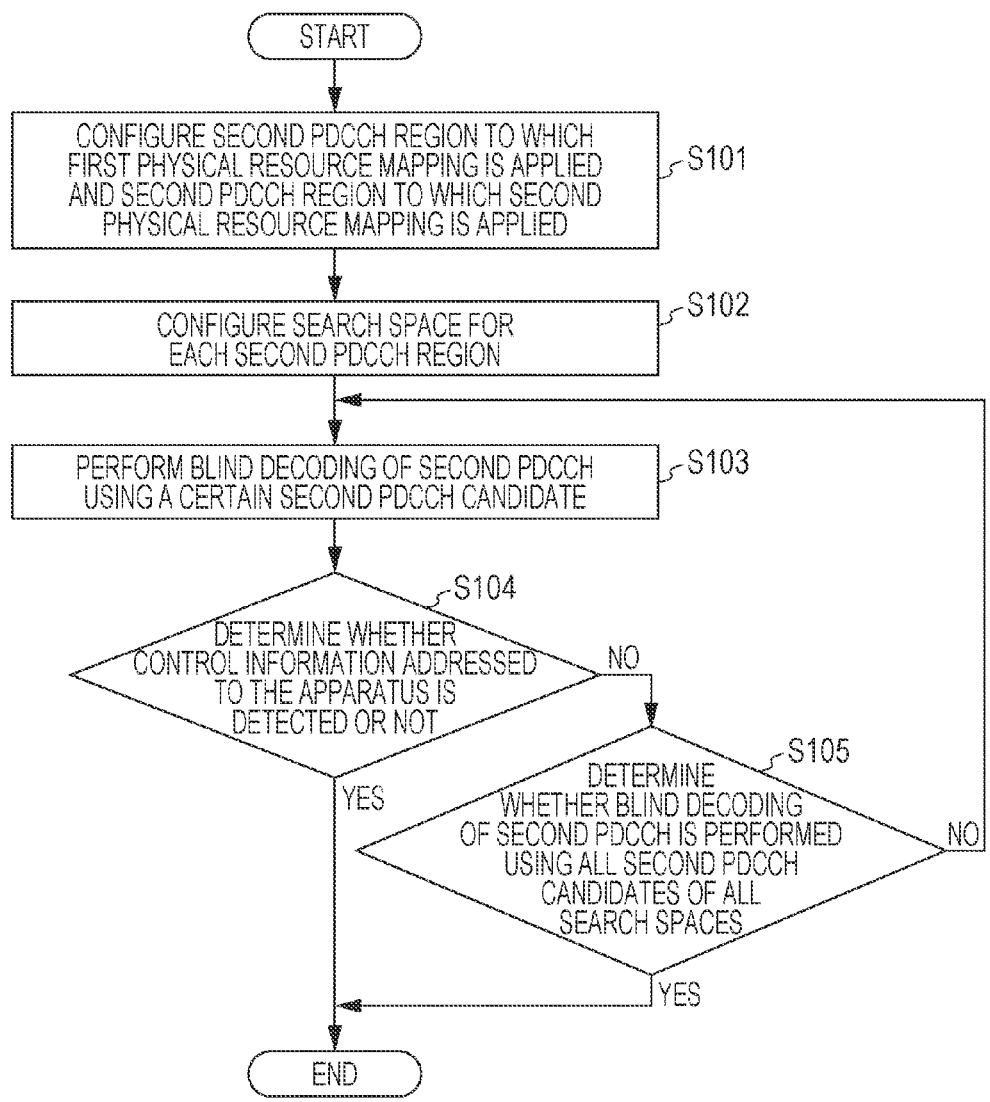
FIG. 7 is a flowchart showing an example of a process of detecting a second PDCCH of the mobile station apparatus 5 according to the embodiment of the present invention.

FIG. 7 is a flowchart showing an example of a process of detecting a second PDCCH of the mobile station apparatus 5 according to the embodiment of the present invention. The mobile station apparatus 5 configures (sets) the second PDCCH region to which the first physical resource mapping is applied and the second PDCCH region to which the second physical resource mapping is applied, based on information (RRC signaling) received from the base station apparatus 3 (step S101). Specifically, the mobile station apparatus 5 configures a plurality of second PDCCH regions, based on the information indicating the DL PRB of the second PDCCH region and the information indicating the physical resource mapping of the second PDCCH region. Next, the mobile station apparatus 5 configures the search space for each second PDCCH region (step S102). Specifically, the mobile station apparatus 5 performs the configuration of the VRB aggregation number for performing the decoding detection of the second PDCCH, the configuration of the first VRB number for configuring the search space for each VRB aggregation number, and the configuration of the number of the second PDCCH candidates for each VRB aggregation number, with respect to each second PDCCH region. Next, the mobile station apparatus 5 performs the blind decoding of the second PDCCH using a certain second PDCCH candidate (step S103). Specifically, the mobile station apparatus 5 starts the blind decoding of the second PDCCH from the second PDCCH candidate including the VRB of the first number of the search space corresponding to a certain VRB aggregation number of a certain second PDCCH region. Next, the mobile station apparatus 5 determines whether control information addressed to the mobile station apparatus 5 is detected or not (step S104). When it is determined that the control information addressed to the mobile station apparatus 5 is detected (step S104: YES), the mobile station apparatus 5 ends the process to detect the second PDCCH. When it is determined that the control information addressed to the mobile station apparatus 5 is not detected (step S104: NO), the mobile station apparatus 5 determines whether the blind decoding of the second PDCCH is performed using all second PDCCH candidates of all search spaces (step S105). When it is determined that the blind decoding of the second PDCCH is performed using all second PDCCH candidates of all search spaces (step S105: YES), the mobile station apparatus 5 ends the process to detect the second PDCCH. When it is determined that the blind decoding of the second PDCCH is not performed using all second PDCCH candidates of all search spaces (step S105: NO), the mobile station apparatus 5 returns to step S103, and performs the blind decoding of the second PDCCH using the second PDCCH candidates for not performing the blind decoding of the second PDCCH. In addition, the process to detect the second PDCCH is performed in a unit of a downlink subframe.

Figure 8:
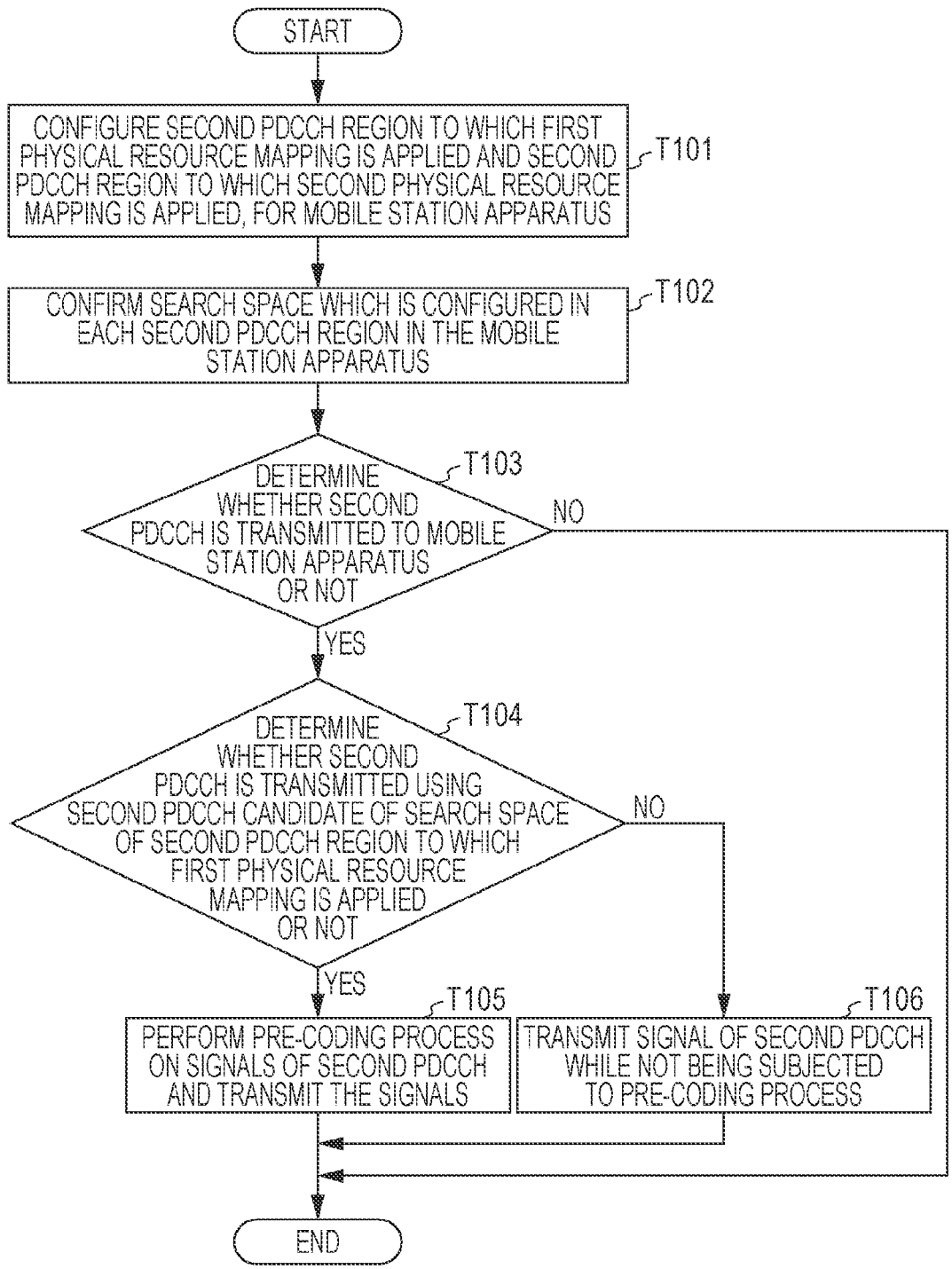
FIG. 8 is a flowchart showing an example of a process of transmitting a second PDCCH of the base station apparatus 3 according to the embodiment of the present invention.

FIG. 8 is a flowchart showing an example of a process of transmitting a second PDCCH of the base station apparatus 3 according to the embodiment of the present invention. The base station apparatus 3 configures a second PDCCH region to which the first physical resource mapping is applied and a second PDCCH region to which the second physical resource mapping is applied, for the mobile station apparatus 5 (step T101). Next, the base station apparatus 3 confirms the search space which is configured in each second PDCCH region in the mobile station apparatus 5 (step T102). Next, the base station apparatus 3 determines whether the second PDCCH is transmitted to the mobile station apparatus 5 or not (step T103). When it is determined that the second PDCCH is transmitted to the mobile station apparatus 5 (step T103: YES), the base station apparatus 3 determines whether the second PDCCH is transmitted using the second PDCCH candidate of the search space of the second PDCCH region to which the first physical resource mapping is applied or not (step T104). When it is determined that the second PDCCH is transmitted using the second PDCCH candidate of the search space of the second PDCCH region to which the first physical resource mapping is applied (step T104: YES), the base station apparatus 3 performs the pre-coding process on the signals of the second PDCCH and transmits the signals (step T105). When it is determined that the second PDCCH is not transmitted using the second PDCCH candidate of the search space of the second PDCCH region to which the first physical resource mapping is applied (step T104: NO), that is, when it is determined that the second PDCCH is transmitted using the second PDCCH candidate of the search space of the second PDCCH region to which the second physical resource mapping is applied, the base station apparatus 3 transmits the signal of the second PDCCH while not being subjected to the pre-coding process (step T106). When it is determined that the second PDCCH is not transmitted to the mobile station apparatus 5 (step T103: NO), the base station apparatus 3 ends the process while not transmitting the signal of the second PDCCH. In addition, when the process to transmit the second PDCCH is performed in a unit of a downlink subframe and it is determined that the second PDCCH is not transmitted to the mobile station apparatus 5 in a certain subframe, the base station apparatus 3 again performs the determination of the transmission of the signal of the second PDCCH in the subsequent subframes.

For example, as a result of taking into account scheduling for a plurality of mobile station apparatuses 5 within a cell, when it is determined that VRB corresponding to the second PDCCH candidates of the search space of the second PDCCH region to which the first physical resource mapping is applied in a certain mobile station apparatus 5 is used in a different mobile station apparatus 5, the base station apparatus 3 determines that the second PDCCH is not transmitted using the second PDCCH candidates of the search space of the second PDCCH region to which the first physical resource mapping is applied in a certain mobile station apparatus 5. For example, even if it is determined that the VRB is not used in a different mobile station apparatus 5 and is the VRB corresponding to the second PDCCH candidates of the search space of the second PDCCH region to which the first physical resource mapping is applied in a certain mobile station apparatus 5, when it is determined that channel state information suitable for the resource corresponding to the VRB is not held, the base station apparatus 3 determines that the second PDCCH is not transmitted using second PDCCH candidates of the search space of the second PDCCH region to which the first physical resource mapping is applied in a certain mobile station apparatus 5. For example, when it is determined that all VRBs corresponding to the second PDCCH candidates of the search space of the second PDCCH region to which the first physical resource mapping is applied and all VRBs corresponding to the second PDCCH candidates of the search space of the second PDCCH region to which the second physical resource mapping is applied, which have been used in a certain mobile station apparatus 5, are used in a separate mobile station apparatus 5, the base station apparatus 3 determines that the second PDCCH is not transmitted in a certain mobile station apparatus 5.

As described above, in the embodiments of the present invention, in the communication system 1, a plurality of physical resource blocks (PRB) are configured as control channel regions (second PDCCH regions) in which control channels (second PDCCHs) may be mapped, and each control channel (second PDCCH) includes one or more first elements (VRB). The communication system 1 includes a plurality of mobile station apparatuses 5 and a base station apparatus 3 that performs communication with the plurality of mobile station apparatus 5 using the control channel (second PDCCH). The base station apparatus 3 configures, for the mobile station apparatus 5, a control channel region (second PDCCH region) to which a first physical resource mapping, in which one first element (VRB) includes resources of one Physical Resource Block (PRB), is applied, and a control channel region (second PDCCH region) which is a second element as a resource in which one Physical Resource Block (PRB) is divided and to which a second physical resource mapping, in which one first element (VRB) includes second elements of a plurality of different Physical Resource Blocks (PRB), is applied. The base station apparatus 3 allocates one or more first elements (VRB) of any search space (second search space) among a search space (second search space) in which decoding detection of the control channel (second PDCCH) in the mobile station apparatus 5 within the control channel region (second PDCCH region) to which the first physical resource mapping is applied and a search space (second search space) in which decoding detection of the control channel (second PDCCH) in the mobile station apparatus 5 within the control channel region (second PDCCH region) to which the second physical resource mapping is applied, to the control channel (second PDCCH) to be used in communication. The mobile station apparatus 5 configures a search space (second search space) which is configured by the base station apparatus 3 and in which the decoding detection of the control channel (second PDCCH) is performed within the control channel region (second PDCCH region) to which the first physical resource mapping is applied and a search space (second search space) which is configured by the base station apparatus 3 and in which the decoding detection of the control channel (second PDCCH) is performed within the control channel region (second PDCCH region) to which the second physical resource mapping is applied. The mobile station apparatus 5 performs the decoding detection of the control channel (second PDCCH) using the first element (VRB) of the search space (second search space) which is configured. Thus, it is possible to efficiently configure a region in which signals containing control information may be mapped, the base station apparatus 3 can efficiently transmit the signals containing control information to the mobile station apparatus 5, and the mobile station apparatus 5 can efficiently receive the signals containing control information from the base station apparatus 3. More specifically, when the pre-coding process based on the channel state is effective for the second PDCCH, the base station apparatus 3 can transmit the second PDCCH to the mobile station apparatus 5 by actively using the pre-coding process based on the channel state. This can increase the capacity of control channels of an overall system. In contrast, when the pre-coding process based on the channel state is not effective for the second PDCCH, the base station apparatus 3 can transmit the second PDCCH to the mobile station apparatus 5 by a signal configuration from which a frequency diversity effect is achieved, while not applying the pre-coding process based on the channel state. Therefore, it is possible to improve the communication quality in the worst case in the communication system 1. Accordingly, it is possible to improve the stability of communication in the communication system 1.

Further, in the embodiments of the present invention, the mobile station apparatus 5 sets the number of control channel candidates (second PDCCH candidates) configuring the search space (second search space) for performing decoding detection of the control channel (second PDCCH) within the control channel region (second PDCCH region) to which the first physical resource mapping is applied different from the number of control channel candidates (second PDCCH candidates) configuring the search space (second search space) for performing decoding detection of the control channel (second PDCCH) within the control channel region (second PDCCH region) to which the second physical resource mapping is applied, and thus it is possible to realize an efficient scheduling using a second PDCCH.

Further, in the embodiments of the present invention, the mobile station apparatus 5 sets the number of first elements (VRB aggregation number) configuring the control channel (second PDCCH) in which the decoding detection is performed in the search space (second search space) within the control channel region (second PDCCH region) to which the first physical resource mapping is applied different from the number of first elements (VRB aggregation number) configuring the control channel (second PDCCH) in which the decoding detection is performed in the search space (second search space) within the control channel region (second PDCCH region) to which the second physical resource mapping is applied, and thus it is possible to realize an efficient scheduling using a second PDCCH.

In addition, in the embodiments of the present invention, for simplicity of explanation, the region of the resource in which the second PDCCH may be mapped is defined as the second PDCCH region, however, even if it is defined as a different term, as long as it has an analogous meaning, it is obvious that the present invention can be applied thereto.

Further, in the embodiments of the present invention, although a communication system in which cooperative communication is performed by the base station apparatus and the RRH has been mainly described, the present invention can be applied to a communication system in which Multi-User (MU)-MIMO is applied within one base station apparatus. For example, MU-MIMO is a technology to maintain orthogonality between the signals between mobile station apparatuses with each other or to reduce same channel interference even in a case of using the same resource in the frequency domain and the time domain, by controlling beams to the signals for each mobile station apparatus using a pre-coding technology or the like with respect to a plurality of mobile station apparatuses present in different positions (for example, area A and area B) within an area of the base station apparatus using a plurality of transmit antennas. Since signals between mobile station apparatuses are subjected to a spatial multiple-division, it is also referred to as Space Division Multiple Access (SDMA).

In the MU-MIMO, different pre-coding processes are applied to respective mobile station apparatuses which are spatially multiplexed. The different pre-coding processes are performed for the second PDCCH and the UE-specific RS of the mobile station apparatus located in an area A and the mobile station apparatus located in an area B within an area of the base station apparatus. The regions in which the second PDCCH may be mapped are independently configured and the pre-coding processes are independently performed for the mobile station apparatus located in the area A and the mobile station apparatus located in the area B.

Further, the mobile station apparatus 5 is not limited to a mobile terminal, and the present invention may be realized by implementing the function of the mobile station apparatus 5 in a fixed terminal.

The characteristic units of the present invention described above can be realized by implementing functions in an integrated circuit and controlling them. In other words, the integrated circuit of the present invention is implemented the mobile station apparatus which performs communication with a base station apparatus using a control channel, in which a control channel region which is a region that may contain the control channel includes a plurality of physical resource blocks, and the control channel includes one or more first elements. A control channel region to which the first physical resource mapping in which one first element includes one physical resource block is applied and a control channel region to which the second physical resource mapping in which one first element includes the second element of a plurality of different physical resource blocks is applied, the second element being a resource obtained by dividing one physical resource block, are configured by the base station apparatus. The integrated circuit is characterized in having (i) a function of configuring a search space for performing decoding detection of the control channel within a control channel region to which the first physical resource mapping which is configured is applied and a search space for performing decoding detection of the control channel within a control channel region to which the second physical resource mapping which is configured by the base station apparatus is applied (control unit 405), (ii) a function of performing decoding detection of the control channel using the first element of the search space which is configured in the control unit 405 (reception processing unit 401).

Further, the integrated circuit of the present invention is implemented in a base station apparatus which performs communication with a plurality of mobile station apparatuses using a control channel, and in which a control channel region which is a region that may contain the control channel includes a plurality of physical resource blocks, and the control channel includes one or more first elements. The integrated circuit has (i) a function of configuring, for the mobile station apparatus, a control channel region to which a first physical resource mapping in which one first element includes one physical resource block is applied and a control channel region to which a second physical resource mapping in which one first element includes the second element of a plurality of different physical resource blocks is applied, the second element being a resource obtained by dividing one physical resource block (radio resource control unit 103), and (ii) a function of allocating one or more first elements in one of a search space for performing decoding detection of the control channel in the mobile station apparatus within the control channel region to which the first physical resource mapping is applied and a search space for performing decoding detection of the control channel in the mobile station apparatus within the control channel region to which the second physical resource mapping is applied, to the control channel to be used in communication (control unit 105).

The operations described in the embodiments of the present invention may be realized by a program. A program operating in the mobile station apparatus 5 and the base station apparatus 3 according to the present invention is a program (a program for causing a computer to function) for controlling a CPU and so forth so as to implement the functions of the foregoing embodiments according to the present invention. Such information as handled by apparatuses is temporarily accumulated in a RAM while being processed, and then is stored in various ROMs and HDDs. The information is read by the CPU as necessary, for modification and writing. A recording medium having the program stored therein may be any of semiconductor media (for example, a ROM, a non-volatile memory card, and the like), optical recording media (for example, a DVD, an MO, an MD, a CD, a BD, and the like), magnetic recording media (for example, a magnetic tape, a flexible disk, and the like), and so forth. Furthermore, in addition to the implementation of the functions of the embodiments described above by executing the loaded program, the functions of the present invention may be implemented by processing the program in cooperation with an operating system, any other application program, or the like, based on instructions of the program.

In a case where the program is distributed on market, the program may be stored in a transportable recording medium for distribution, or may be transferred to a server computer connected through a network such as the Internet. In this case, a storage device in the server computer also falls within the scope of the present invention. In addition, all or a part of the mobile station apparatus 5 and the base station apparatus 3 in the embodiments described above may be implemented as an LSI, which is typically an integrated circuit. The respective functional blocks of the mobile station apparatus 5 and the base station apparatus 3 may be individually built into chips, or some or all of them may be integrated and built into a chip. The method for forming an integrated circuit is not limited to LSI, and may be implemented by a dedicated circuit or a general-purpose processor. In the case of the advent of integrated circuit technology replacing LSI due to the advancement of semiconductor technology, it is also possible to use an integrated circuit based on this technology. The respective functional blocks of the mobile station apparatus 5 and the base station apparatus 3 may be implemented by a plurality of circuits.

Information and signal may be represented using any various different technologies and methods. For example, chips, symbols, bits, signals, information, commands, instructions, and data which may be referred to through the above description may be represented by voltages, currents, electromagnetic waves, magnetic fields or magnetic particles, optical fields or light particles, or the combination thereof.

Various exemplary logical blocks, processing units and the algorithm steps which are described in connection with the disclosure herein can be implemented by electronic hardware, computer software, or the combination of both. To clearly illustrate the synonymy of hardware and software, various exemplary elements, blocks, modules, circuits, and steps have been described generally with respect to their functionalities. Whether such functionalities are to be implemented as software or to be implemented as hardware will depend on individual applications and the design constraints imposed on the overall system. Although those skilled in the art may implement the described functionality by various methods regarding respective specific applications, determination of such implementation should not be interpreted as departing from the scope of this disclosure.

Various exemplary logical blocks and processing units described in connection with the disclosure herein may be implemented or performed by a general purpose application processor, a digital signal processor (DSP), an application specific integrated circuit (ASIC), a field programmable gate array signal (FPGA), or other programmable logic devices, a discrete gate or transistor logic, discrete hardware components, or combinations thereof which are designed to perform the functions described herein. The general purpose application processor may be a microprocessor, and instead thereof, may be processors in the related art, controllers, microcontrollers, or state machines. The processor may also be implemented as a combination of the computing devices. For example, the process may be a combination of the DSP and the microprocessor, a combination of a plurality of microprocessors, a combination of a DSP core and one or more microprocessors which are connected, or a combination of other such configurations.

The steps of a method or an algorithm described in connection with the disclosure herein may be embodied directly by hardware, a software module which is executed by a processor, or by a combination of these. The software module may be present in a RAM memory, a flash memory, a ROM memory, a EPROM memory, a EEPROM memory, a register, a hard disk, a removable disk, a CD-ROM, or a recording medium in any form known in the field. The typical recording medium may be coupled to a processor such that the processor can read information from the recording medium or can write information on the recording medium. In an alternative method, the recording medium may be integrated into the processor. The recording medium and the processor may be present in an ASIC. The ASIC may be present in the mobile station apparatus (user terminal). Alternatively, the processor and the recording medium may be present in the mobile station apparatus 5 as a discrete element.

In one or more typical designs, the described functions may be implemented by hardware, software, firmware, or a combination thereof. If the functions are implemented by software, the functions are held as one or more commands or codes on a computer-readable medium, or may be transmitted. Computer-readable media includes both communication media including any medium that facilitates carrying of computer programs from one place to another place and computer storage media. Recording media may be any media that can be accessed by a general purpose or a special purpose computer. While not being limited thereto, such computer-readable media may include a RAM, a ROM, an EEPROM, a CDROM or other optical disc media, magnetic disk media or other magnetic recording media, or available media that are accessible by a general purpose or a special purpose computer, or a general purpose or a special purpose processor in order to carry or hold desired program code means in the form of instructions or data structures. Further, any connection is appropriately referred to as a computer-readable medium. For example, when software is transmitted from web sites, servers, or other remote sources using wireless technologies such as a coaxial cable, a fiber optic cable, a twisted pair, a digital subscriber line (DSL), or an infrared, a radio, or a microwave, the coaxial cable, the fiber optic cable, the twisted pair, the DSL, or the infrared, the radio, or the microwave are included in the definition of medium. The disk (disc) as used herein includes a compact disk (CD), a laser disc (registered trademark), an optical disc, a digital versatile disc (DVD), a floppy (registered trademark) disk and a blu-ray disc. While the disk (disk) generally reproduces data magnetically, the disk (disc) reproduces data optically with lasers. A combination of the above should also be included in the computer-readable medium.

While embodiments of this invention have been described in detail with reference to the drawings, a specific configuration is not limited to these embodiments, and the claims also includes design changes and the like without departing from the essence of this invention.

REFERENCE SIGNS LIST

3 BASE STATION APPARATUS,
4 (4A TO 4C) RRH,
5 (5A TO 5C) MOBILE STATION APPARATUS,
101 RECEPTION PROCESSING UNIT,
103 RADIO RESOURCE CONTROL UNIT,
105 CONTROL UNIT,
107 TRANSMISSION PROCESSING UNIT,
109 RECEIVE ANTENNA,
111 TRANSMIT ANTENNA,
201 PHYSICAL DOWNLINK SHARED CHANNEL PROCESSING UNIT,
203 PHYSICAL DOWNLINK CONTROL CHANNEL PROCESSING UNIT,
205 DOWNLINK PILOT CHANNEL PROCESSING UNIT,
207 MULTIPLEXING UNIT,
209 IFFT UNIT,
211 GI INSERTION UNIT,
213 D/A UNIT,
215 TRANSMISSION RF UNIT,
219 TURBO CODING UNIT,
221 DATA MODULATION UNIT,
223 CONVOLUTIONAL CODING UNIT,
225 QPSK MODULATION UNIT,
227 PRE-CODING PROCESSING UNIT (FOR PDCCH),
229 PRE-CODING PROCESSING UNIT (FOR PDSCH),
231 PRE-CODING PROCESSING UNIT (FOR DOWNLINK PILOT CHANNEL),
301 RECEPTION RF UNIT,
303 A/D UNIT,
309 SYMBOL TIMING DETECTION UNIT,
311 GI REMOVING UNIT,
313 FFT UNIT,
315 SUBCARRIER DEMAPPING UNIT,
317 CHANNEL ESTIMATION UNIT,
319 CHANNEL EQUALIZATION UNIT (FOR PUSCH),
321 CHANNEL EQUALIZATION UNIT (FOR PUCCH),
323 IDFT UNIT,
325 DATA DEMODULATION UNIT,
327 TURBO DECODING UNIT,
329 PHYSICAL UPLINK CONTROL CHANNEL DETECTION UNIT,
331 PREAMBLE DETECTION UNIT,
333 SRS PROCESSING UNIT,
401 RECEPTION PROCESSING UNIT,
403 RADIO RESOURCE CONTROL UNIT,
405 CONTROL UNIT,
407 TRANSMISSION PROCESSING UNIT,
409 RECEIVE ANTENNA,
411 TRANSMIT ANTENNA,
501 RECEPTION RF UNIT,
503 A/D UNIT,
505 SYMBOL TIMING DETECTION UNIT,
507 GI REMOVING UNIT,
509 FFT UNIT,
511 DEMULTIPLEXING UNIT,
513 CHANNEL ESTIMATION UNIT,

515 CHANNEL COMPENSATION UNIT (FOR PDSCH),
517 PHYSICAL DOWNLINK SHARED CHANNEL DECODING UNIT,
519 CHANNEL COMPENSATION UNIT (FOR PDCCH),
521 PHYSICAL DOWNLINK CONTROL CHANNEL DECODING UNIT,
523 DATA DEMODULATION UNIT,
525 TURBO DECODING UNIT,
527 QPSK DEMODULATION UNIT,
529 VITERBI DECODER UNIT,
531 DOWNLINK RECEPTION QUALITY MEASUREMENT UNIT,
533 PDCCH DEMAPPING UNIT,
605 D/A UNIT,
607 TRANSMISSION RF UNIT,
611 TURBO CODING UNIT,
613 DATA MODULATION UNIT,
615 DFT UNIT,
617 UPLINK PILOT CHANNEL PROCESSING UNIT,
619 PHYSICAL UPLINK CONTROL CHANNEL PROCESSING UNIT,
621 SUBCARRIER MAPPING UNIT,
623 IFFT UNIT,
625 GI INSERTION UNIT,
627 TRANSMISSION POWER ADJUSTMENT UNIT,
629 RANDOM ACCESS CHANNEL PROCESSING UNIT

The invention claimed is:

1. A terminal apparatus which is configured to perform communication with a base station apparatus, the terminal apparatus comprising:
control circuitry configured to configure, on a basis of a higher layer signaling, a first resource block pair set with first multiple resource block pairs in a downlink system band and a second resource block pair set with second multiple resource block pairs in the downlink system band, the first resource block pair set and the second resource block pair set being for a control channel monitoring, the first multiple resource block pairs being indicated by the higher layer signaling, and the second multiple resource block pairs being indicated by the higher layer signaling; and
reception circuitry configured to monitor the control channel in a first search space in the first resource block pair set and a second search space in the second resource block pair set, the control channel being monitored using one or a plurality of first elements, wherein
resource block pairs constituting each of the first resource block pair set and the second resource block pair set are independently configured on a subframe,
the higher layer signaling includes information indicating whether a first physical resource mapping is configured for the first resource block pair set or a second physical resource mapping is configured for the first resource block pair set,
the higher layer signaling includes information indicating whether the first physical resource mapping is configured for the second resource block pair set or the second physical resource mapping is configured for the second resource block pair set,
the first resource block pair set and the second resource block pair set are independently configured, on a basis of the higher layer signaling, with either the first physical resource mapping or the second physical resource mapping,
for the first physical resource mapping, each of the first elements is constituted of a plurality of second resource elements in one physical resource block pair, and
for the second physical resource mapping, each of the first elements is constituted of a plurality of second resource elements in at least two physical resource block pairs, one of the plurality of second resource elements in the at least two physical resource block pairs being included in one of the at least two physical resource block pairs, and another one of the plurality of second resource elements in the at least two physical resource block pairs being included in another one of the at least two physical resource block pairs.

2. The terminal apparatus according to claim 1, wherein
the first resource block pair set is configured with the first physical resource mapping,
the second resource block pair set is configured with the second physical resource mapping,
an aggregation number is a number of first elements that constitute a control channel candidate, and
in a case that the aggregation number is a small value, a number of control channel candidates constituting the first search space is set to be greater than a number of control channel candidates constituting the second search space.

3. The terminal apparatus according to claim 2, wherein
in a case that the aggregation number is a great value, the number of control channel candidates constituting the first search space is set to be greater than the number of control channel candidates constituting the second search space.

4. The terminal apparatus according to claim 1, wherein
the first resource block pair set is configured with the first physical resource mapping,
the second resource block pair set is configured with the second physical resource mapping,
an aggregation number is a number of first elements that constitute a control channel candidate, and
in a case that the aggregation number is a small value, a control channel candidate is set in the first search space, and no control channel candidate is set in the second search space.

5. The terminal apparatus according to claim 1, wherein
the first resource block pair set is configured with the first physical resource mapping,
the second resource block pair set is configured with the second physical resource mapping,
an aggregation number is a number of first elements that constitute a control channel candidate, and
in a case that the aggregation number is a great value, a control channel candidate is set in the second search space, and no control channel candidate is set in the first search space.

6. A base station apparatus which is configured to perform communication with a terminal apparatus, the base station apparatus comprising:
radio resource control circuitry configured to configure, through a higher layer signaling, a first resource block pair set with first multiple resource block pairs in a downlink system band and a second resource block pair set with second multiple resource block pairs in the downlink system band, the first resource block pair set and the second resource block pair set being for a control channel monitoring, the first multiple resource block airs being indicated by the higher layer signaling, and the second multiple resource block pairs being indicated by the higher layer signaling; and transmission circuitry configured to transmit the control channel in either a first search space in the first resource block pair set or a second search space in the second resource block pair set, the control channel being transmitted using one or a plurality of first elements, wherein resource block pairs that constitute each of the first resource block pair set and the second resource block pair set are independently configured on a subframe, the higher layer signaling includes information indicating whether a first physical resource mapping is configured for the first resource block pair set or a second physical resource mapping is configured for the first resource block pair set, the higher layer signaling includes information indicating whether the first physical resource mapping is configured for the second resource block pair set or the second physical resource mapping is configured for the second resource block pair set, the first resource block pair set and the second resource block pair set are independently configured, through the higher layer signaling, with either the first physical resource mapping or the second physical resource mapping, for the first physical resource mapping, each of the first elements is constituted of a plurality of second resource elements in one physical resource block pair, and for the second physical resource mapping, each of the first elements is constituted of a plurality of second resource elements in at least two physical resource block pairs- ad one of the plurality of second resource elements in the at least two physical resource block pairs being included in one of the at least two physical resource block pairs, and another one of the plurality of second resource elements in the at least two physical resource block pairs being included in another one of the at least two physical resource block pairs.

7. The base station apparatus according to claim 6, wherein the first resource block pair set is configured with the first physical resource mapping, the second resource block pair set is configured with the second physical resource mapping, an aggregation number is a number of first elements that constitute a control channel candidate, and in a ease that the aggregation number is a small value, a number of control channel candidates constituting the first search space is set to be greater than a number of control channel candidates constituting the second search space.

8. The base station apparatus according to claim 7, wherein in a case that the aggregation number is a great value, the number of control channel candidates constituting the first search space is set to be greater than the number of control channel candidates constituting the second search space.

9. The base station apparatus according to claim 6, wherein the first resource block pair set is configured with the first physical resource mapping, the second resource block pair set is configured with the second physical resource mapping, an aggregation number is a number of first elements that constitute a control channel candidate, and in a case that the aggregation number is a small value, a control channel candidate is set in the first search space, and no control channel candidate is set in the second search space.

10. The base station apparatus according to claim 6, wherein the first resource block pair set is configured with the first physical resource mapping, the second resource block pair set is configured with the second physical resource mapping, an aggregation number is a number of first elements that constitute a control channel candidate, and in a case that the aggregation number is a great value, a control channel candidate is set in the second search space, and no control channel candidate is set in the first search space.

11. A communication method of a terminal apparatus which is configured to perform communication with a base station apparatus, the communication method comprising:

configuring, on a basis of a higher layer signaling, a first resource block pair set with first multiple resource block pairs in a downlink system band and a second resource block pair set with second multiple resource block pairs in the downlink system band, the first resource block pair set and the second resource block pair set being for a control channel monitoring, the first multiple resource block pairs being indicated by the higher layer signaling, and the second multiple resource block pairs being indicated by the higher layer signaling; and monitoring the control channel in a first search space in the first resource block pair set and a second search space in the second resource block pair set, the control channel being monitored using one or a plurality of first elements, wherein resource block pairs constituting each of the first resource block pair set and the second resource block pair set are independently configured on a subframe, the higher layer signaling includes information indicating whether a first physical resource mapping is configured for the first resource block pair set or a second physical resource mapping is configured for the first resource block pair set, the higher layer signaling includes information indicating whether the first physical resource mapping is configured for the second resource block pair set or the second physical resource mapping is configured for the second resource block pair set, the first resource block pair set and the second resource block pair set are independently configured, on a basis of the higher layer signaling, with either the first physical resource mapping or the second physical resource mapping, for the first physical resource mapping, each of the first elements is constituted of a plurality of second resource elements in one physical resource block pair, and for the second physical resource mapping, each of the first elements is constituted of a plurality of second resource elements in at least two physical resource block pairs, one of the plurality of second resource elements in the at least two physical resource block pairs being included in one of the at least two physical resource block pairs, and another one of the plurality of second resource elements in the at least two physical resource block pairs being included in another one of the at least two physical resource block pairs.

12. A communication method of a base station apparatus which is configured to perform communication with a terminal apparatus, the communication method comprising:

configuring, through a higher layer signaling, a first resource block pair set with first multiple resource block pairs in a downlink system band and a second resource block pair set with second multiple resource block pairs in the downlink system band, the first resource block pair set and the second resource block pair set being for a control channel monitoring, the first multiple resource block pairs being indicated by the higher layer signaling, and the second multiple resource block pairs being indicated by the higher layer signaling; and transmitting the control channel in either a first search space in the first resource block pair set or a second search space in the second resource block pair set, the control channel being transmitted using one or a plurality of first elements, wherein resource block pairs that constitute each of the first resource block pair set and the second resource block pair set are independently configured on a subframe, the higher layer signaling includes information indicating whether a first physical resource mapping is configured for the first resource block pair set or a second physical resource mapping is configured for the first resource block pair set, the higher layer signaling includes information indicating whether the first physical resource mapping is configured for the second resource block pair set or the second physical resource mapping is configured for the second resource block pair set, the first resource block pair set and the second resource block pair set are independently configured, through the higher layer signaling, with either the first physical resource mapping or the second physical resource mapping, for the first physical resource mapping, each of the first elements is constituted of a plurality of second resource elements in one physical resource block pair, and for the second physical resource mapping, each of the first elements is constituted of a plurality of second resource elements in at least two physical resource block pairs, one of the plurality of second resource elements in the at least two physical resource block pairs being included in one of the at least two physical resource block pairs, and another one of the plurality of second resource elements in the at least two physical resource block pairs being included in another one of the at least two physical resource block pairs.

* * * * *